Figure 48:
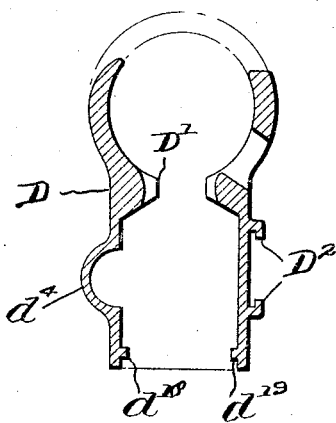

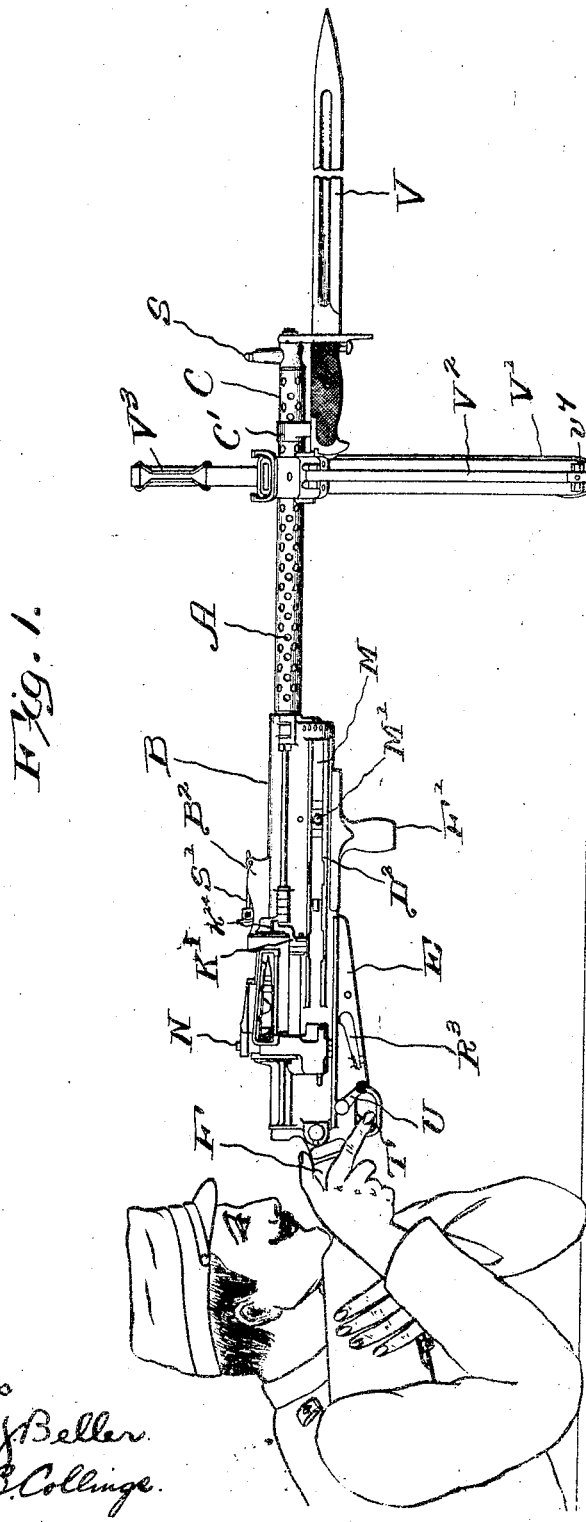

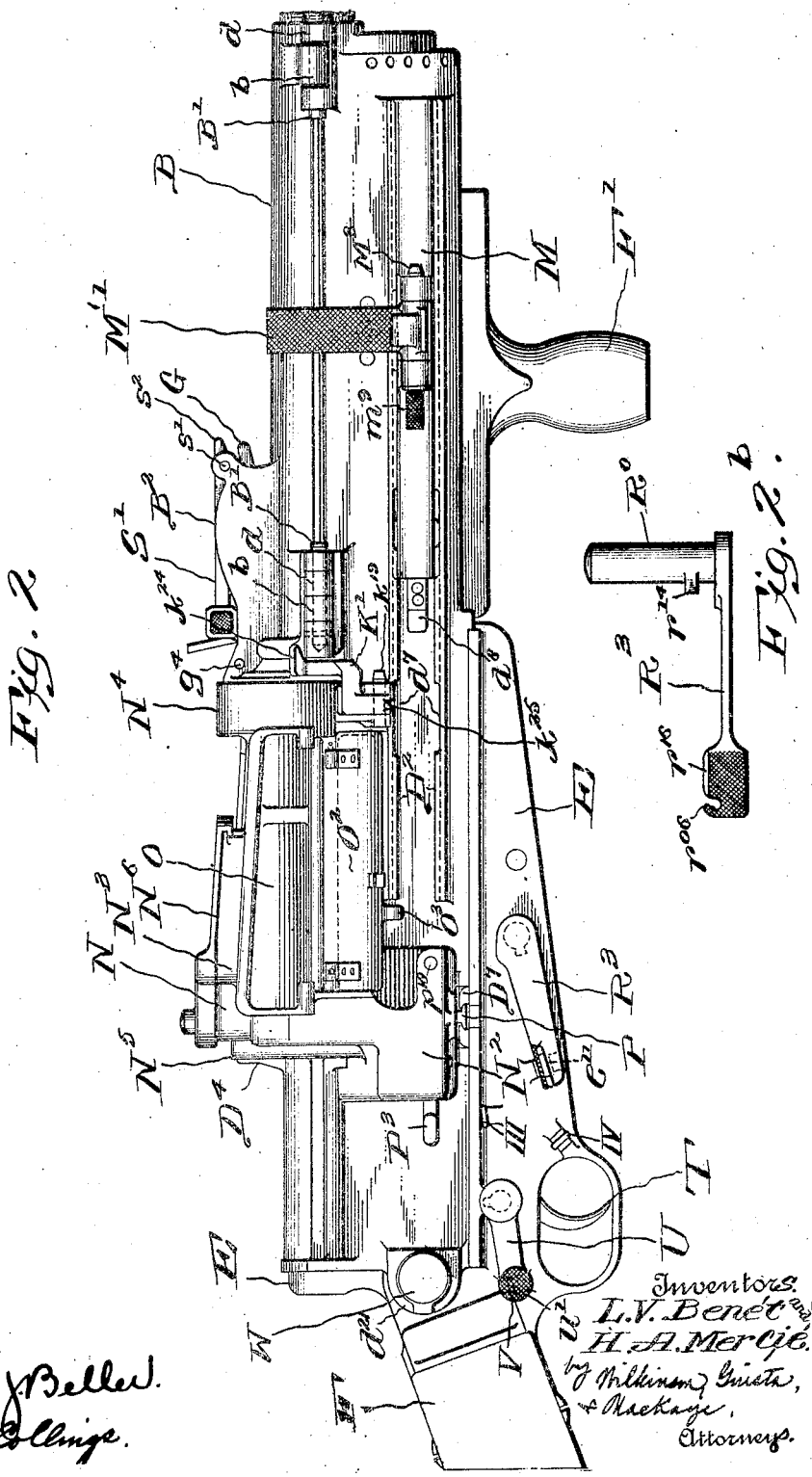

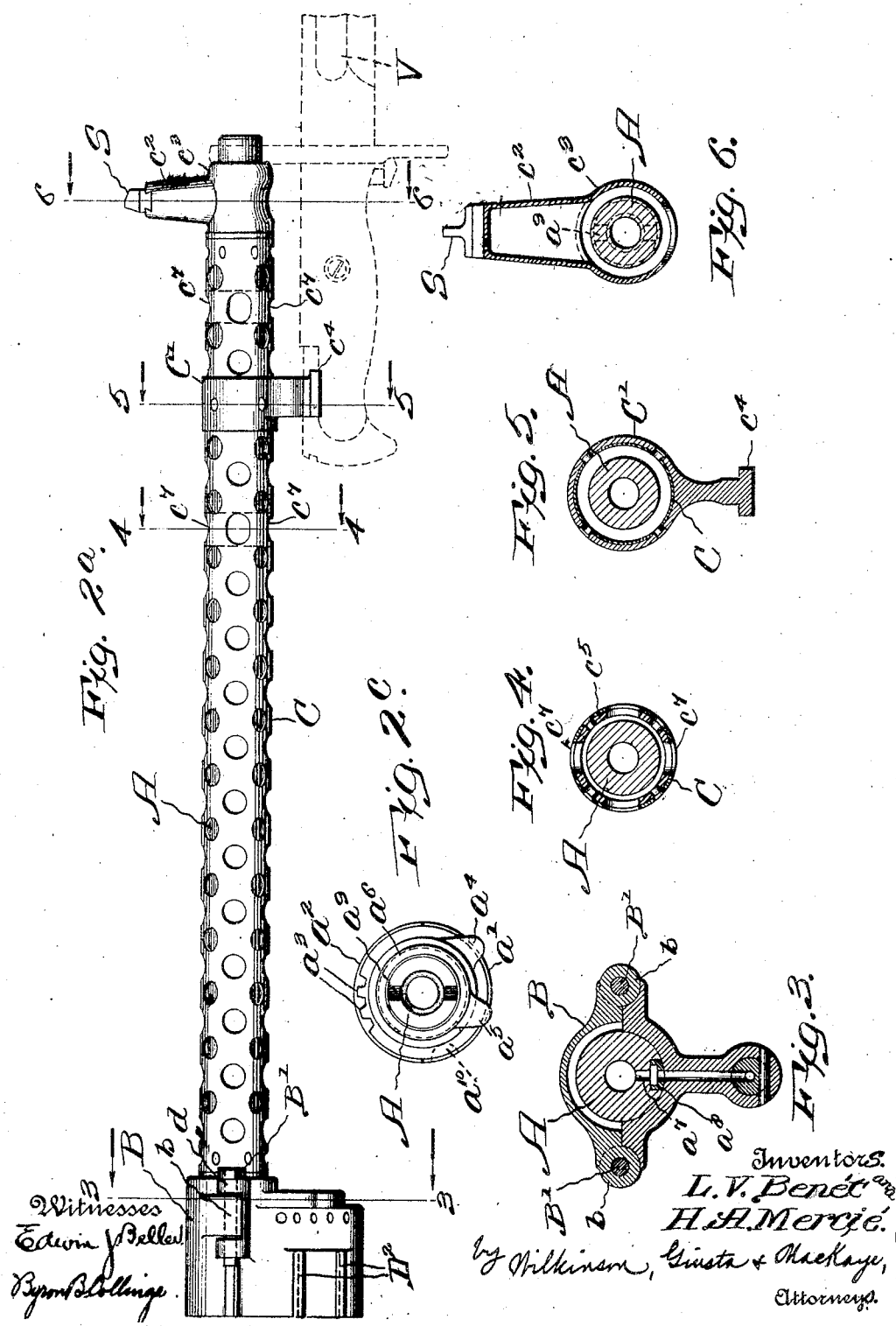

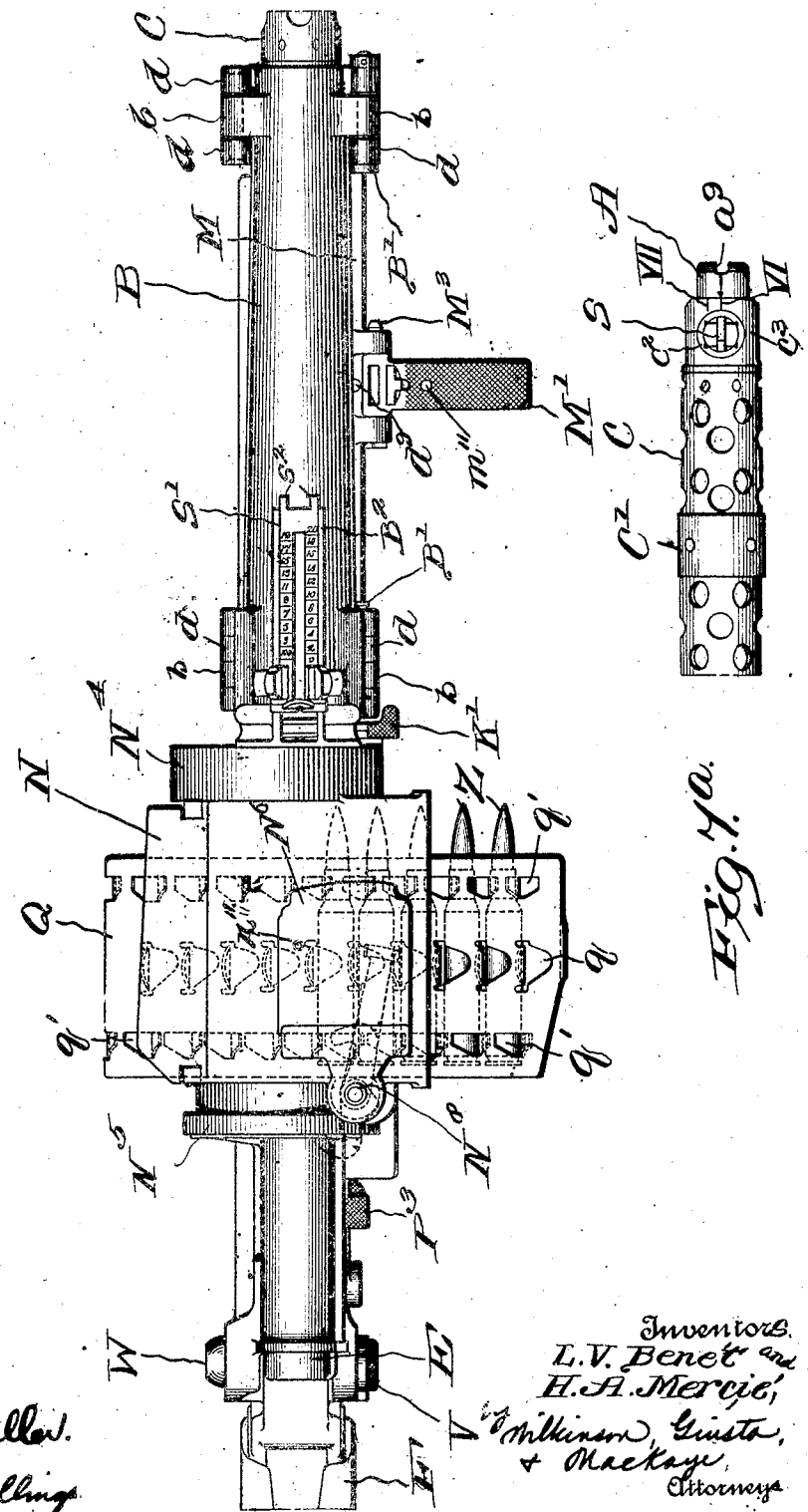

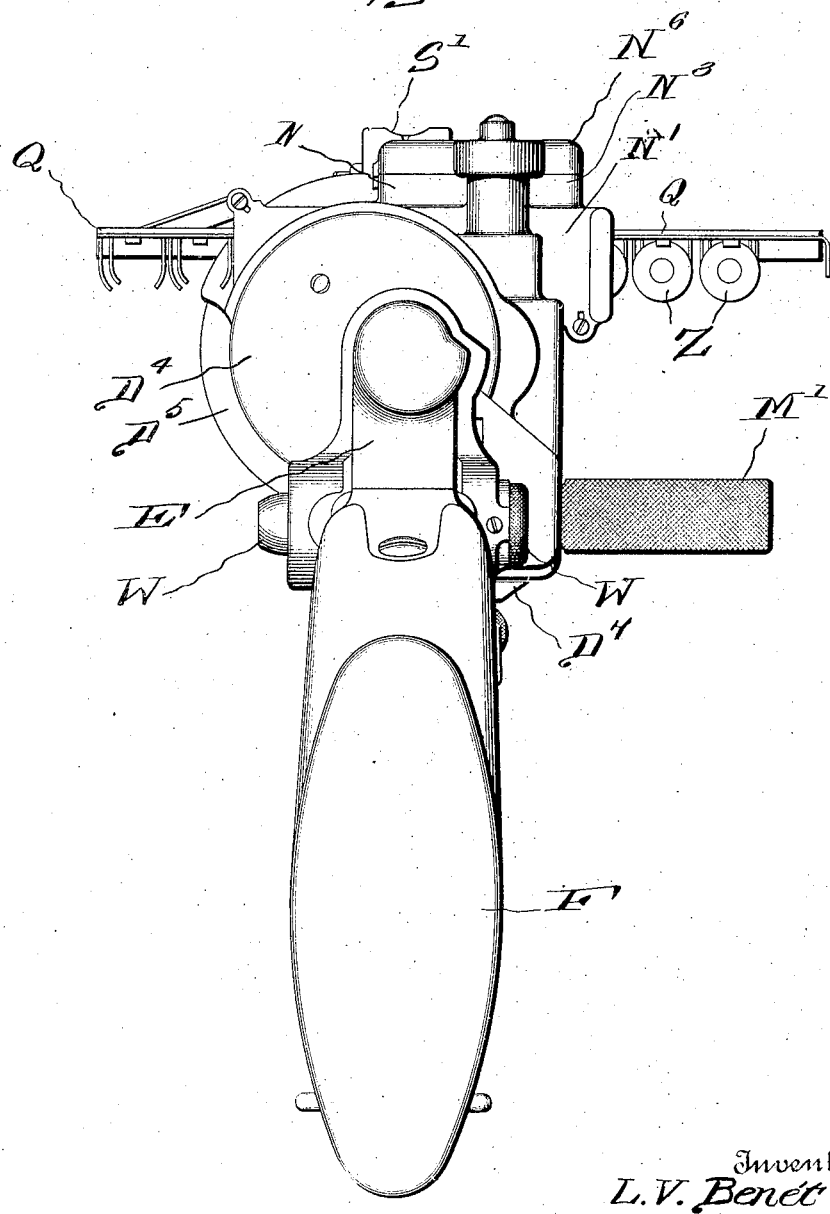

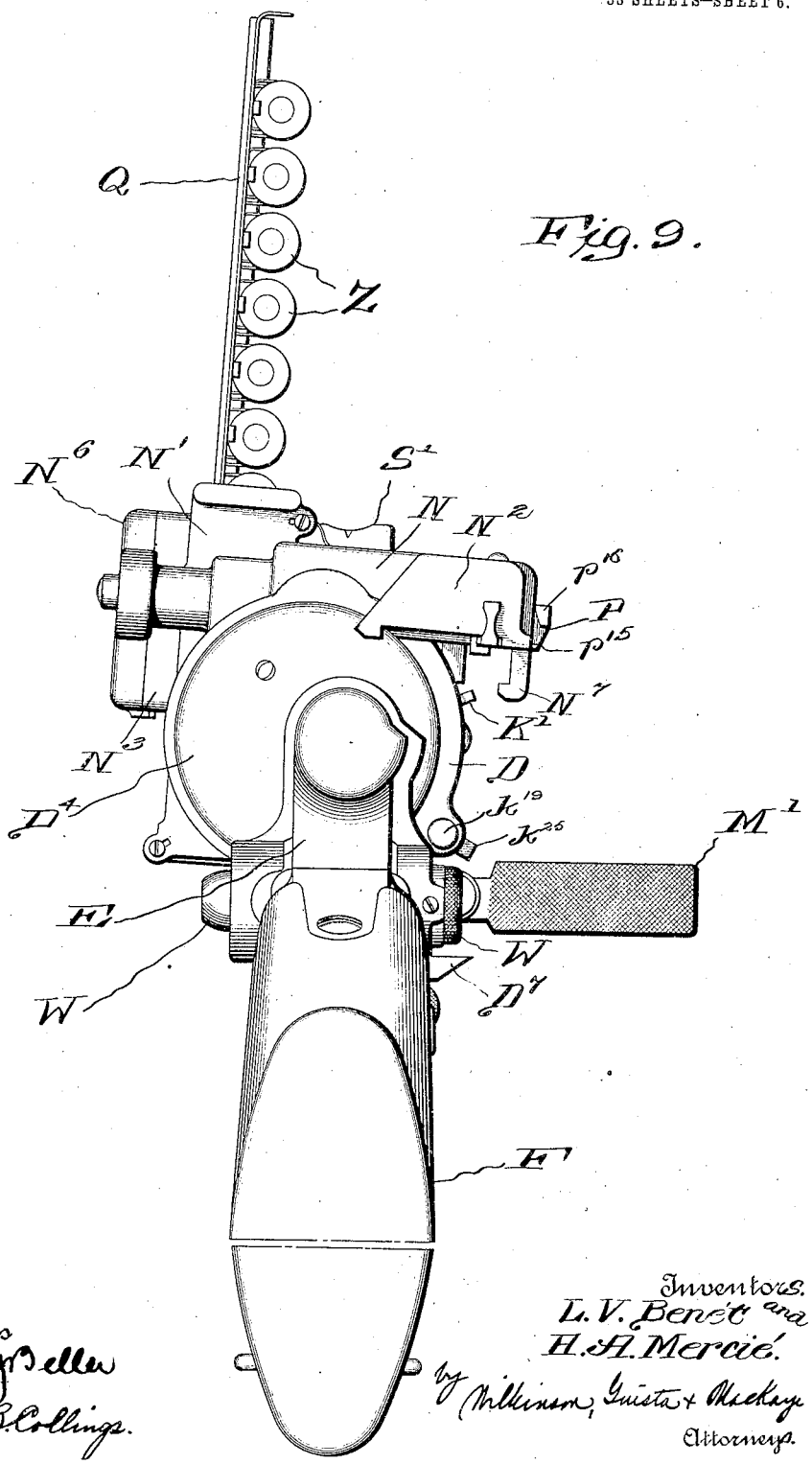

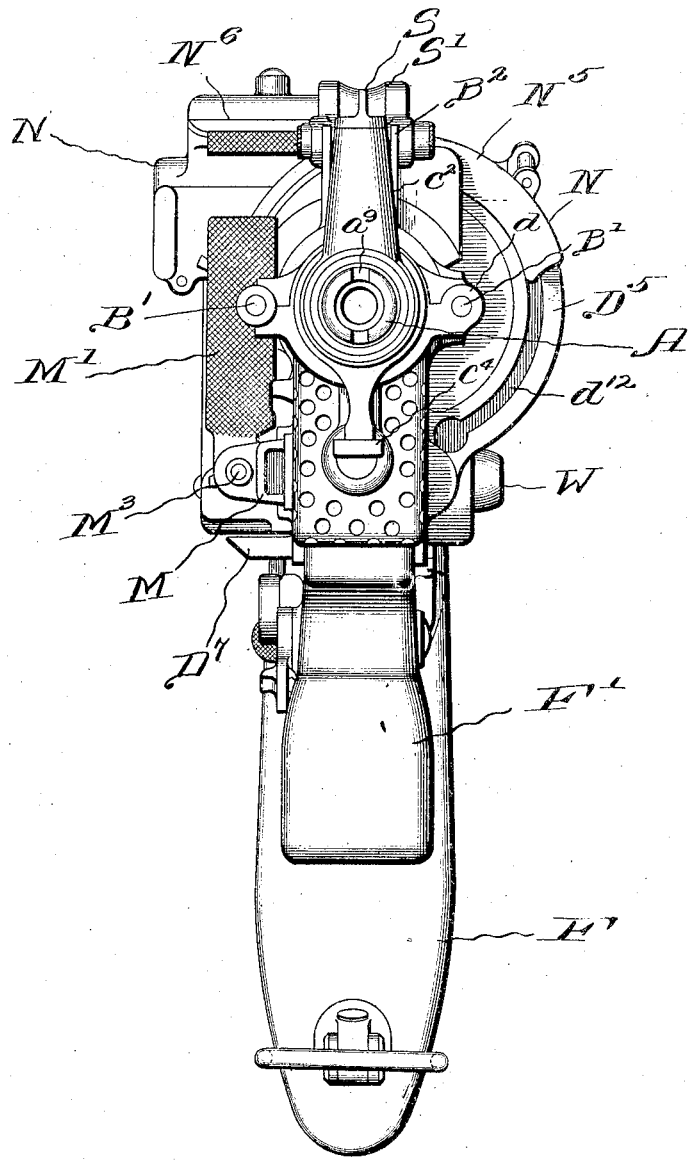

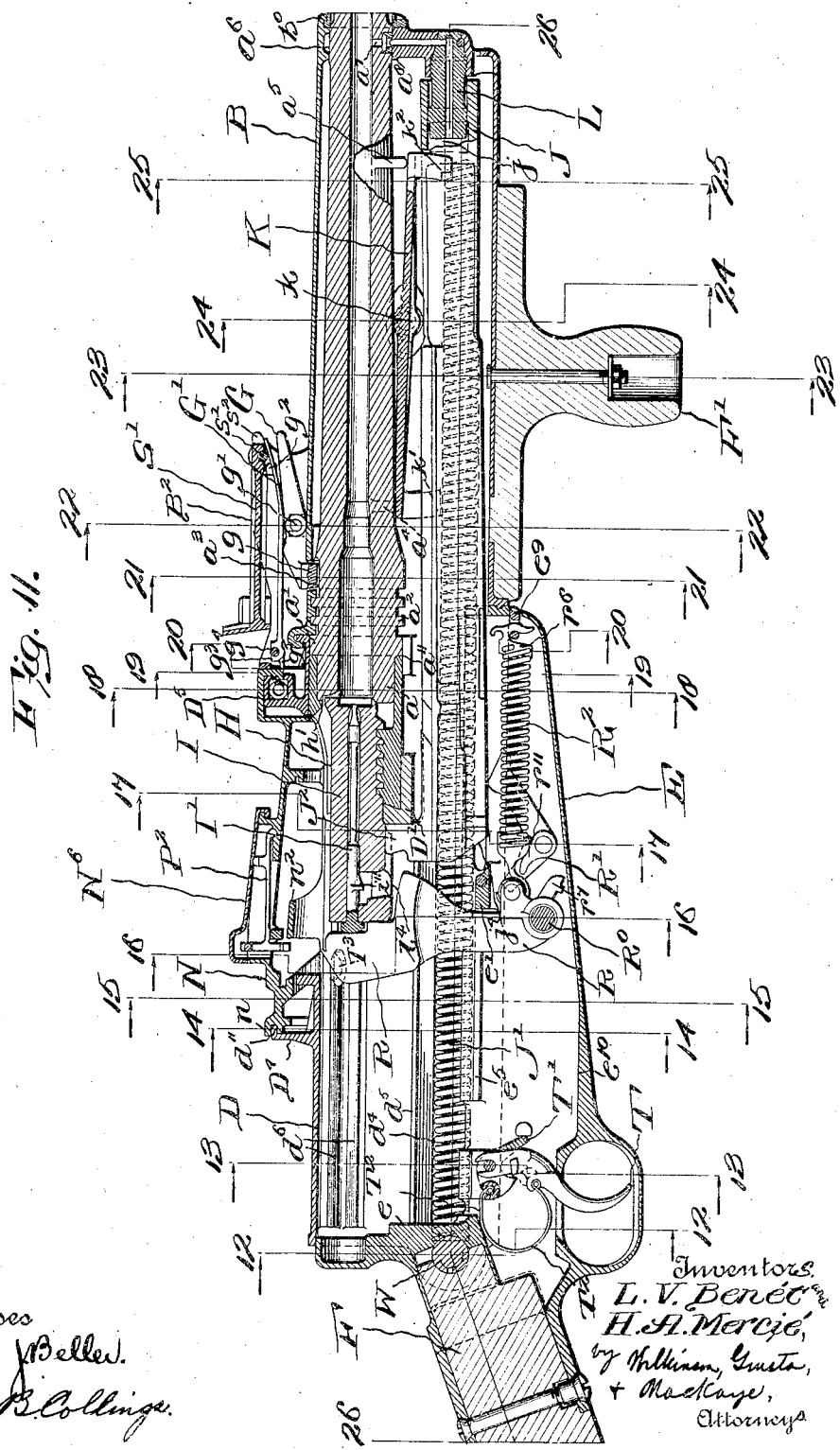

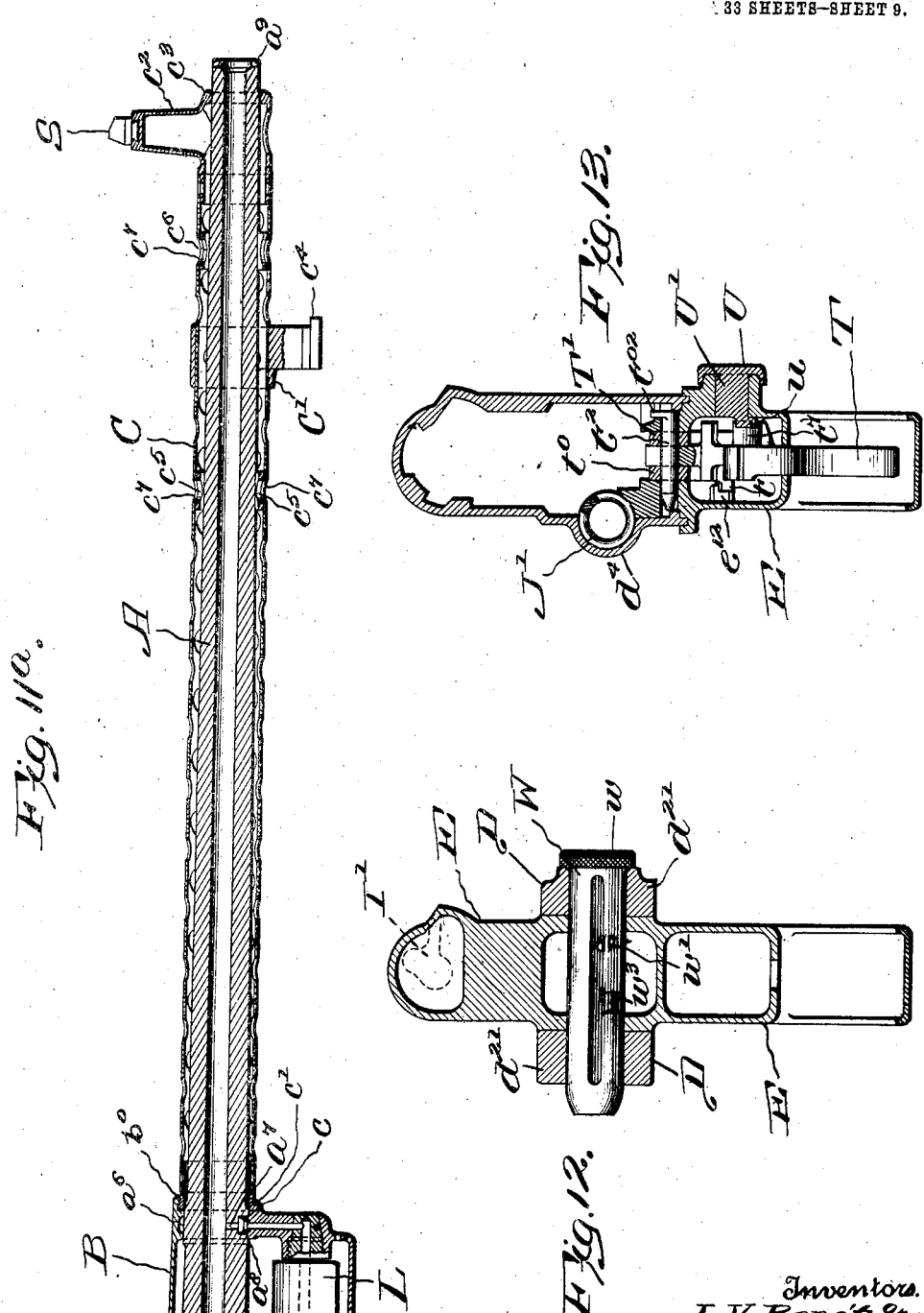

L. V. BENÉT & H. A. MERCIÉ.
AUTOMATIC SHOULDER RIFLE.
APPLICATION FILED DEC. 27, 1913.
1,125,937.
Patented Jan. 26, 1915.
33 SHEETS—SHEET 10.
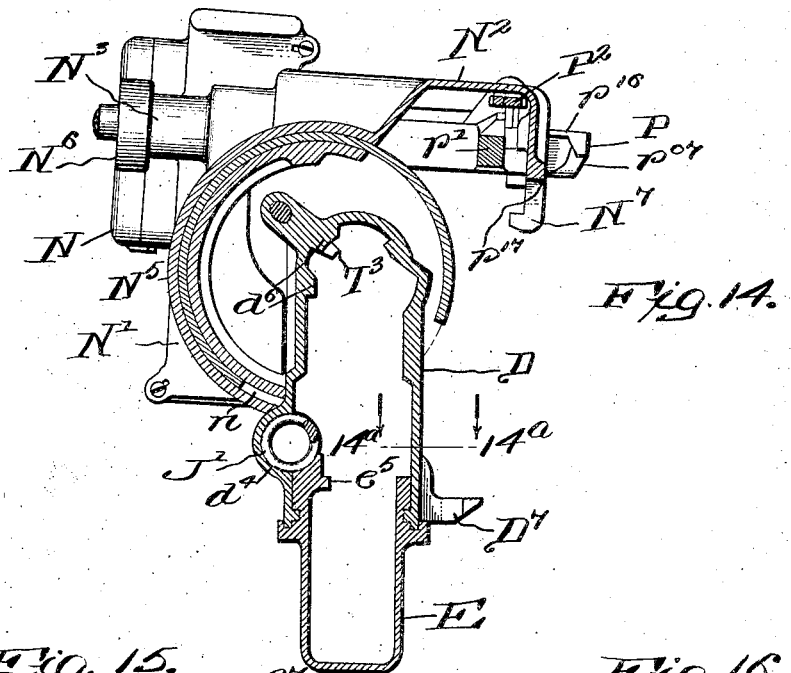
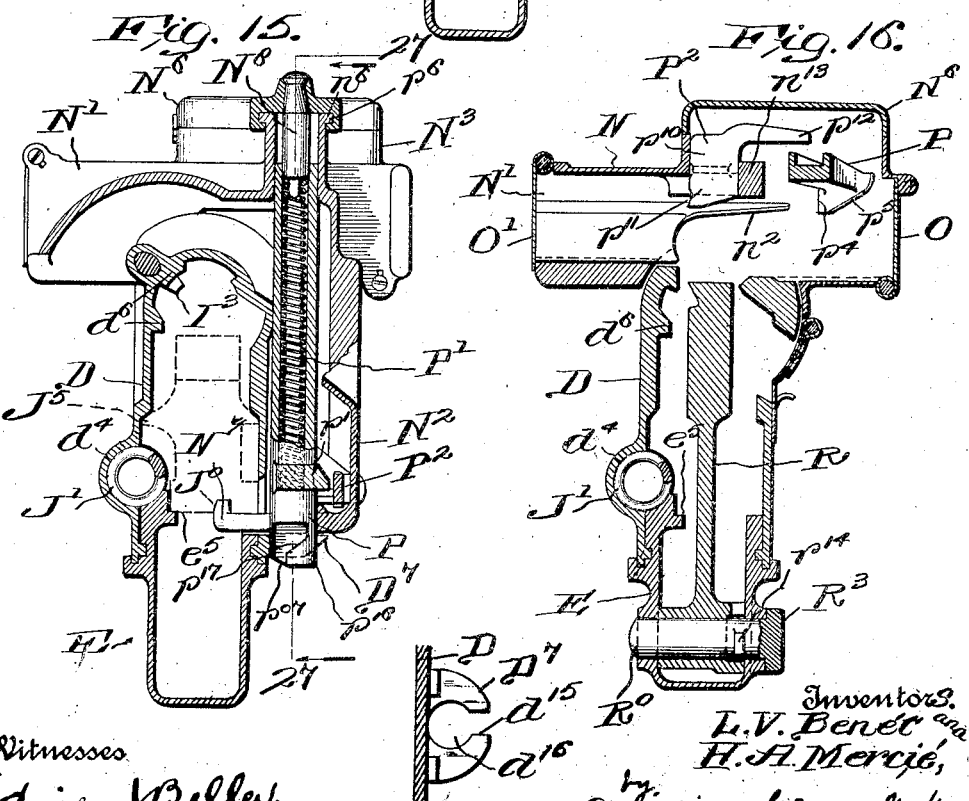

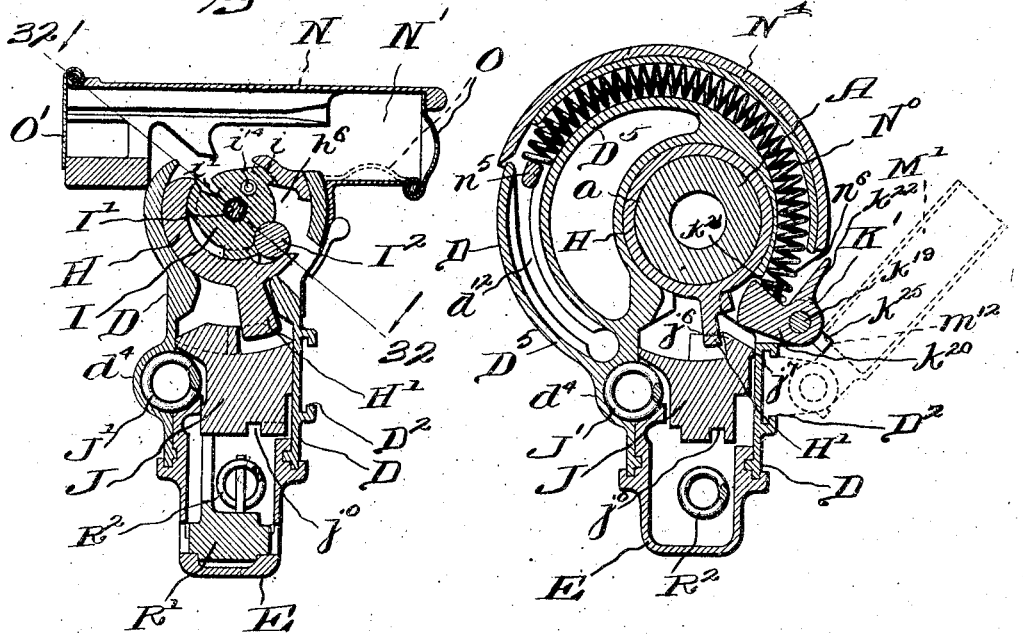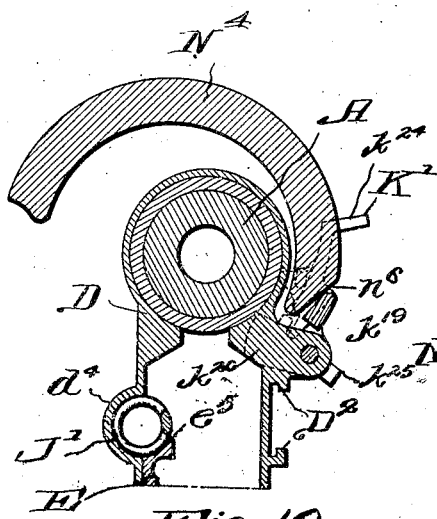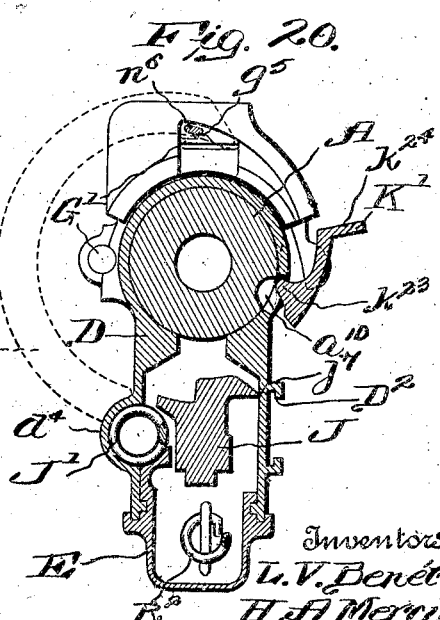

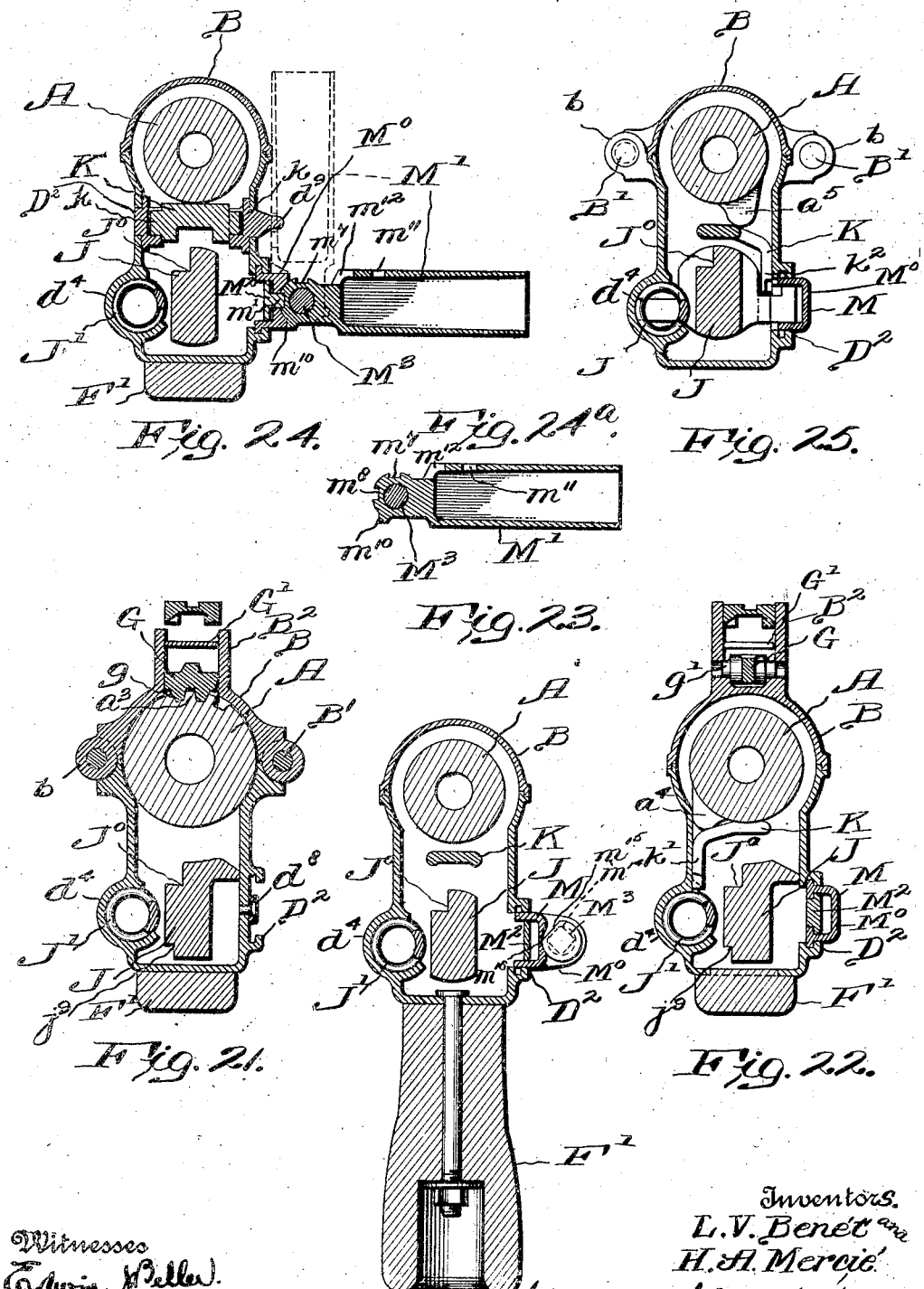

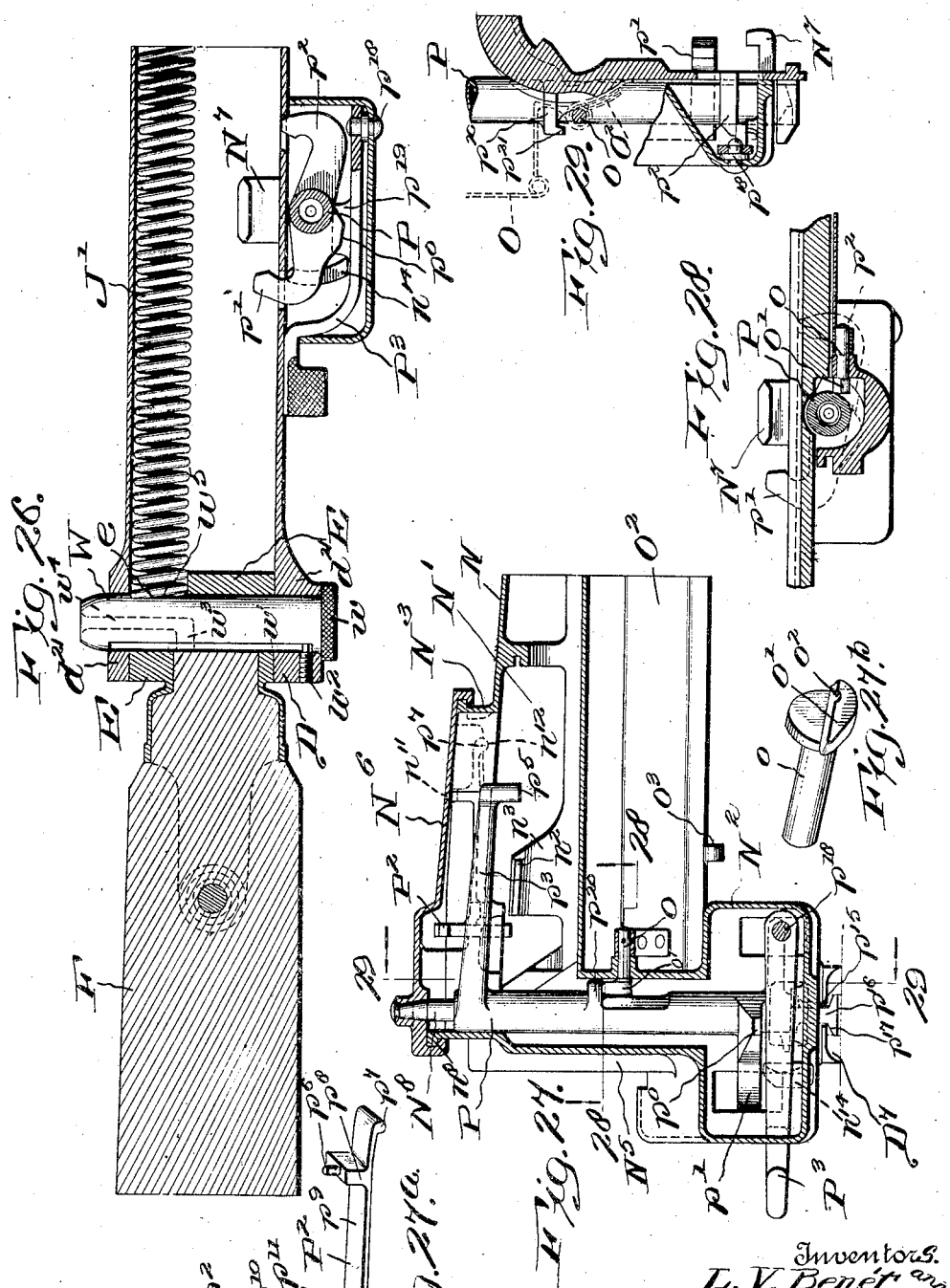

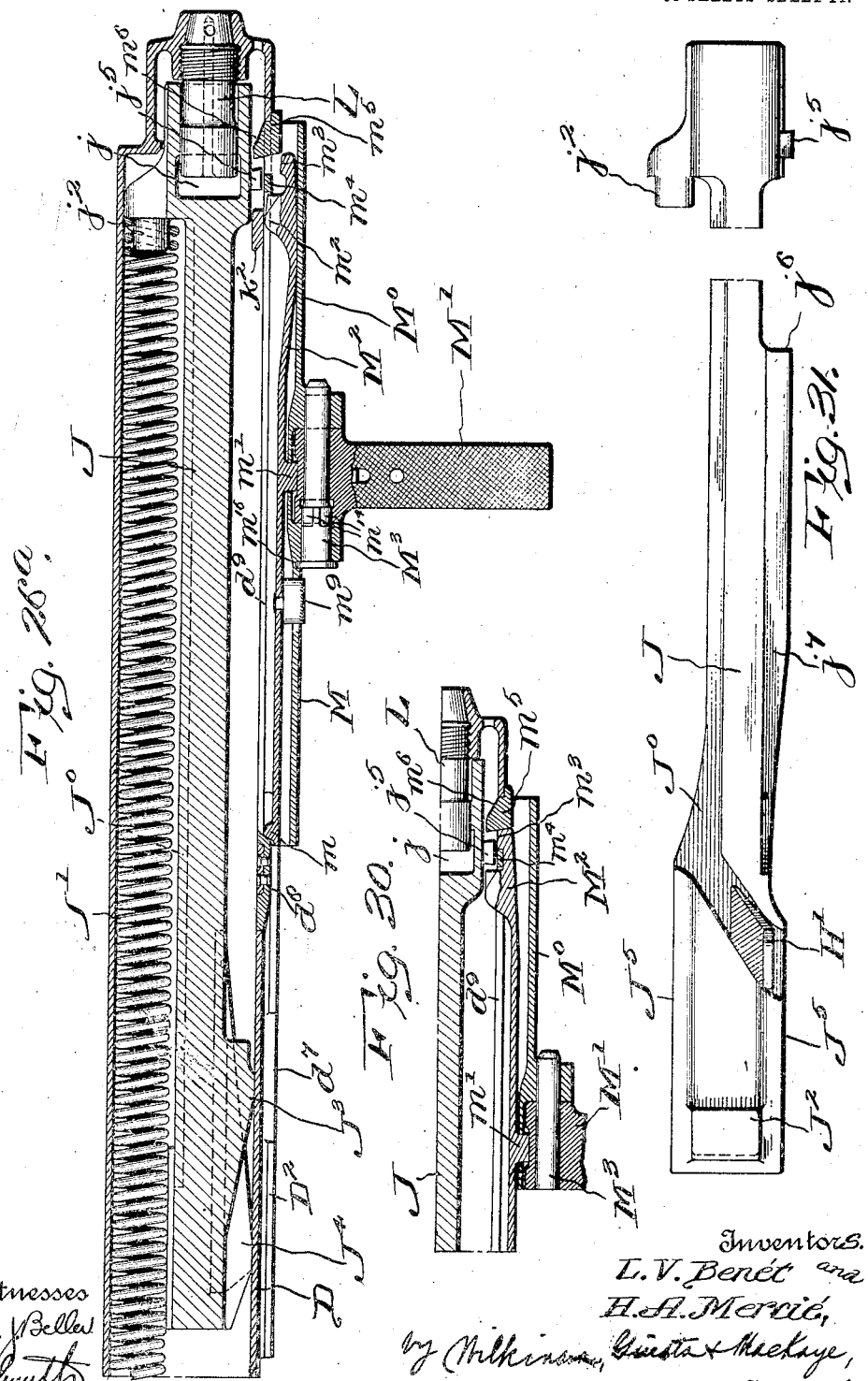

L. V. BENÉT & H. A. MERCIÉ.
AUTOMATIC SHOULDER RIFLE.
APPLICATION FILED DEC. 27, 1913.
1,125,937.
Patented Jan. 26, 1915.
33 SHEETS—SHEET 15.
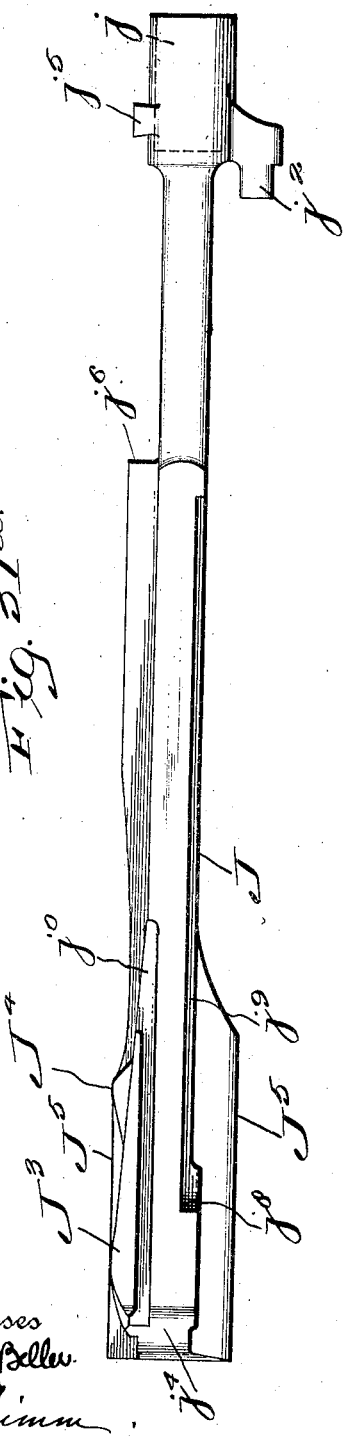
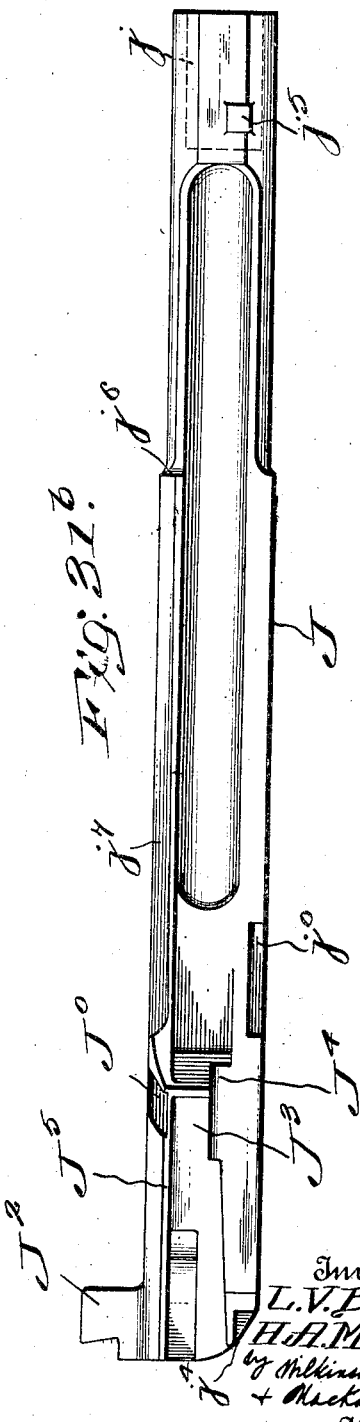

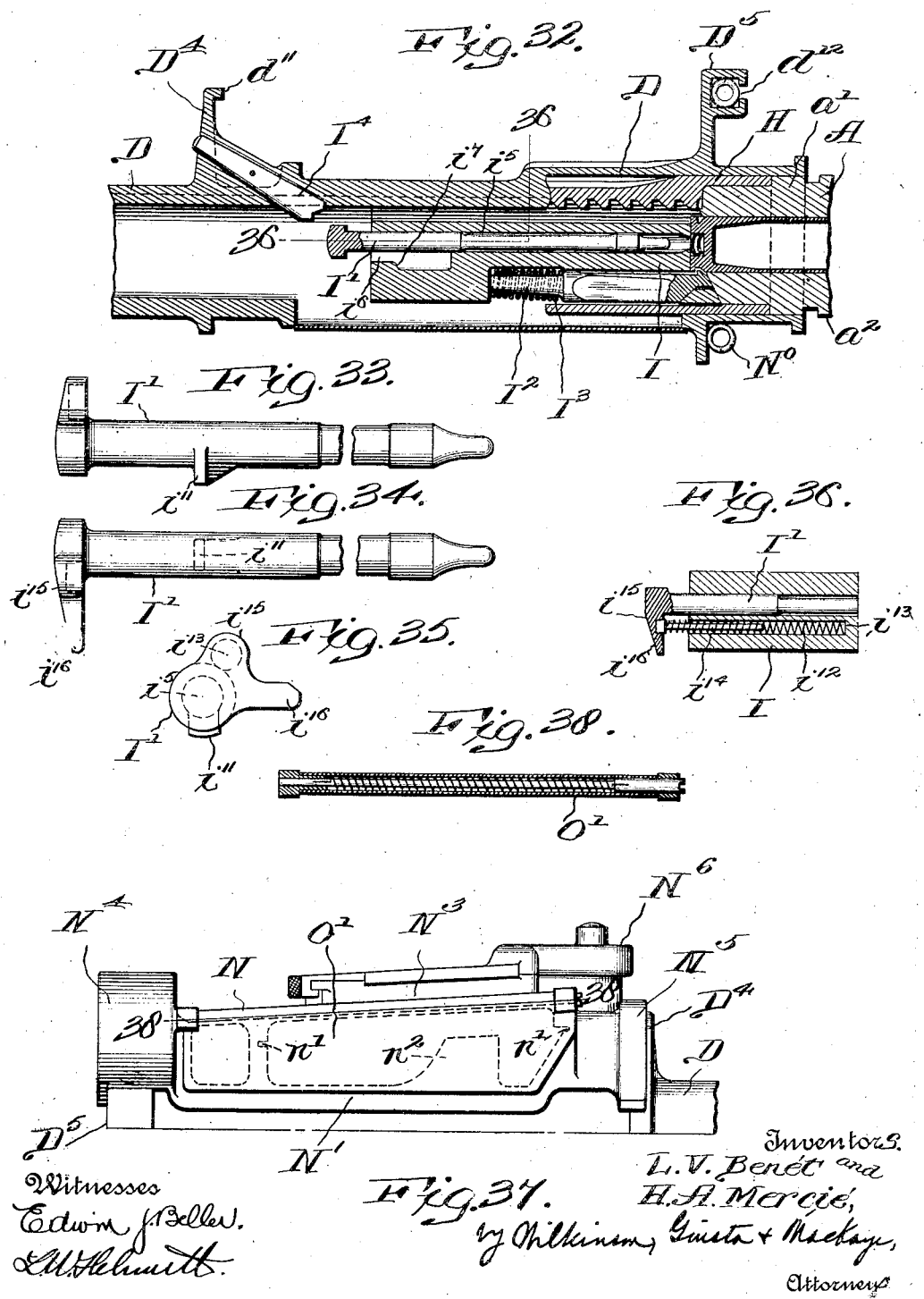

L. V. BENÉT & H. A. MERCIÉ.
AUTOMATIC SHOULDER RIFLE.
APPLICATION FILED DEC. 27, 1913.
1,125,937.
Patented Jan. 26, 1915.
33 SHEETS—SHEET 17.
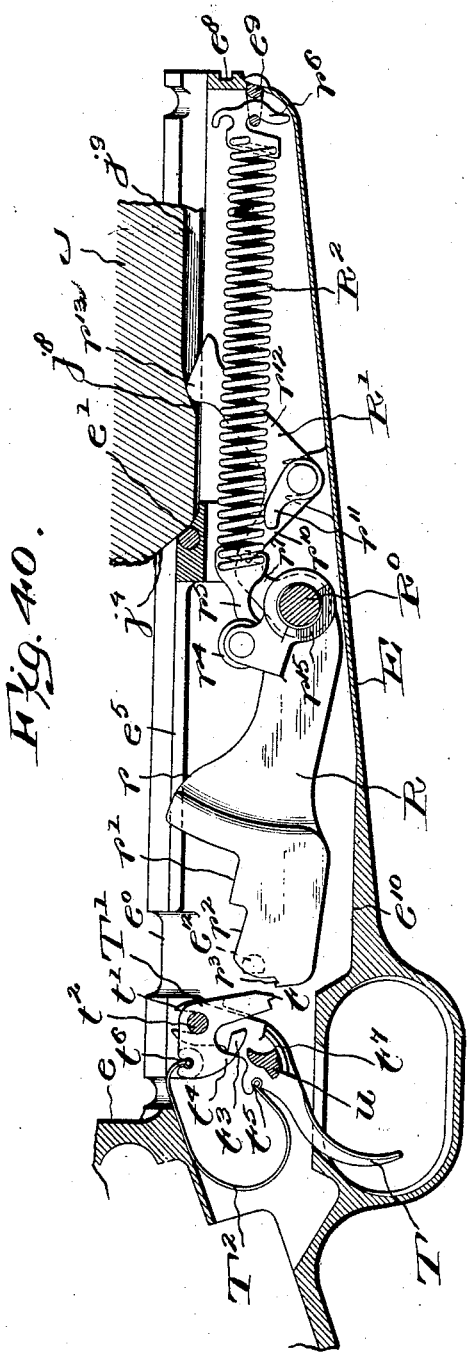
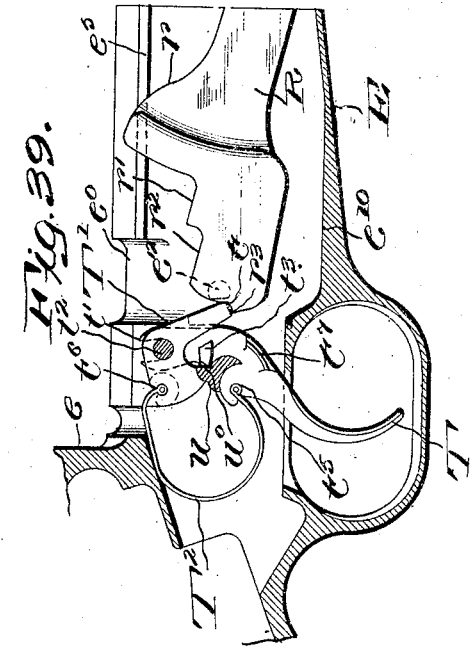
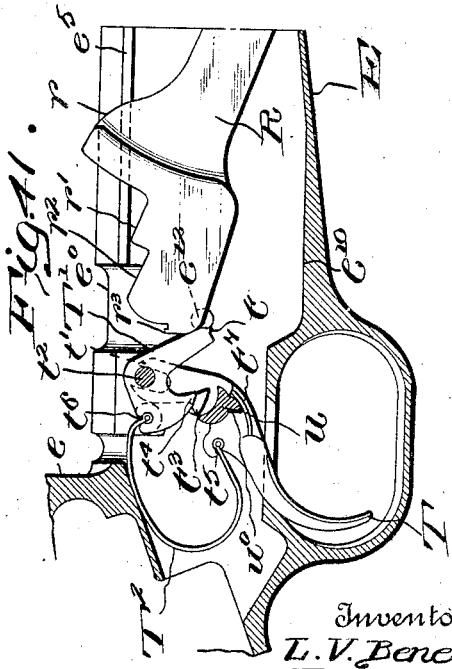

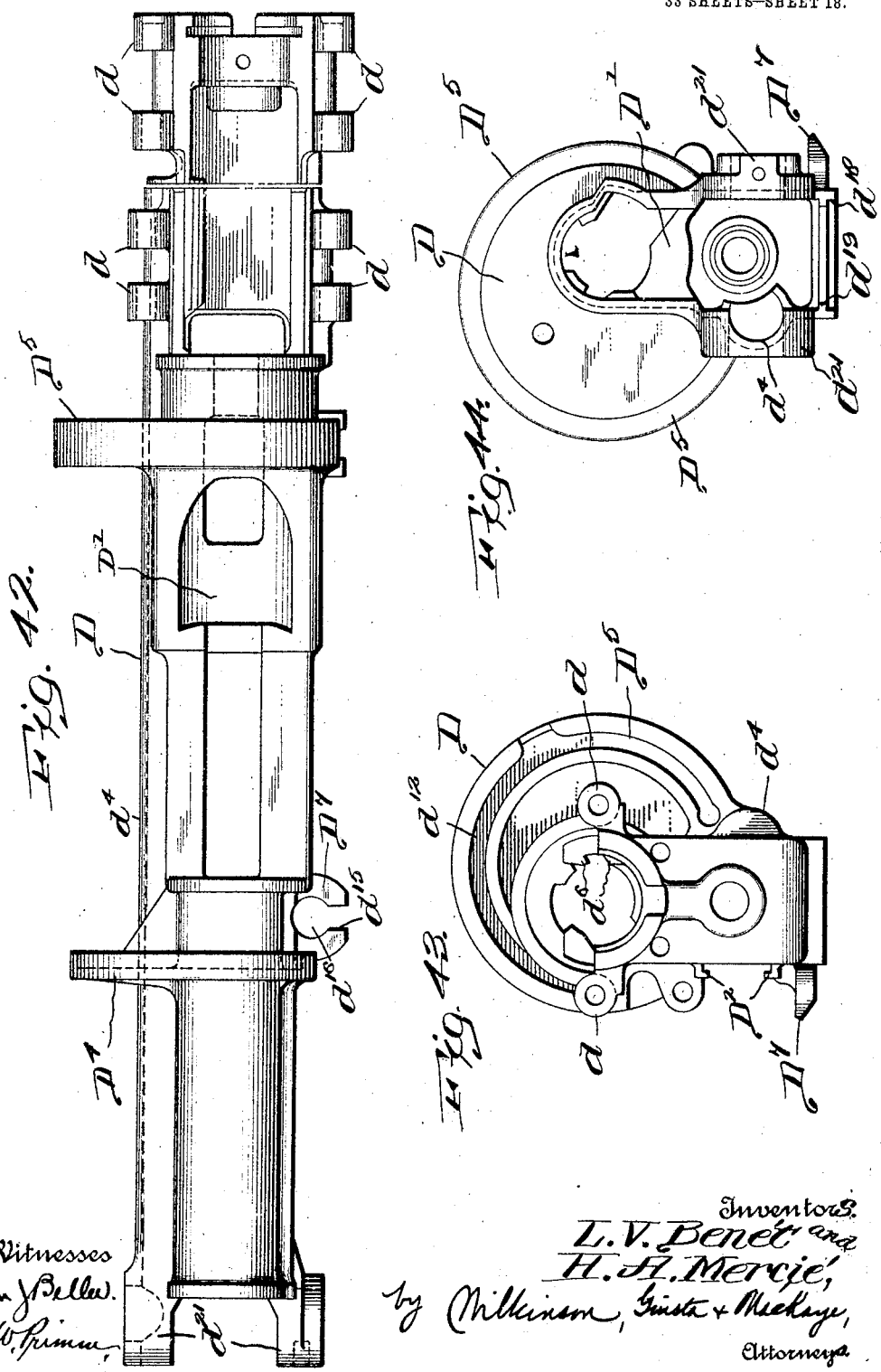

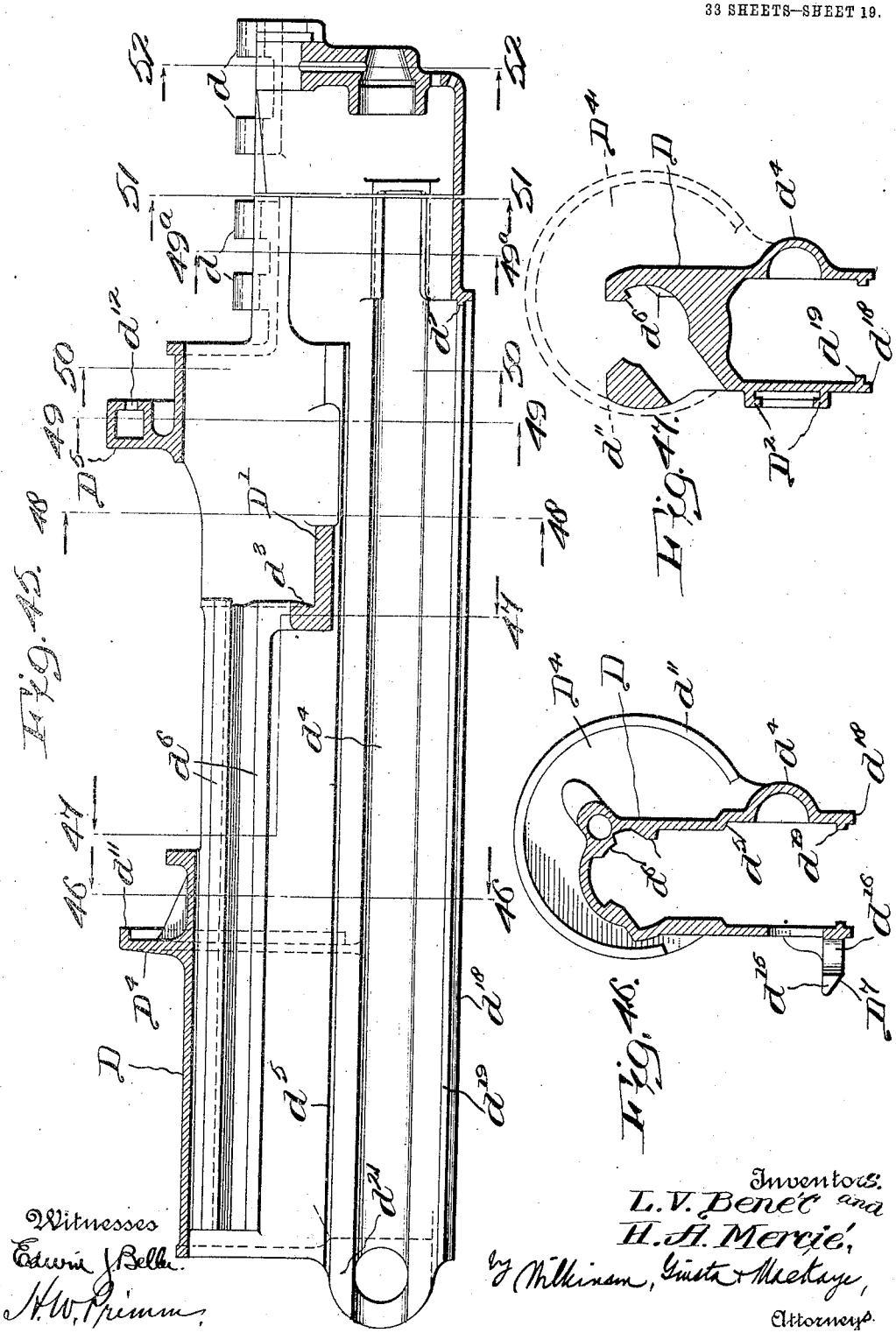

L. V. BENÉT & H. A. MERCIÉ.
AUTOMATIC SHOULDER RIFLE.
APPLICATION FILED DEC. 27, 1913.

1,125,937.

Patented Jan. 26, 1915.
33 SHEETS—SHEET 20.

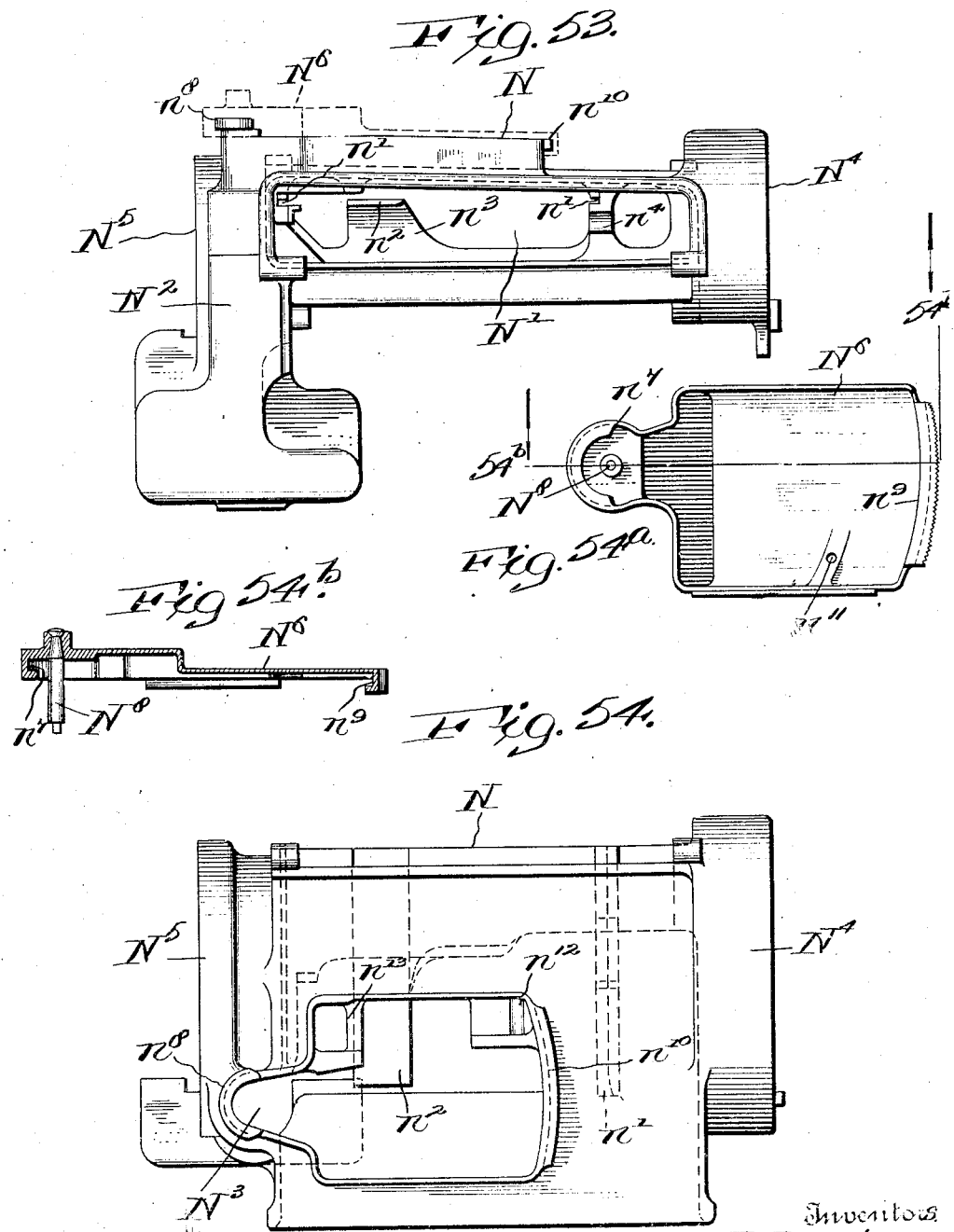

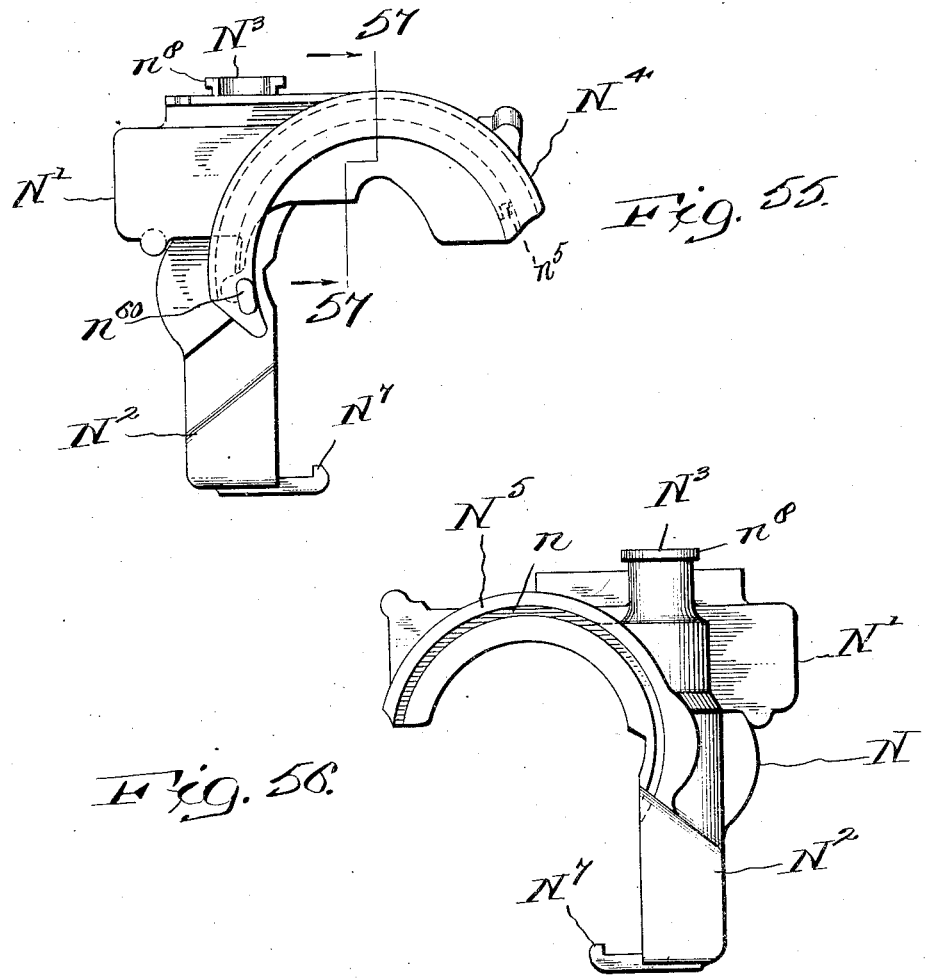
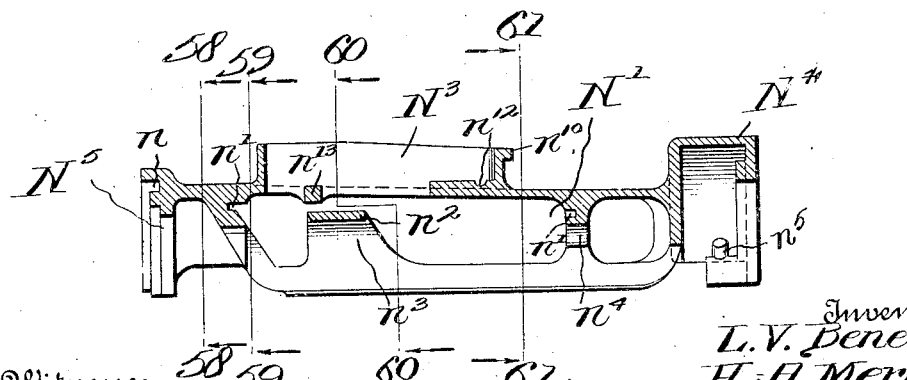

L. V. BENÉT & H. A. MERCIÉ.
AUTOMATIC SHOULDER RIFLE.
APPLICATION FILED DEC. 27, 1913.
1,125,937.
Patented Jan. 26, 1915.
33 SHEETS—SHEET 23.
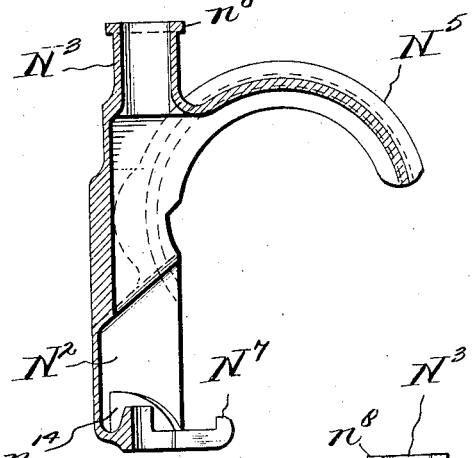
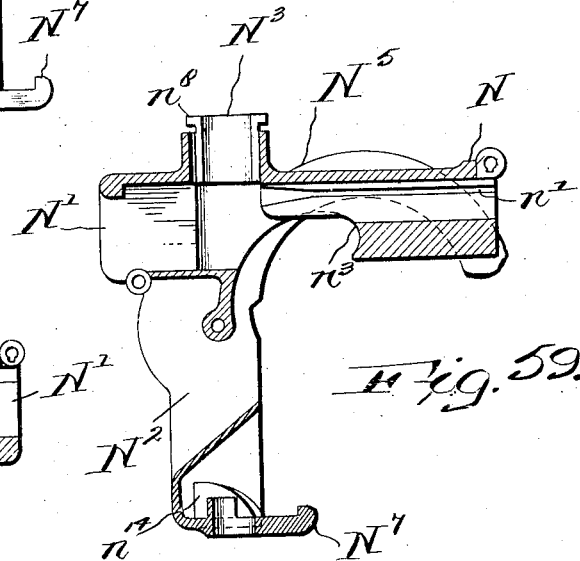
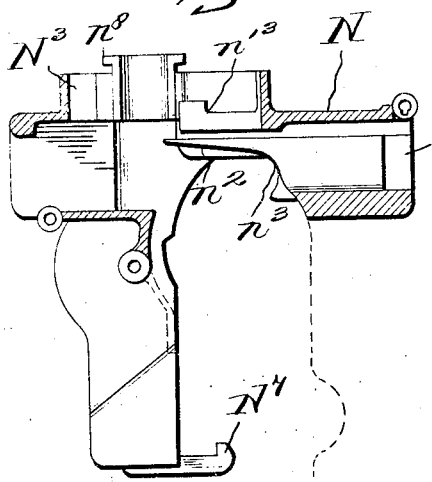
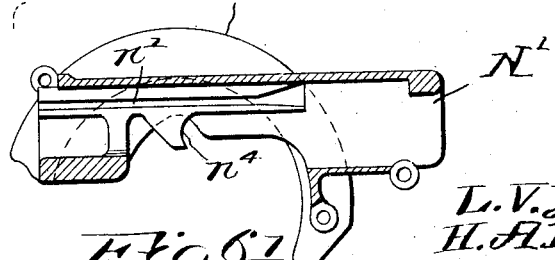

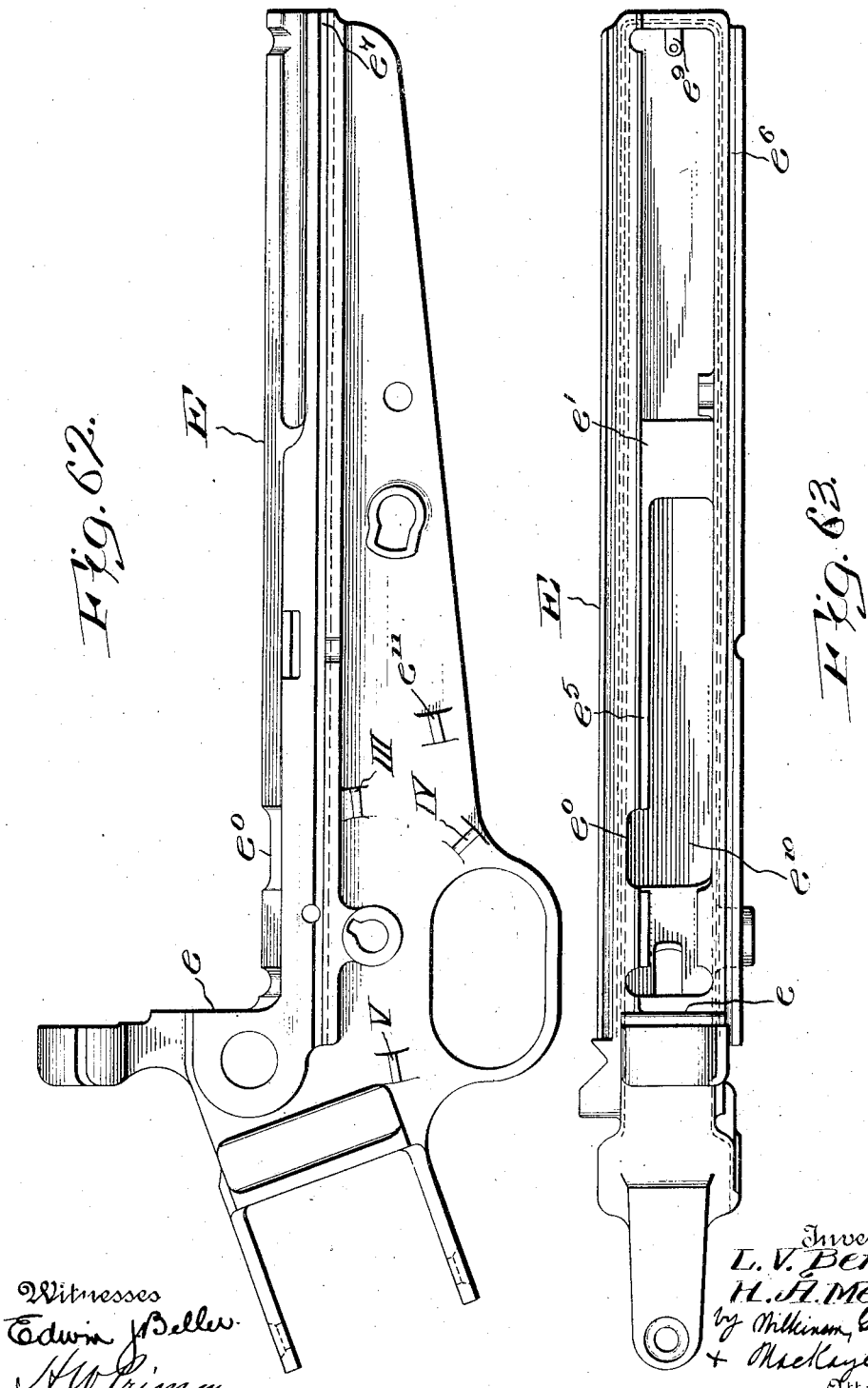

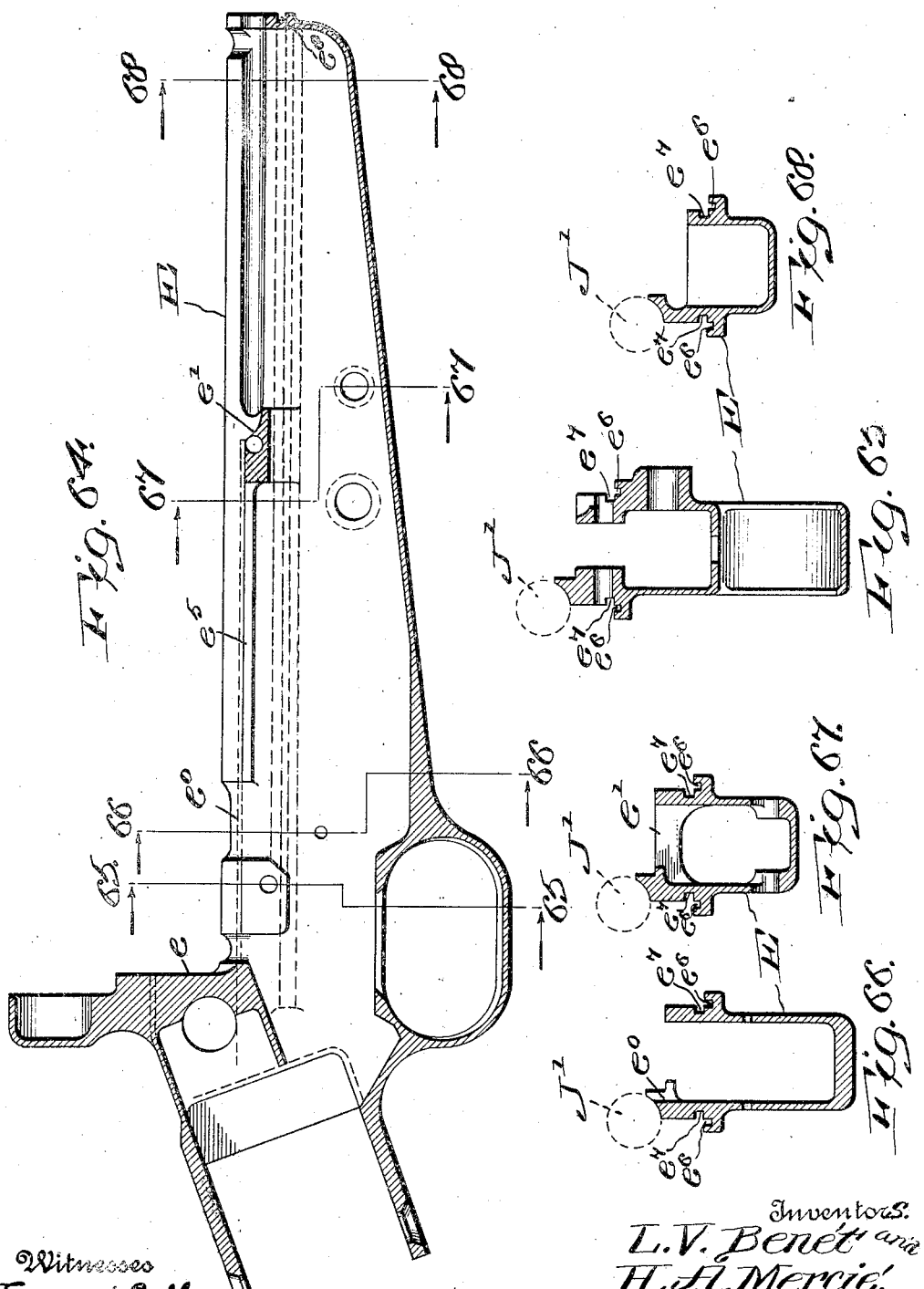

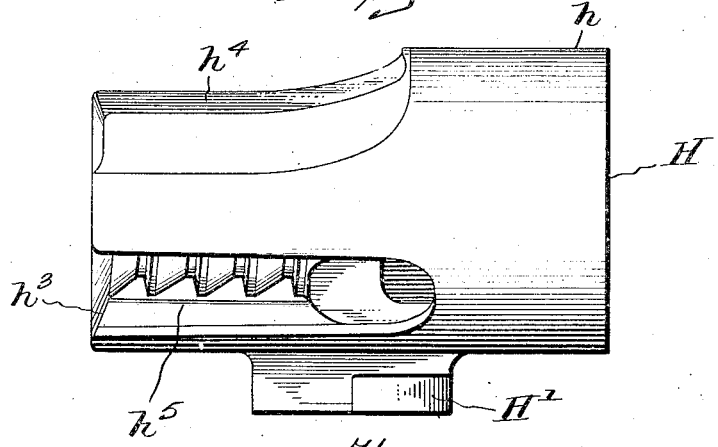
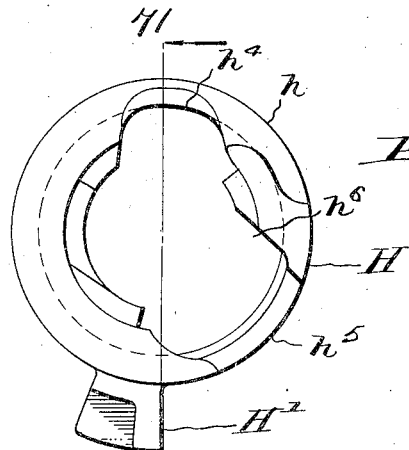
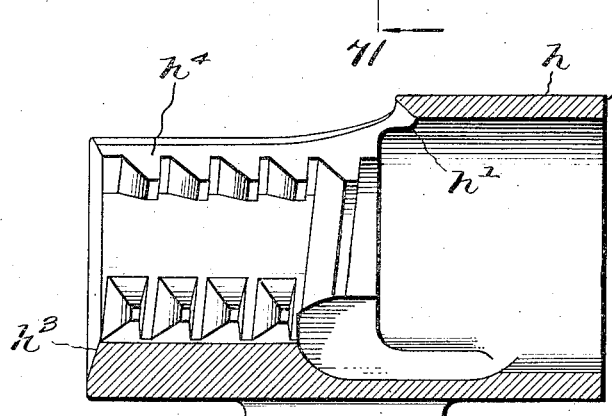

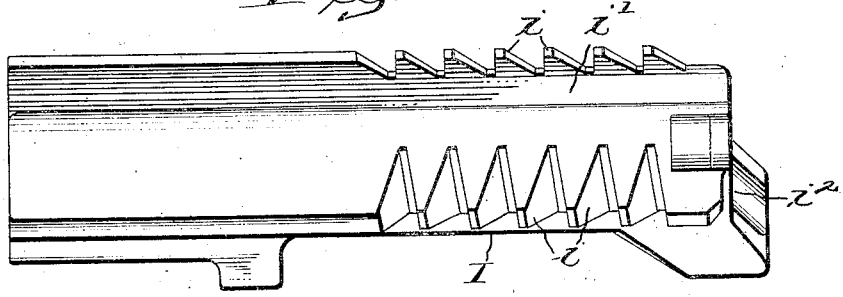
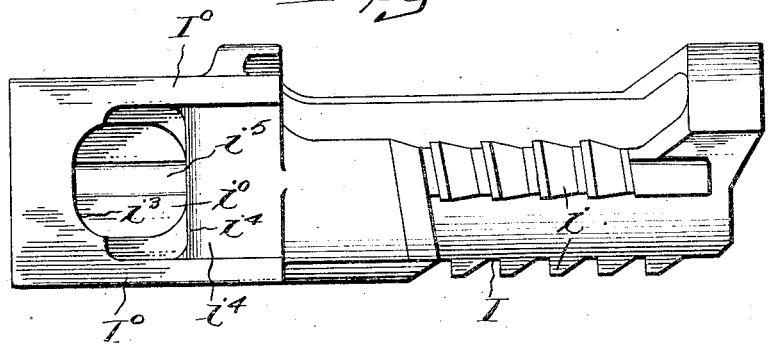
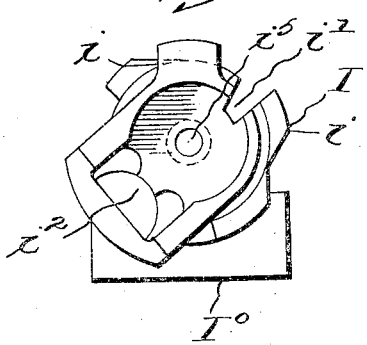 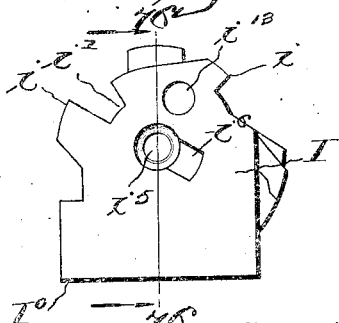

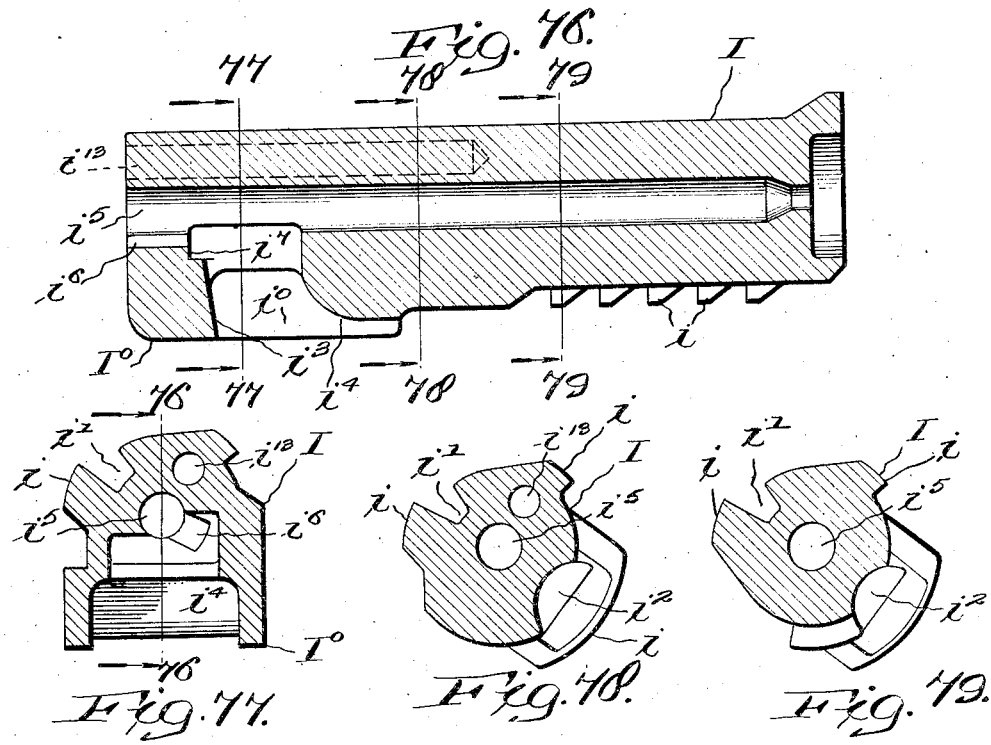

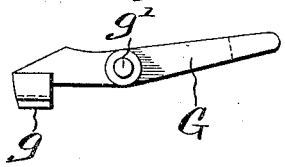
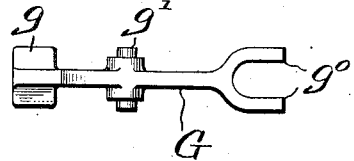
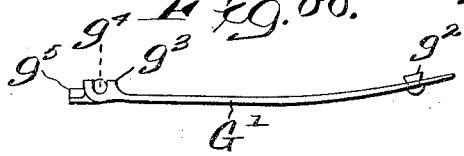
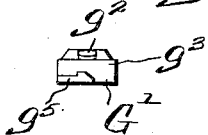
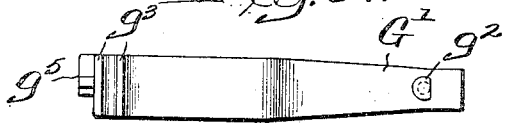
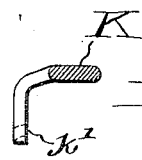
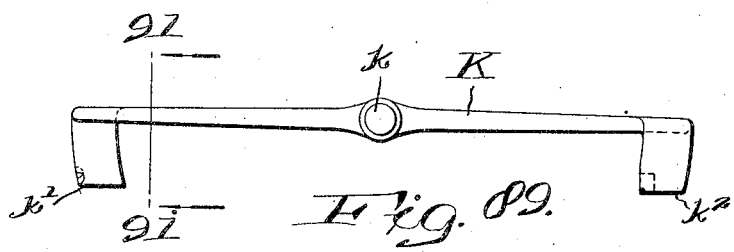
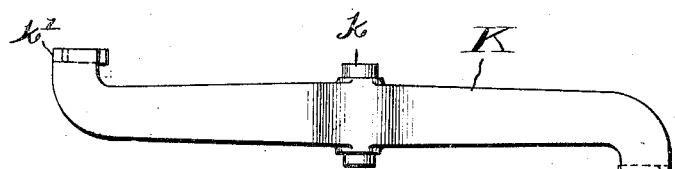

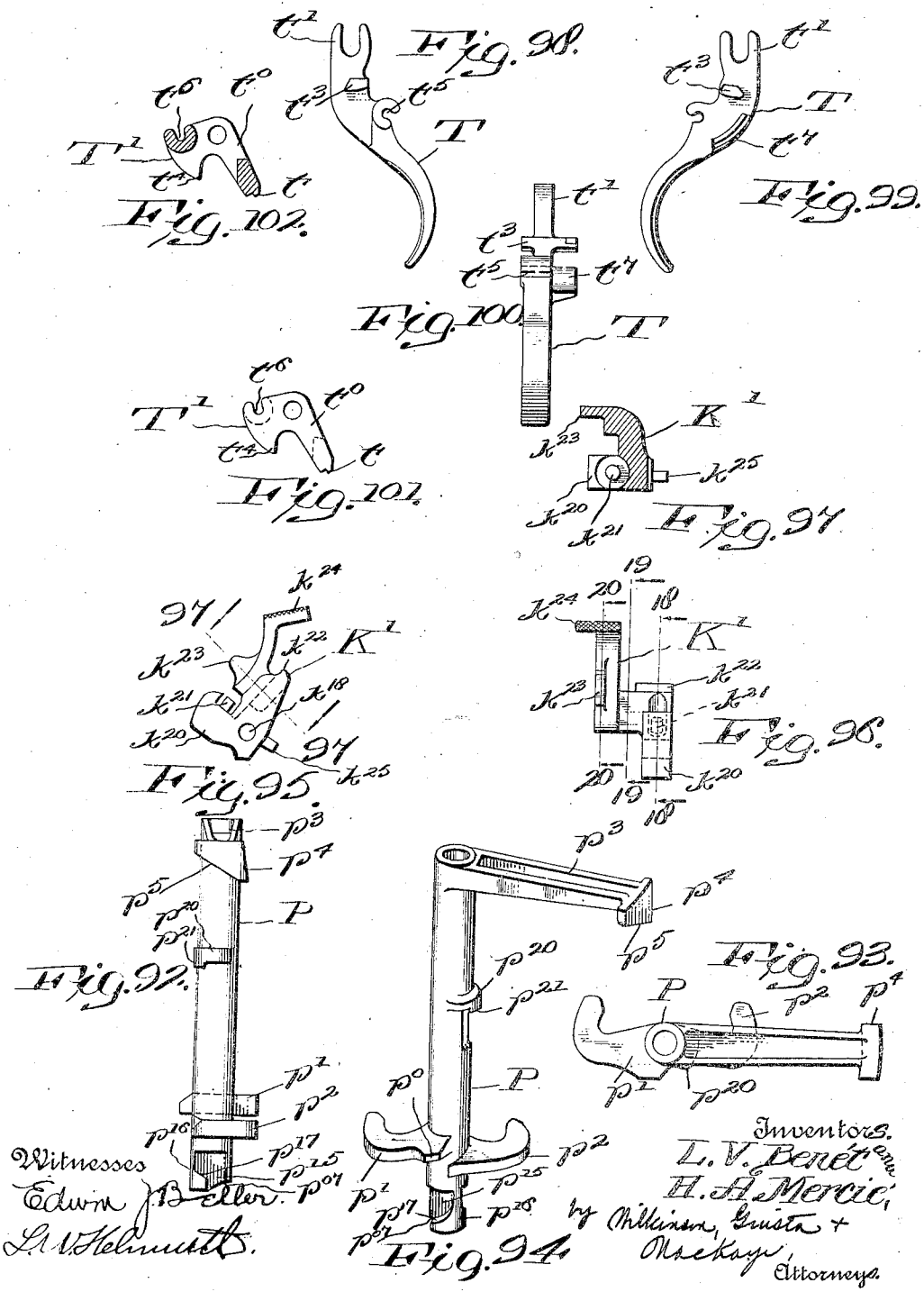

L. V. BENÉT & H. A. MERCIÉ.
AUTOMATIC SHOULDER RIFLE.
APPLICATION FILED DEC. 27, 1913.
1,125,937.
Patented Jan. 26, 1915.
33 SHEETS—SHEET 31.
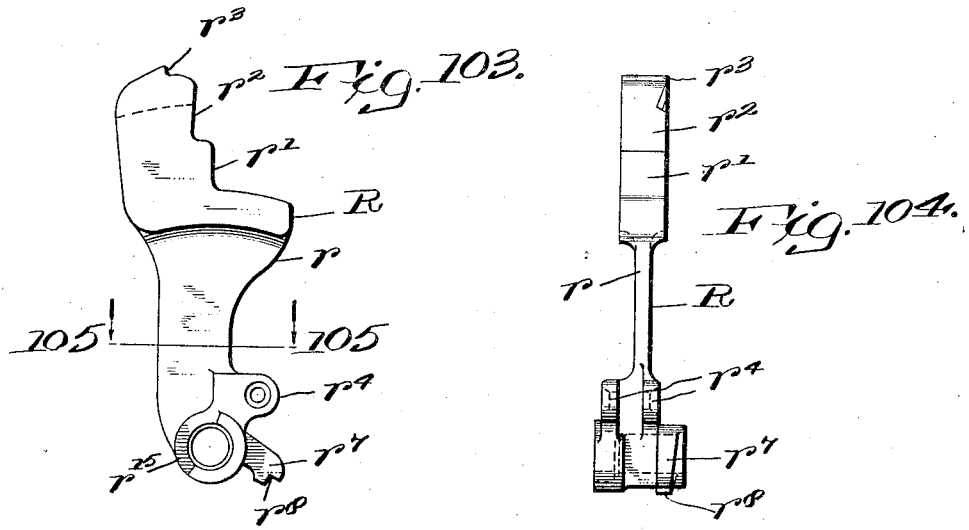
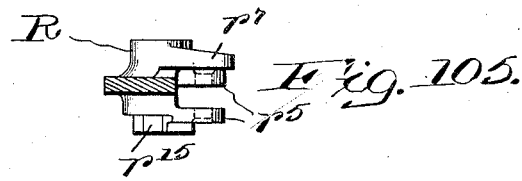
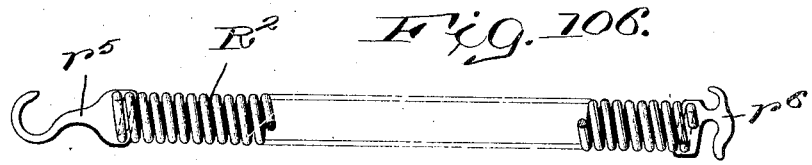
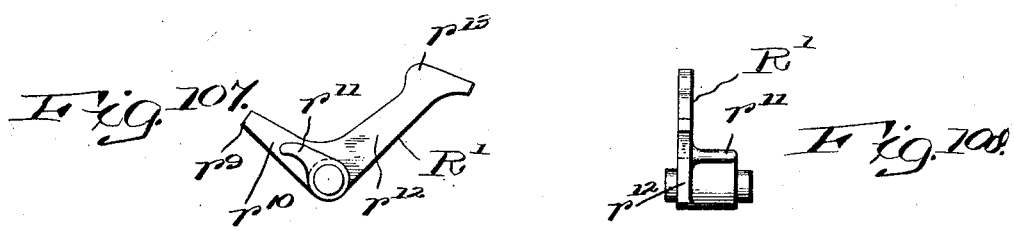
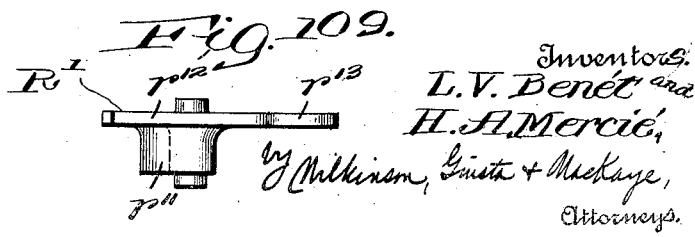

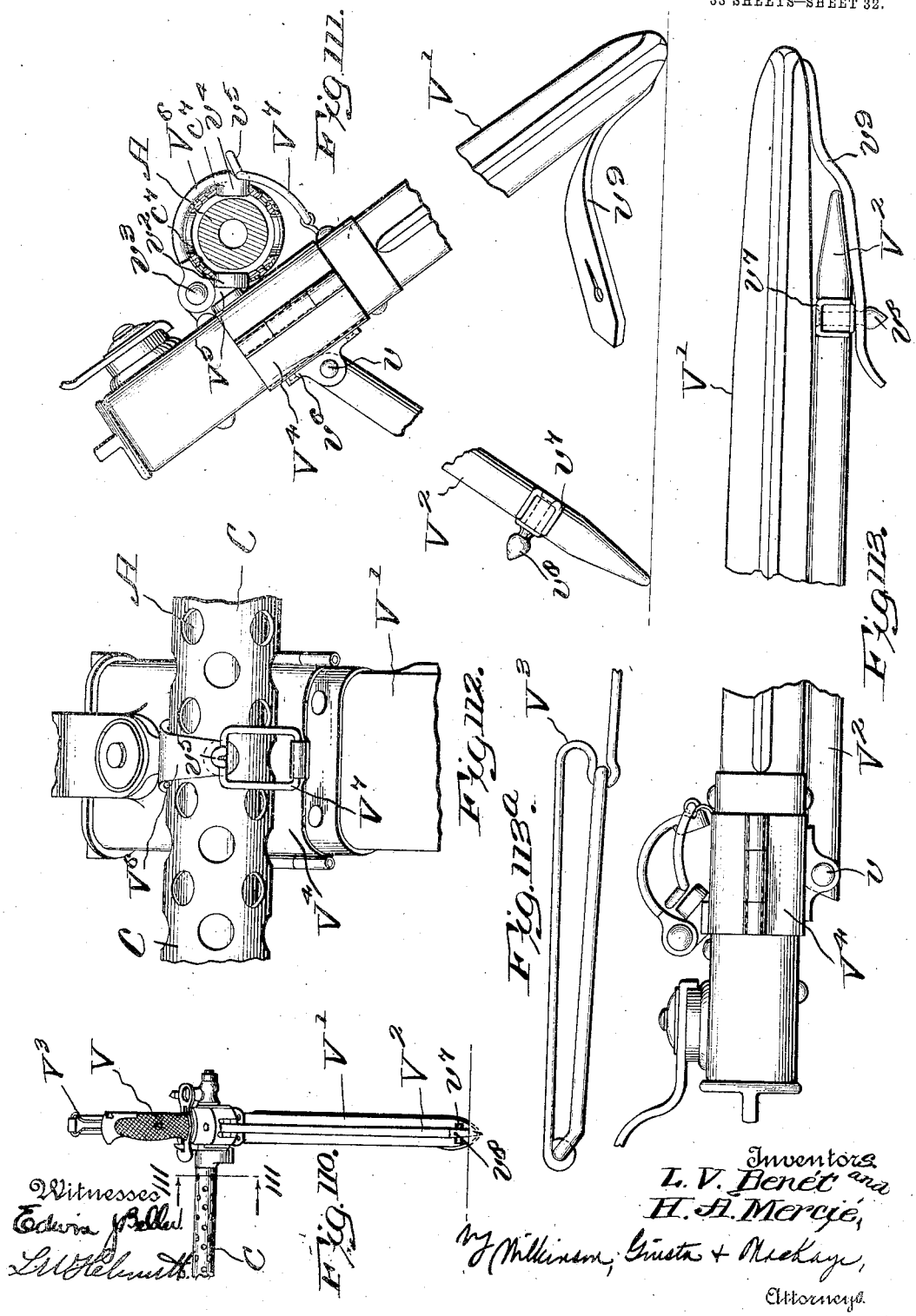

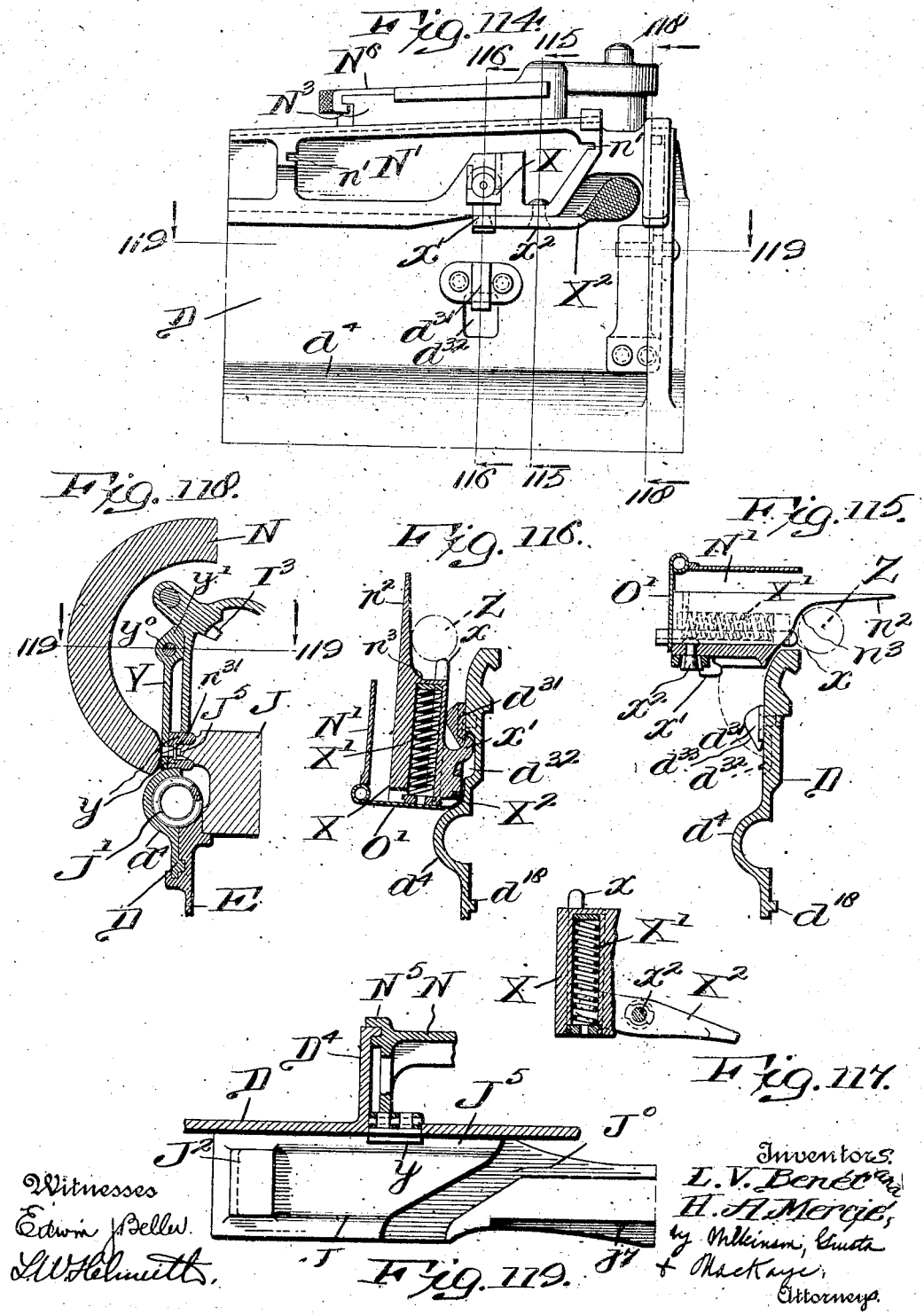

UNITED STATES PATENT OFFICE.

LAURENCE V. BENÉT AND HENRI A. MERCIÉ, OF PARIS, FRANCE.

AUTOMATIC SHOULDER-RIFLE.

1,125,937.  Specification of Letters Patent.  Patented Jan. 26, 1915.

Application filed December 27, 1913. Serial No. 809,064.

*To all whom it may concern:*

Be it known that we, LAURENCE V. BENÉT and HENRI A. MERCIÉ, citizens of the United States and France, respectively, residing at Paris, France, have invented certain new and useful Improvements in Automatic Shoulder-Rifles; and we do hereby declare the following to be a full, clear, and exact description of the invention, such as will enable others skilled in the art to which it appertains to make and use the same.

Our present invention relates to that class of automatic firearms that can be employed as desired, either as an ordinary gun operated by hand and fired from the shoulder, or as a repeating rifle operated by hand and fired from the shoulder, or as a semi-automatic gun operated by the powder gases and fired also from the shoulder, or finally as an automatic gun mounted upon its support.

It is especially intended to provide a comparatively light and efficient gun, which may be used either as a gas-operated gun, or as an ordinary rifle, and is especially adapted to be fired from the shoulder of the soldier when lying down.

The invention consists also in improved breech mechanism, improved firing mechanism, improved feed mechanism, improved cartridge case extractor mechanism, the improved support for the muzzle of the gun, and in various other details of construction, and combinations and constructions of parts hereinafter more fully described and claimed.

The invention will be more fully understood by reference to the accompanying drawings in which similar parts are indicated by similar reference symbols throughout the several views.

Figure 49:
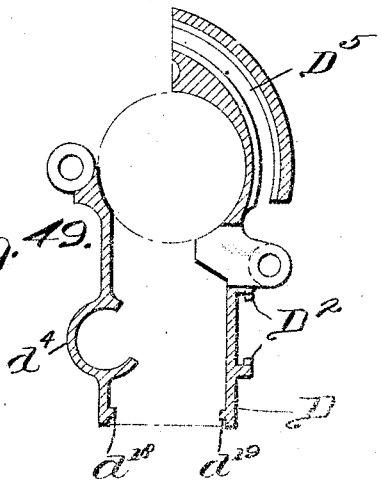
Figure 50:
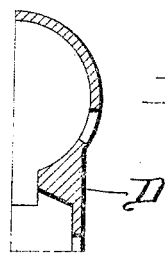
Figure 51:
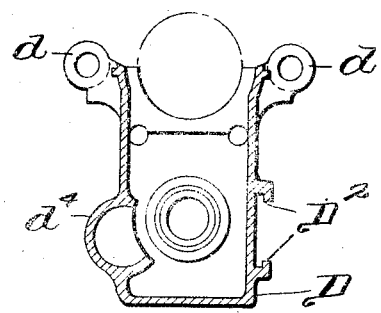
Figure 52:
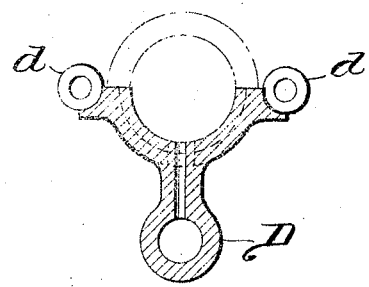

Figure 1 shows the gun in side elevation and in a position for firing with the soldier "lying down"; Fig. 2 is a side elevation of the central portion of the gun, showing the receiver and contiguous parts; Fig. 2ª is a continuation of the figure shown in Fig. 2, on the same scale, and shows the barrel and contiguous parts of the gun in side elevation; Fig. 2ᵇ is a detail showing the hammer cocking lever; Fig. 2ᶜ is a detail showing the barrel detached from the gun, and as seen from the front; Fig. 3 shows a section along the line 3—3 of Fig. 2ª, and looking in the direction of the arrows; Figs. 4, 5 and 6 are similar sections along the lines 4—4, 5—5, 6—6 of Fig. 2ª, and also looking in the direction of the arrows; Fig. 7 is a plan view of the central portion of the gun, with the feed strip in the horizontal position; Fig. 7ª is a plan view of the muzzle of the gun; Fig. 8 is a rear view of the gun, showing the feed strip in the horizontal position; Fig. 9 is a rear view of the gun, showing the feed strip in the vertical position; Fig. 10 is a front view of the gun in the position for transportation, and with the feed strip removed; Fig. 11 is a central vertical section through the receiver and the contiguous parts, parts being shown in elevation; Fig. 11ª is a continuation of the section shown in Fig. 11, and shows the forward portion of the barrel and contiguous parts; Figs. 12-14 show transverse sections along the lines 12—12 to 14—14 of Fig. 11, and looking always in the direction of the arrows; Fig. 14ª shows a section along the line 14ª—14ª of Fig. 14, and looking down; Figs. 15-24 show transverse sections along the lines 15—24, respectively, of Fig. 11, and looking always in the direction of the arrows; Fig. 24ª shows the cocking piece handle in section and detached; Fig. 25 shows a section along the line 25—25 of Fig. 11; Figs. 26 and 26ª show sections along the broken line 26—26 of Fig. 11, and looking down; Fig 27 shows a section along the line 27—27 of Fig. 15, and looking in the direction of the arrows; Fig 27ª is a detail perspective view of the spring pawl for holding the feed strip against backward motion; Fig. 27ᵇ is a detail perspective view of the pin carried by the ejection slot shutter; Fig. 28 shows a section along the broken line 28—28 of Fig. 27, and looking in the direction of the arrows; Fig. 29 shows a section along the line 29—29 of Fig. 27, and looking in the direction of the arrows; Fig. 30 is a similar section to that indicated at the right-hand portion of Fig. 26ª, but shows the cocking piece spring in a different position; Fig. 31 is a plan view; Fig. 31ª an inverted plan; and Fig. 31ᵇ a side elevation of the motor piston; Fig. 32 shows a section along the line 32—32 of Fig. 17, and looking in the direction of the arrows; Figs. 33 and 34 are, respectively, side elevation and plan views of the firing pin; Fig. 35 is a rear view of same; Fig. 36 shows a section along the line 36—36 of Fig. 32, and looking in the direction of the arrow, parts being shown in elevation; Fig. 37 is a side view of the feed block and portions of the receiver as seen from the left of the gun; Fig. 38 shows a section along the line 38—38 of Fig. 37; Fig. 39 shows a rear portion of the firing mechanism, parts being in the safety position, with the hammer engaging the trigger sear, and the trigger in the forward position; Fig. 40 shows the firing mechanism in the position for automatic fire; Fig. 41 shows the firing mechanism in the position for repetition fire; Fig. 42 shows a plan view of the receiver as detached from the gun; Fig. 43 is a view of the receiver as seen from the front; Fig. 44 is a view of the receiver as seen from the rear; Fig. 45 shows a central vertical section through the receiver; Fig. 46 shows a transverse section through the receiver along the line 46—46 of Fig. 45, and looking in the direction of the arrows; Fig. 47 shows a section through the receiver along the broken line 47—47 of Fig. 45, and looking in the direction of the arrows; Fig. 48 shows a section along the line 48—48 of Fig. 45, and looking in the direction of the arrows; Fig. 49 shows a double section, the right-hand portion of which is along the line 49—49 of Fig. 45, and the left-hand portion of which is along the line 49ª—49ª of Fig. 45, and looking in the direction of the arrows; Figs. 50, 51 and 52 show transverse sections of Fig. 45, along the lines 50—51—52 of said figure; Fig. 53 is a side elevation of the feed block detached from the gun, and as seen from the right, when it is in the horizontal position; Fig. 54 is a plan view of the feed block when in the horizontal position; Fig. 54ª is an inverted plan view of the cap mounted over the feed block; Fig. 54ᵇ shows a section along the line 54ᵇ—54ᵇ of Fig. 54ª; Fig. 55 is a front view; and Fig. 56 is a rear view of the feed block as detached from the gun; Fig. 57 shows a section along the broken line 57—57 of Fig. 55, and looking in the direction of the arrows; Figs. 58, 59, 60 and 61 show sections along the lines 58—59—60—61 of Fig. 57, and looking in the direction of the arrows; Fig. 62 shows the shoulder piece as detached from the gun, and as seen from the right; Fig. 63 is a plan view of the shoulder piece shown in Fig. 62; Fig. 64 is a central vertical section through the shoulder piece; Figs. 65–68 show sections along the lines 65—68 of Fig. 64; Fig. 69 shows a side elevation of the breech nut detached from the gun; Fig. 70 is a view of the same as seen from the rear; Fig. 71 shows a section along the line 71—71 of Fig. 70, and looking in the direction of the arrows; Fig. 72 is a top plan; and Fig. 73 is an inverted plan of the breech block; Fig. 74 is a front view of the same; Fig. 75 is a rear view of the same; Fig. 76 shows a central vertical section through the breech block, along the line 76—76 of Figs. 75 and 77, and looking in the direction of the arrows; Figs. 77–79 show transverse sections across the breech block, along the lines 77—79, respectively, of Fig. 76, and looking in the direction of the arrows; Figs. 80–81 are details showing in side elevation and in plan the cocking piece spring; Fig. 82 is a section along the line 82—82 of Figs. 80 and 81; Fig. 83 is a side elevation; Fig. 84 a plan view; and Fig. 85 an end view of the pivoted lock for locking the barrel in the desired angular position; Fig. 86 is a side elevation; Fig. 87 a plan; and Fig. 88 an end view, as seen from the left, of the sight spring which serves to hold the rear sight in the elevated position, and also to hold the lock in the engaging position; Fig. 89 shows a side elevation; and Fig. 90 a plan view of the main spring stop; Fig. 91 shows a section of the same along the line 91—91 of Fig. 89, and looking in the direction of the arrows; Fig. 92 is a side elevation; Fig. 93 is a plan view; and Fig. 94 a perspective view of the vibratory feed piece; Fig. 95 shows a side elevation of the motor piston stop as removed from the gun, and as seen from the left of Fig. 2; Fig. 96 shows the motor piston stop removed from the gun, and showing the opposite side to that shown in Fig. 2; Fig. 97 shows a section along the line 97—97 of Fig. 95, and looking in the direction of the arrows; Figs. 98–99 show opposite sides of the trigger piece as removed from the gun; Fig. 100 is a rear view of the same; Fig. 101 is a side elevation of the trigger sear; Fig. 102 shows a central vertical section through the trigger sear; Fig. 103 is a side elevation; and Fig. 104 a front view of the hammer; Fig. 105 shows a section along the line 105—105 of Fig. 103, and looking in the direction of the arrows; Fig. 106 shows the hammer spring with the hooks at the two ends thereof; Fig. 107 is a side elevation; Fig. 108 is a rear view; and Fig. 109 is a plan view of the hammer sear; Fig. 110 shows the muzzle support for the position of firing "lying down"; Fig. 111 shows a section along the line 111—111 of Fig. 110, and looking in the direction of the arrows, the parts being shown on a larger scale; Fig. 112 shows the mode of connecting the bayonet scabbard to the muzzle of the gun; Fig. 113 shows the bayonet scabbard, and the supporting leg pivoted thereto, as removed from the gun, parts being broken away; Fig. 113ª shows the holding clip used to support the bayonet scabbard from the belt of the wearer; Figs. 114–117 show means for preventing the feed block from being pressed down to the horizontal position before the first cartridge contained in the feed strip has arrived at the loading position; and Figs. 118–119 show means for braking the motor piston, with the object of compensating the work of loading when the feed strip is not in place in the gun. Of these figures, Fig. 114 shows the feed block in the horizontal position, with the contiguous parts of the receiver; Fig. 115 shows a section along the line 115—115 of Fig. 114; Fig. 116 shows a section along the line 116—116 of Fig. 114, but with the feed block in the vertical position; Fig. 117 is a similar view to Fig. 116, parts being broken away to show the operation of the finger lever; Fig. 118 shows a section along the line 118—118 of Fig. 114, and looking in the direction of the arrows; and Fig. 119 shows a section along the line 119—119 of Figs 114 and 118, and looking down.

The barrel A (Figs. 2 and $2^a$, 11 and $11^a$) is held partly in the cover B, partly in the barrel guard C, and partly in the receiver D, and is adapted to be turned through a small angle for the purpose of masking or unmasking the gas passage, and thus permitting the automatic attachment to be thrown into and out of operation by simply twisting the barrel, as will be hereinafter described. These parts with the shoulder piece E secured to the stock F and the hand grip F' form the principal fixed portions of the weapon.

The barrel A (Figs. 11 and $11^a$) is provided near the breech with a cylindrical portion $a$ adapted to fit in the breech nut H, forward of which is the cylindrical portion $a'$ which fits in a corresponding socket in the receiver D, forward of which are annular ribs $a^2$ adapted to engage corresponding annular grooves in the cover B. Forward of these annular ribs are a series of radially-disposed teeth $a^3$ adapted to engage the teeth $g$ of the lock G, which teeth are preferably on the top of the barrel. On the lower side of the barrel, and farther forward, are the cams $a^4$ and $a^5$ adapted to engage the opposite ends of the pivoted main spring stop K. The barrel is provided with a cylindrical bearing $a^6$ to engage the corresponding bearing in the forward end of the cover and in the forward end of the receiver, and at this point the barrel is pierced, as at $a^7$, to provide a passage for the powder gases, which passage opens into the passage in the receiver connected to the plug L which projects into the head of the motor piston J. A suitable gas check $a^8$ is provided in the barrel, to prevent the escape of gases into the receiver. Beyond the receiver the barrel projects forward through the guard C, and is provided at its muzzle with a notch $a^9$ by means of which it may be turned by any suitable tool, or by a spare extractor. The barrel is also provided with a cam groove $a^{10}$ near its breech to engage the piston stop K', as will be hereinafter described.

The guard C is rigidly attached to the cover B and to the receiver, as by means of the rib $c$ and the hook $b^6$, and it is kept from turning relative to the receiver and cover by a lug $c'$ projecting into a notch in the front face of the receiver, see Fig. $11^a$. This guard consists of a hollow cylinder of thin metal perforated to permit the passage of air therethrough, and serves not only as a protection to the hand of the soldier, but also serves to support and hold rigid in the vertical plane the front sight S, which is mounted on the stem $c^2$, which stem is provided with a collar $c^3$ snugly fitting the barrel near the muzzle, but leaving the muzzle of the barrel projecting slightly beyond the same to engage the bayonet.

In rear of the front sight, the guard C carries a collar C', which is provided with the downwardly-projecting lug $c^4$ to engage the handle of the bayonet. The guard C is also provided with two cylindrical washers $c^5$ and $c^6$ interposed between the guard and the barrel, which are perforated, as at $c^7$, to engage the trunnions of the bayonet scabbard, as will be hereinafter described.

The cover B and receiver D are rigidly secured together by interlocking hinges $b$ and $d$ and bolts B', (Figs. 2, 10 and 52) and thus are firmly held together, and hold the barrel rigidly against longitudinal movement, but permit the slight rotary motion of the barrel therein, as already described. The barrel is also held against longitudinal movement rearward by the engagement with the breech nut H, as will be hereinafter described. The cover B is also provided with a housing $B^2$ in which the rear sight S' is pivoted, as at $s'$, and the forward end of said sight projects forward beyond its pivot slightly as shown at $s^2$ to engage the forward yoked end $g^0$ of the lock G, (Figs. 11, 21, 83, 84 and 85) which is trunnioned in the housing $B^2$, as at $g'$, and is provided with teeth $g$ to engage the teeth $a^3$ of the barrel. The sight spring G' (Figs. 11, 21, and 86–88) normally bears on the back of the lock G and holds the teeth $g$ and $a^3$ in engagement, except when the sight S' is turned about its pivot, depressing the forward arm of the lock and leaving the teeth $g$ out of engagement with the teeth $a^3$. This spring normally tends not only to hold the teeth engaged, but to hold the rear sight in the desired position. This spring G' is provided with a catch $g^2$ near its forward end to limit the swinging movement of the sight S', and is also provided near its rear with a holding notch $g^3$ to engage the pin $g^4$, see Fig. 11, and the spring is also provided with the rearwardly-projecting arm $g^5$, which serves as a stop for the oscillation of the feed block N, as will be hereinafter more fully described. It will be seen that by turning the rear sight forward about its pivot, the end of the lock G will be depressed, and the teeth $g$ will be disengaged from the teeth $a^5$ of the barrel, and the barrel may be turned to the desired angle; but when the rear sight is returned to the initial position, the spring will press down on the back of the lock G and will restore the teeth $g$ to the engaging position, thus firmly locking the barrel to the cover B.

The breech closure comprises the breech nut H and the breech block I, both shown in section in Fig. 11, and shown in detail in Figs. 69–79, respectively. This breech closure, as shown, is generally similar to that illustrated and described in the Benét and Mercié patent #861939, granted July 30, 1907, and entitled Gas operated gun. With this type of breech closure, the breech block moves longitudinally in fixed guides in the receiver under the action of the actuator, or motor piston; while the breech nut, through a camming engagement with the motor piston aforesaid, is rotated through the desired angle to unlock the engaging threads provided on the breech block, and on the breech nut, respectively. These threads are of the mutilated system and, preferably, of the buttress type, there being preferably three sets of interrupted threads and three blanks on both the breech block and the breech nut.

The breech nut H is provided on its forward end with the cylindrical chamber $h$ adapted to fit the cylindrical portion $a$ of the barrel, and the front end of the breech nut brings up against the shoulder $a^{11}$ on the barrel, and the hook $h'$ of the breech nut engages the rear edge of the upper portion of the barrel, and these serve to hold the barrel firmly against rearward movement. The rear end of the breech nut is beveled, as at $h^3$, to engage the beveled abutment $d^3$ of the cross rib D' of the receiver, as shown in Figs. 11 and 45. The rear portion of the breech nut is cylindrical to rotate in the corresponding socket in the receiver, (shown most clearly in Figs. 45 and 47) and while free to rotate in the receiver is held firmly against rearward movement by the abutment $d^3$. The breech nut is cut away, as at $h^4$, to permit the feeding of the cartridges, and the insertion of the feed strip, and is provided with an ejection slot $h^5$ to permit the ejection of the empty cartridge case. On its lower side, the breech nut is provided with a downwardly-projecting lug H', projecting into the groove $J^0$ of the motor piston J, see Fig. 31, whereby the feed nut is rocked to the unlocking position as the piston starts rearward, carrying with it the breech block, and is rocked back to the locking position as the motor piston nears the end of its forward travel, and the breech block is nearly in place for closing the breech. This coöperation of the motor piston and the breech nut is similar to that described in our Patent #861939, aforesaid, and it will not be necessary to further describe the details thereof. The breech nut is also cut away interiorly, as shown at $h^6$, in Figs. 17 and 70, to provide clearance for the outer edge of the extractor $I^2$, which is carried by the breech block.

The breech block I is shown in section and in operative relation in Figs. 11 and 32, and in detail in Figs. 72–79, and it is provided with the usual interrupted buttress screw threads $i$, also with a groove $i'$ for the ejector $I^4$, and with the cut-away portion $i^2$ for the extractor $I^2$. The rear portion of the breech block is provided with a downwardly-projecting heel $I^0$ having a socket $i^0$ therein, the rear wall of which socket is tapered, as at $i^3$, to engage the beveled edge $j^3$ of the motor piston, and on the forward side of said socket is a curved surface $i^4$ to permit the tang $J^2$ of the motor piston to be freely directed up into and disengaged from said socket, as will be hereinafter more fully described. The breech block is centrally perforated, as at $i^5$, to receive the firing pin, and is also cut away from the rear, as at $i^6$ and $i^7$, see Figs. 32, 75 and 77, to permit the insertion of the laterally-projecting lug $i^{11}$ on the firing pin I', see Figs. 33 and 35. When the firing pin is inserted into this chamber this lug is shoved through the slot $i^6$, and the firing pin is rotated until this lug $i^{11}$ is in the holding position in the recess $i^7$. The firing pin is held in this position in the breech block by means of the pin $i^{14}$ projecting into the firing pin spring $i^{12}$, which spring engages in the socket $i^{13}$ in the breech block, as shown in Fig. 36, and is guided by the pin $i^{14}$, whose head projects into the arm $i^{15}$ of the head of the firing pin, as shown in Figs. 33–36. Thus, the firing pin is securely held in the breech block, while the latter is in the gun, and cannot be dismounted until the breech block has been removed from the gun; but, at the same time, the firing pin is free to move forward against the action of the spring when struck by the hammer.

For convenience of assembly, the head of the firing pin is provided with an arm $i^{16}$ which may be more conveniently turned by hand. To remove the firing pin, throw back the pin $i^{14}$, depressing the spring $i^{12}$, and turn the lug $i^{11}$ to that position in which it can be drawn to the rear through the slot $i^6$ in the breech block. The extractor $I^2$ is carried by the breech block, and is normally pressed forward by its spring $I^3$. The operation of the extractor is that fully described in the patent to Benét and Mercié, No. 1041410, granted October 15, 1912, and entitled Cartridge case extractor, and need not be further described herein. It will be noted that the extractor is moved backward with the breech block, drawing with it the empty cartrige case, and the opposite face of the cartridge case strikes the ejector I⁴, which may be of any suitable type, such, for instance, as that shown in Fig. 32.

The motor piston J, shown most clearly in Figs. 11, 26ᵃ, and 31 to 31ᵇ is provided with a recessed head, having a chamber $j$ to receive the plug L, which contains the gas passage communicating with the bore of the gun. and serves as a cylinder in which these gases act in forcing the motor piston rearward. The powder gases force the piston backward against the pressure of the main spring J′, and the motor piston automatically controls the various operative parts of the mechanism, as will be hereinafter more fully described. The forward end of this main spring J′ engages the lug $j^2$ at the side of the motor piston, see Figs. 26ᵃ and 31, and the rear end of the spring abuts against the flat face on the shoulder piece locking pin W. This spring is partly inclosed in a guide groove $d^4$, in the left side of the receiver, and the motor piston vibrates between the forward position shown in Figs. 11 and 26ᵃ, and its rear position in which the rear face of the motor piston brings up against the surface $e$ of the shoulder piece, see Figs. 11, and 39–41, etc.

The first rearward movement of the motor piston rocks the breech nut to the unlocked position (Fig. 31), and then as the motor piston travels to the rear, the inclined face $j^4$ of its heel strikes the inclined face $e'$ of the shoulder piece, wedging the heel of the motor piston upward, and causing its tang J² to project up into the socket in the breech block, drawing the same to the rear. Before the motor piston is coupled to the breech block, however, the rear face of the motor piston will strike the front face of the hammer and push the latter backward, permitting the motor piston to pass. After becoming locked with the breech block, the motor piston is guided by its lower edges, and the guide rib J⁵, and by the guide ribs $d^5$ of the receiver (Figs. 11, 45 and 46) and $e^5$ of the shoulder piece, (Figs. 11, 39 and 40) and the breech block is guided during its travel rearward by the ribs $d^6$ of the receiver, (Figs. 11 and 45–47). In returning to the initial position the motor piston will be pressed forward by the spring J′ until its heel passes the inclined face $e'$ of the shoulder piece when the wedging effect of the curved surface $i^4$ (Figs. 11, 73 and 76), supplemented by the action of the spring J′, acting in a lower plane, will cause the tang of the motor piston to be wedged downward out of engagement with the breech block, and it will bring up against the abutment D² of the receiver; the parts then being in the position shown in Fig. 11. Just before the breech block has reached its forward position, the breech nut has been cammed into locking engagement with the breech block (Fig. 31) and the breech is closed and locked. The motor piston in its rearward movement will operate the loading apparatus, and also the firing apparatus, as will be hereinafter described.

In order to throw the motor piston out of operation, when it is desired to use the gun as an ordinary hand-operated gun, we provide a motor spring stop K (Figs. 11, 22, 25, and 89–91) trunnioned in the receiver, as at $k$, and having two arms, each having laterally and downwardly-projecting lugs $k'$ and $k^2$. When the gun is turned to the position for firing by hand, the lug $a^4$ rocks the lever, so that the arm $k'$ projects down in front of the main spring J′, and if the motor piston has previously been drawn to the rear by hand, this arm will hold the spring back in the compressed position, and will allow the motor piston to be vibrated by hand without being pressed upon by the spring. Once drawn to the rear and held as described, the spring J′ will continue to be held out of engagement with the motor piston so long as the barrel is in position for firing by hand. Whenever, however, the barrel is turned back to the position for firing automatically, or semi-automatically, the other lug $a^5$ strikes the other arm $k^2$ of this spring locking lever and releases the spring, and permits it to assume its normal functions with regard to the motor piston; this arm $k^2$ also presses back the end of the cocking piece spring and releases it from engagement with the motor piston, as will be hereinafter described. To avoid mistakes in assembly, it is preferable to have the trunnions $k$ on this stop K of different sizes, with corresponding bearings D³ in the receiver (see Fig. 24) so that there is no likelihood of inserting the lever with the ends reversed.

The cocking piece M is used for operating the gun by hand. It slides in a guide D² at the side of the receiver, which slide is provided with cut-away portions $d^7$ to permit the insertion of the cocking piece in said slide. The cocking piece consists essentially of four parts, first, the rigid housing M⁰, which slides in the guideway D², and serves as a housing for the spring M², and as a support for the handle M′, which is pivotally connected to the housing by means of the bolt M³. The cocking piece is shown in Figs. 23 to 26 and 30, and the spring M² is shown in detail in Figs. 80 to 82. In Fig. 26ᵃ it is shown in the position for automatic firing with the motor piston free to vibrate, while in Fig. 30 it is shown in the position for drawing the motor piston to the rear by means of the handle M′. This spring (Figs. 80 to 82) is provided on its heel with a wedge-shaped lug $m$, adapted to engage the lug $d^8$, see Fig. 26ᵃ, of the receiver. The spring is provided near its center with a flat lug $m'$ on its back, which lug serves as a pivot for the spring, and also as a lock for the handle. Near its forward end, it is provided with an inclined lug $m^2$, which travels in the slot $d^9$ in the side of the receiver, and it is also provided with a hook $m^3$ adapted to engage the rib $m^4$ of the housing $M^0$, and thus couple it to said housing when in the position for hand operation, as shown in Fig. 30. This inclined lug $m^2$ on the end of the spring is pressed back by the arm $k^2$ of the main spring stop K when the barrel is rocked to the position for automatic firing, shown in Fig. 26$^a$, at which time the motor piston can reciprocate freely under the alternate action of the powder gases and the return spring.

The housing $M^0$ is provided with a catch $m^5$ having an inclined face $m^6$ adapted to engage the lug $j^5$ on the motor piston, when the cocking piece is drawn to the rear. The lug $m$ on the rear end of the said spring engaging the beveled shoulder $d^8$ on the receiver normally holds the cocking piece in the forward position, when it will be clear of the motor piston so long as the arm $k^2$ of the spring stop K presses the front end of the spring outward, as shown in Fig. 26$^a$; but its beveled face permits the cocking piece to be drawn backward when desired.

The handle $M'$ shown in detail in Figs. 24, 24$^a$ and 26$^a$ is pivoted to the housing $M^0$ by the bolt $M^3$, and is held in the vertical or horizontal position by the lug $m'$ on the spring $M^2$ engaging in one or the other of the notches $m^7$ or $m^8$. When in the horizontal position, shown in full lines in Fig. 24, which is the position for operating the cocking piece, the handle is still further braced by the shoulder $m^{10}$ engaging the face of the housing $M^0$. This shoulder also serves as a stop for the handle when it is swung down to the horizontal, or operative, position.

In order to facilitate the release of the lug $m'$ from engagement with the handle, a push button $m^9$ may be attached to the spring $M^2$ (Figs. 26$^a$ and 80 and 81) projecting through the housing, pressing on which will release the lug $m'$ from the notch in the handle. The handle $M'$ is also provided with a hole $m^{11}$ to engage the stud $d^6$ projecting through the side of the receiver, and integral with one of the trunnion bearings $k$ for the spring stop lever K. This stop serves to steady the handle when the latter is in the vertical position, which is that in which the gun is ordinarily transported. The handle is also provided with a notch $m^{12}$ to engage a nipple on the piston stop K', so as to allow the change of position of the barrel in passing from the automatic position to the position for hand function, or vice versa. The pivot bolt $M^3$ has the enlarged squared portion $m^{14}$, and one side of its head is cut away, as at $m^{15}$, (Figs. 23 and 26$^a$) the squared portion fitting in a corresponding socket in the handle, and the flange of the head fits in a recess $m^{16}$ in the housing locking the pivot bolt in place, except when it is turned by the handle so that the flat face of the head registers with the recess, when the bolt may be withdrawn.

N represents the oscillating feed piece which is pivotally connected to the receiver so as to rock from the horizontal to the vertical position, or vice versa, as will be hereinafter described.

With the feed block passage in the vertical position, the feed mechanism is out of engagement with the motor piston, and the gun may be loaded with single cartridges by hand and fired single shot in the usual way. This feed piece comprises the housing $N'$ for the feed strip, the housing $N^2$ arranged at right angles thereto for the feed piece P, and its lifting lever $P^3$, and a housing $N^3$ for the spring pawl $P^2$ for preventing the backward movement of the feed strip. It is also provided with a hollow circular bearing $N^4$ to engage the spring box $D^5$ of the receiver, inclosing the spring $N^6$ for returning the feed block from the horizontal to the vertical position. The feed block is also provided with a rear circular bearing $N^5$ having a groove $n$ engaging the rib $d^{11}$ of the circular flange $D^4$ on the receiver (see Figs. 11, 45 and 53–61). The housing $N'$ for the feed strip is provided with guide grooves $n'$ for the edges of the feed strip, with a tongue $n^2$ to loosen the cartridge from the feed strip in the operation of feeding the gun, and with the usual abutments $n^3$ and $n^4$ to direct the cartridge into the chamber.

The hollow bearing $N^4$ incloses the spring box $D^5$, in which is placed the coil spring $N^6$ for automatically returning the feed block from the horizontal to the vertical position (Fig. 18). Its travel to the horizontal position is limited by the lug $n^{60}$ (Fig. 55), which strikes the rear end $g^5$ of the sight spring G'. One end of the spring $N^8$ bears against the lug $n^5$ of the feed block, which lug travels in the guide groove $d^{12}$ in the spring box $D^5$ of the receiver, and the other end of the spring engages the lug on the arm $k^{20}$ of the piston stop K' and normally tends to throw this arm inward (see Fig. 18), effecting results hereinafter described. The edge of the bearing piece $N^4$ next to the arm $k^{22}$ of the piston stop is beveled, as at $n^6$, so as to wedge said arm outward when the feed block is in the horizontal position, as will be hereinafter more fully described.

The feed mechanism mounted in the feed block comprises a feed piece P having a hollow spindle in which is mounted a spring P' under compression (see Figs. 15 and 92–94). This feed piece is provided with arms $p'$ and $p^2$ adapted, when the feed block is in the position for automatic firing, to be struck by the cams $J^3$ and $J^4$ of the motor piston (see Fig. 26$^a$), thus rocking the feed piece about its axis. The upper portion of the feed piece is provided with a pusher arm $p^3$ having a catch $p^4$ at its end, adapted to engage in the central holes $q$ of the feed strip Q (Fig. 7). The lower face of this catch is beveled, as at $p^5$, so that it may slip back over the feed strip when the feed piece is rocked in the reverse direction.

The feed piece is normally pressed downward by said spring P', the upper end of which abuts against a pin $N^5$ projecting down into the hollow stem of the feed piece, as shown in Fig. 15, the upper end of which pin is secured in the cap $N^6$, which is mounted over the housing $N^3$, as shown in Figs. 8–11, 14–16, 27, 53, and 54$^a$ and 54$^b$. This cap has an interrupted groove $n^7$ adapted to engage the interrupted flange $n^8$ on the feed block, and to permit the two parts to be assembled by a swinging motion, which swinging motion will cause the curved groove $n^9$ on the opposite end of the cap, and the rib $n^{10}$ on the feed block to engage; and finally the cap is locked in place by means of the lug $p^6$ projecting from the back of the pawl P$^2$, which will snap into the hole $n^{11}$ in the cap, (as shown in Figs. 7, 11, 27 and 54$^a$). Thus this cap will serve as a support for the pin $N^5$, which serves as a journal bearing for the feed piece, and also presses on the spring P', and the cap also serves as a closure for the housing containing the spring pawl P$^2$, and is automatically locked in place by said spring pawl. To remove the cap, it will only be necessary to press down the lug on the spring and swing the cap laterally until the engagement between its grooves and the flanges on the feed block is released.

The spring pawl P$^2$, shown in Figs. 11, 16, 27 and 27$^a$, while serving as a lock for the cap $N^6$, as just stated, is primarily intended to hold the feed strip against backward motion. This pawl P$^2$ has a downwardly-projecting rib $p^7$ engaging in a socket $n^{12}$ in the housing $N^3$ which serves as a pivot therefor; it has a lug $p^8$ on its back which bears against the cap $N^6$ and carries the stop nipple $p^9$, the portion $p^9$ of this pawl serves as a spring, and at its rear end this spring terminates in the plate $p^{10}$ having a claw $p^{11}$, to engage in the outer holes $q'$ of the feed strip Q; and this plate $p^{10}$ has an arm $p^{12}$ adapted to be lifted by the pusher arm $p^3$ of the feed piece when the latter is in the raised position. The claw $p^{10}$ is held against backward pressure by means of the abutment $n^{13}$ in the feed block (Figs. 16 and 54). The heel of the feed piece P is flattened on both sides, as at $p^{15}$ (Figs. 15, 27, 92 and 93), and below this flattened portion, it is provided with a segmental cylindrical portion $p^{16}$ having the upper inclined faces $p^{17}$, and the beveled bottom face $p^{07}$. When the feed piece is pressed downward by its spring P', this flattened portion $p^{15}$ of the feed piece passes freely into the slot $d^{15}$ in the bearing D$^7$ (Figs. 14, 14$^a$, 15 and 27) attached to the receiver D, said bearing being provided for the lower end of the feed piece when the feed block is swung to the horizontal position. When the feed piece is pressed downward to its farthermost position by its spring P', this flattened portion will be free to swing in or out of the slot $d^{15}$; but if the feed piece be lifted slightly the rounded portion $p^{16}$ will engage in the enlarged curved portion $d^{16}$ of said bearing and will hold the feed piece against swinging out of the bearing D$^7$, thus maintaining the feed block in the horizontal position, as shown in Fig. 15; the parts in the disengaging position being shown in Fig. 27.

The feed piece is automatically held in the raised position upon the insertion of the feed strip and is maintained in such position until the feed strip is removed, but it may be raised to the locking position by means of the hand lever P$^3$ (Figs. 15, 26 and 27) which is pivoted, as at $p^{18}$, and has a lug $p^{19}$ engaging below the lug $p^0$ on the arm $p'$ of the feed piece P. The feed piece is also automatically lifted to the locked position by the closing of the shutter $o^2$, which is provided to close the ejection opening in the receiver. This shutter should preferably be closed while the gun is being carried to keep out dust, etc.; and in the position for transport, the feed block would ordinarily be locked in the horizontal position, which is automatically accomplished by closing the shutter, as will now be described. This shutter O$^2$ is provided with a hinge pin $o$ which is rigidly attached to the shutter, and carries an arm $o'$ engaging beneath the lug $p^{20}$ of the feed piece (Figs. 27, 27$^b$, 92 and 94). This lug $p^{20}$ has a downwardly-projecting nipple $p^{21}$ adapted to engage in the notch $o^2$ of the arm $o'$ when the feed piece is in the lowered position and this steadies the feed piece against turning from this position. It will be seen that by raising the shutter, as by means of the thumb lug $o^3$, the arm $o'$ would be rocked to the position shown in Fig. 27, and the feed piece will be lifted, whereas when the shutter is opened the arm $o'$ will be swung out of engagement with the lug $p^{20}$ and the feed piece would be forced downward again by its spring P', were it not held up by the feed strip or by the hand lever P$^3$.

The purpose of the hand lever is to lift the feed piece slightly against the action of its spring P', so as to facilitate the insertion of the feed strip, or to withdraw backward, if desired, a feed strip already in the feed block. After the hand lever is let go, the inclined face $p^5$ of the pusher arm $p^3$ will engage on top of the feed strip and will hold the feed piece in the raised portion until the last cartridge has been fired, when the feed piece will be pushed out of its guides $n'$, and the feed piece will be pressed down under the influence of the spring $P'$, its heel will be released from the bearing $D^7$, and under the influence of the coil spring $N^0$ the feed passage will be returned to the vertical position, when it may be pressed down again by hand, and a new feed strip inserted and the process of automatic firing may be continued; or it may be left up in the raised position and the gun may be fired single fire by hand.

In order to lock the motor piston to the feed block and hold the latter in the horizontal position, while the feed piece is being rocked by the coaction of the cams $J^3$ and $J^4$ on the motor piston, and the arms $p'$ and $p^2$ of the feed piece, a hook $N^7$ is provided on the lower end of the housing $N^2$, which projects into an opening in the side of the receiver and engages in the longitudinal groove $j^0$ in the bottom of the rear portion of the motor piston (Figs. 15, 17, 18, 26, 31ª, and 31ᵇ), thus holding the feed block down during the movement stated, independently of the engagement of the heel of the feed piece, and the bearing $D^7$. To automatically effect the lifting of the feed piece when a feed strip is inserted, the cam $n^{14}$ (Figs. 26–29, and 58 and 59) is provided in the housing $N^2$, adapted to engage the arm $p'$ and wedge up the feed piece when it is rocked, which lifting would also be simultaneously caused by the engagement of the bevel surface of the lower face $p^5$ on the bottom of the pusher arm $p^3$. This lifting of the feed piece also results automatically when the motor piston rocks the feed piece in the operation of the weapon. The ends of the feed passage are closed, to keep out dust, etc., by shutters O and O', (see Figs. 16 and 17) which swing in the same direction, to permit the free passage of the feed strip, and are automatically returned to the closed position by spring hinges, as shown in Figs. 37 and 38, this being a well known construction for the automatic closing of shutters. The motor piston stop $K'$ holds the motor piston to the rear, that is, with the breech open when the feed block is not in a horizontal position, and this also hooks on to the cocking lever when passing from the automatic position to the position for hand function, or vice versa.

The motor piston stop $K'$ is shown in detail in Figs. 95–96, and in section in Figs. 18, 19 and 20, corresponding to the sections shown in the lines 18—18, 19—19 and 20—20 of Fig. 96, and looking in the direction of the arrows. This stop is provided with an eye $k^{18}$ in which the pivot pin $k^{19}$ fits, and its arm $k^{20}$ is normally thrown in toward the path of the motor piston under the action of the feed block spring $N^0$, which engages the lug $k^{21}$. This arm $k^{20}$, under the action of said spring, engages the shoulder $j^6$ on the motor piston (see Figs. 31 and 31ª); but when said arm $k^{20}$ is swung up about its pivot, it passes into the groove $j^7$ of the motor piston, as shown in Figs. 18, 31 and 31ª, and does not affect the vibration of the motor piston. It may be thrown out of the engaging position either by the rotation of the barrel, which causes the cam groove $a^{10}$ to engage the lug $k^{23}$ (see Fig. 20), and thus rock the stop about its pivot, throwing this arm $k^{20}$ out of engagement; or the same effect may be accomplished by swinging the feed passage to the horizontal position, in which case the cam face $n^6$ on the feed block will strike the arm $k^{22}$ on the stop and rock the arm $k^{20}$ out of engagement, as shown in Fig. 18; or the same result may be accomplished by pressing down on the hand lug $k^{24}$, and when so moved outward by hand it may be held in this position by the nipple $k^{25}$ engaging in the notch $m^{12}$ of the handle, as shown in Figs. 18 and 24. When it is thrown out of engagement the spring $N^0$ will tend constantly to restore it back to the engaging position, and will automatically accomplish this result when the stop is released.

The firing mechanism is housed in the shoulder piece E, shown in detail in Figs. 11 and 39–41, and in detail in Figs. 62–68. This shoulder piece E is connected to the receiver by the side grooves $e^6$ and $e^7$, which engage corresponding ribs $d^{18}$ and $d^{19}$ of the receiver (see Figs. 45 and 46, and 62, 63 and 66). The front end of the shoulder piece is provided with a groove $e^8$ to engage the rib $d^{20}$ of the receiver (see Figs. 45 and 64). The upper rear portion of the shoulder piece is cut away, as at $e^9$, for convenience in assembling the parts. In the rear, the receiver and shoulder piece are connected together by the locking pin W, as will be hereinafter described.

The firing mechanism consists essentially of six pieces, the hammer R, the hammer sear $R'$ and the hammer spring $R^2$; the trigger piece T, the trigger sear $T'$ and the trigger sear spring $T^2$. The firing mechanism is shown most clearly in Figs. 11, 39–41, and 98–109. The hammer is pivoted on the bolt $R^0$, and is provided on its front upper portion with the cam face $r$ to engage the face $j^4$ of the heel of the motor piston, and to be pressed back by the same. Above this, it is provided with a face $r'$ to bring up against the rear face of the breech block after the firing position has been reached, as shown in Fig. 11, and above this is provided with a face $r^2$ to strike the firing pin when it reaches the firing position. At its top, it is provided with a catch $r^3$ to engage the lug $t$ of the trigger sear T', (see Fig. 40). The hammer is also provided with a roller $r^4$, to which is engaged the rear hook $r^5$ of the hammer spring $R^2$. The front hook $r^6$ of this spring engages in the eye $e^9$ of the shoulder piece, as shown in Fig. 40. This spring $R^2$ is always under tension and tends to swing the hammer forward about its pivot, but the hammer is held in the cocked position either by the hammer sear, which controls the hammer in automatic firing, or by the trigger sear, which controls the hammer in firing single shot by hand, or in starting the automatic firing. The hammer is provided with a cocking toe $r^7$ having the engaging notch $r^8$ adapted to engage the end $r^9$ of the cocking arm $r^{10}$ of the hammer sear R'. This cocking arm of the sear and cocking toe of the lever are normally held in engagement by the downward pressure of the spring $R^2$ on the curved bearing rib $r^{11}$ projecting from the short arm $r^{10}$ of the hammer sear R'. The long arm $r^{12}$ of this hammer sear is provided with a cam lug $r^{13}$, which projects up into the groove $j^9$ in the bottom of the motor piston (see Figs. 21, 31$^a$ and 40). This groove terminates at its rear in the cam face $j^8$, which engages the cam $r^{13}$ of the hammer sear, and releases the detent $r^9$ from engagement with the cocking toe $r^7$, just before the motor piston reaches its forward position (see Fig. 40). If the parts are in the position for automatic firing, this engagement of the cam face $j^8$ of the cam $r^{13}$ would release the hammer and fire the piece. In its rearward swing, the motion of the hammer is arrested by means of the abutment $e^{10}$ on the receiver. In order to cock the hammer by hand, the bolt $R^o$ is provided with a lug $r^{14}$, which projects laterally therefrom, and engages in the arc-shaped slot $r^{15}$ of the hammer (see Figs. 2$^b$, 40 and 103 and 105). The pivot bolt $R^o$ is rigidly attached to, and integral with the resilient hammer lever $R^3$, shown in detail in Figs. 2 and 2$^b$, which is provided with an engaging lug $r^{16}$ adapted to normally engage in a notch $e^{11}$ of the shoulder piece E (see Figs. 2, 2$^b$ and 62). When in the position shown in Fig. 2, the hammer cocking lever will permit the free operation of the hammer, but by lifting the lever out of its engagement with the notch $e^{11}$ and swinging it down about its pivot, it will lock the lever to the cocked position shown in Fig. 39, when the trigger sear T' will engage the same and hold the hammer in the cocked position. The hammer cocking lever may then be brought back to the initial position and sprung into locking engagement with the shoulder piece, leaving the hammer free for automatic firing.

The trigger and connected parts are shown in Figs. 11, 13 and 39–41, and details of the trigger piece and trigger sear are shown in Figs. 98–102. The trigger piece is provided at its upper end with a fork $t'$ adapted to engage the pivot pin $t^2$ for the trigger sear T'. This pin is mounted in the receiver, and is provided with a lug for convenience of assembly, as shown in Fig. 13. The fork $t'$ of the trigger piece passes up through the slot $t^0$ in the sear, as shown most clearly in Fig. 102. Below the fork $t'$, the trigger piece is provided with a catch $t^3$ which engages the hook $t^4$ of the trigger sear for disengaging the detent $t$ from the notch $r^3$, as shown in Fig. 40. The trigger piece and trigger sear have bearings $t^5$ and $t^6$ to engage the ends of the trigger spring $T^2$, which normally tends to push the trigger piece forward and upward about its pivot, and to rock the detent $t$ of the trigger sear T' outward until its motion is arrested by the stop $e^{12}$ on the shoulder piece. As the hammer swings backward, it strikes the forward face of the trigger sear, swinging the detent backward until after the notch $r^3$ passes the detent $t$, when the spring $T^2$ will cause the detent to fly forward in the position to engage the notch $r^3$, as shown in Fig. 39, unless it is held back, as will be hereinafter described. The forward edge of the trigger piece is provided with a curved lug $t^7$, adapted to engage the lug $u$ carried on the shaft U' of the firing lever U. This firing lever comprises a spring arm having a button $u'$, having a notch on its inner face adapted to engage one of three lugs III, IV and V on the shoulder piece, as shown in Figs. 2 and 62. When this lever arm U engages the lug III the lug $u$ is in the position shown in Fig. 39, and its notch $u^0$ engages the lug $t^3$ on the trigger piece, and holds the trigger against being thrown backward about its pivot, or thrown outward, thus locking the trigger in the safety position shown in Fig. 39.

When the parts are in the position for repetition firing, the lug $u$ is turned to the position shown in Fig. 40, permitting the trigger to be thrown freely to the rear, and when held in this position the lug $t^3$ on the trigger piece will engage the lug $t^4$ on the trigger sear, and will hold the detent $t$ out of the path of the notch $r^3$ on the hammer, so that as long as the trigger is held back, the automatic firing may be continued. As soon as the trigger is released, the detent will return to the forward position in the path of the hammer and will cock the hammer. The hammer may be released by pulling on the trigger again.

This is the position that the firing lever U assumes when it engages the lug IV (see Fig. 2). When the firing lever is turned to the position to engage the lug V on the shoulder piece (see Figs. 2 and 62) the parts are in the position for repetition firing, as shown in Fig. 41, in which case the cam $u$ is turned to the position to bear down on the lug $t^7$, drawing the fork of the trigger down from its pivot, and drawing the lug $t^3$ of the trigger piece down to clear the hook $t^4$ of the trigger sear when the trigger is drawn to the rear. This will leave the trigger sear free to throw the detent again forward against the stop $e^{12}$ on the inside of the shoulder piece, and it will be in the path of the hammer head when the latter is thrown backward after the single fire, and thus it will cock the hammer, and when the trigger is released it will slide forward and upward, throwing the lug $t^3$ in front of the hook $t^4$ of the trigger sear, thus restoring the trigger to the position for firing another round. Thus, by a simple turning of the firing lever, the arm may be placed in the safety position, or in the position for automatic firing, or in the position for repetition firing.

The receiver, shoulder piece and stock are secured together by means of the locking pin W, shown in detail in Figs. 2, 12 and 26. This pin projects through ears $d^{21}$ at the rear end of the receiver and through a hole in the shoulder piece. This pin is provided with a head $w$ for convenience of removal, and with a longitudinal slot $w'$, into which projects the pin $w^2$, secured in one of the ears $d^{21}$ of the receiver. This slot is connected by the segmental, circumferential slot $w^3$ with the parallel slot $w^4$, which permits the pin to be partially withdrawn, then twisted, and then wholly withdrawn from its seat. In order to hold the pin normally in the locked position, the side opposite the slot $w'$ is flattened, as at $w^5$, to engage the end of the motor piston spring J', and thus this spring tends to serve as a lock for the pin W in addition to the pin $w^2$.

For convenience in holding and aiming the weapon, when firing "lying down", we provide the bayonet scabbard with a supporting leg hinged thereto, and with means for attaching the bayonet scabbard to the piece near the muzzle, as shown in Figs. 1, 2ª, 11ª and 110–113, in which V represents the bayonet, V' the bayonet scabbard, and V² the leg hinged to the bayonet scabbard; while V³ represents the loop connected to the upper end of the bayonet scabbard by means of which it may be attached to the belt of the soldier. The bayonet and bayonet scabbard are of the usual construction, except that near the upper end of the scabbard the metal band V⁴ is attached, to which the leg V² is hinged, as at $v$. On the opposite side of the scabbard from this leg, we provide suitable means for attaching the bayonet scabbard to the weapon, which means consist of a bracket V⁵ fast to the band V⁴, and provided with a lug $v^2$ adapted to project into one of the openings $c^7$; while there is a curved hinged link V⁶ pivoted to this bracket V⁵, as at $v^3$, which link also carries the corresponding lug $v^4$ adapted to engage in another one of these openings $c^7$, see Fig. 111, thus these two lugs form trunnions about which the breech of the gun may be moved to a vertical angle. The curved hinged link V⁶ engages a catch V⁷ having a thumb lug $v^5$; the link and the catch together serving as a collar to attach the scabbard to the piece. The supporting leg V² is provided with an upwardly-extending rib $v^6$ (see Fig. 111), which limits the swing of the leg outward, and it is also provided with a shoe $v^7$ to catch in the earth if the ground be soft. This leg is provided with a button $v^8$ adapted to engage the holding strip $v^9$, as shown in Fig. 113.

It will be seen from Figs. 1 and 2ª that the scabbard may be attached to the weapon with the bayonet fixed, in which case the scabbard is attached to the piece in rear of the band C', while if it be not desired to have the bayonet fixed to the gun, it may be allowed to remain in the scabbard, as shown in Fig. 110, and the scabbard may be attached to the gun in front of the collar $c'$, as shown in Fig. 110, or in rear thereof, as shown in Fig. 1.

In order to provide a positive means for preventing the feed block from oscillating when in the vertical position, before the first cartridge of the feed strip registers with the axis of the bore, we provide an automatic locking arrangement for locking the feed block with the feed passage in the vertical position until released either by the pressure of a cartridge, or on the insertion of a feed strip, or by hand. This arrangement is shown in detail in Figs. 114–117.

X represents a locking piece which is chambered to receive the coil spring X', normally tending to press the forward end of said locking piece forward. This locking piece has a pin $x$ normally projecting into the feed passage; and also a hook $x'$ adapted to project into the depression $d^{32}$ in the side of the receiver D, and to engage beneath the hook $d^{31}$ attached to the side of the receiver. The back of this hook $d^{31}$ is beveled, as at $d^{33}$, so that when the feed block swings over rapidly, under the influence of the spring N⁶ (see Fig. 18), this hook will be wedged down into the recess $d^{32}$ and will snap under the hook $d^{31}$ under the action of the spring X'. The two parts will normally remain locked together until the feed strip is inserted and the first cartridge Z, shown in dotted lines in Figs. 115–116, presses down on the pin X and releases the hook $x'$ from engagement with the hook $d^{31}$. The disengagement of these hooks is only complete when the claw $p^{11}$ of the pawl $P^2$ projects down into the opening in the feed strip.

In order to disengage the hook $x'$, when it is desired to swing the feed passage to the horizontal position, as in arranging the piece for transport, we provide a hand lever $X^2$ pivoted, as at $x^2$, to the feed block, and having its end engaging the locking piece X. By pressing inward on the end of the lever $X^2$, the hook $x'$ will be withdrawn from engagement with the hook $d^{31}$, and the feed block may be rotated by hand to the horizontal position, and locked in such position by the shutter $O^2$, as hereinbefore described.

It will be noted that during the operation of the feeding automatically, the motor piston has to perform the work of tearing a cartridge off the feed strip and feeding same to the chamber at each recoil, but when the last cartridge has been fired, the feed strip is not fed forward, and the feed block changes to the vertical position. This lessening of the work required of the motor piston causes the pressure to be excessive when the last cartridge is fired, and it is desirable at this time to apply some braking means to check the velocity of the motor piston, which is accomplished by the apparatus shown in Figs. 114 and 118–119.

Y (see Fig. 118) represents a leaf spring which is connected to the receiver D in any convenient way, as by means of the pin $y^0$ and the boss $y'$ engaging suitable lugs provided on the receiver, as shown in Fig. 119. The lower end of this spring carries a brake shoe $y$ which is normally held clear of the interior of the receiver by the resiliency of the spring, but when the feed block swings back to the vertical position, as shown in Fig. 118, the face $n^{31}$ strikes the back of the spring Y and presses the brake shoe inward, causing it to engage the guide rib $J^5$ of the motor piston, thus applying a friction brake to the same. The feed block bears on this brake shoe through the pressure of its spring $N^6$. The moment the feed block oscillates, the brake action on the motor piston is slightly released, so that it only comes into action at the last round of the feed strip as the feed block oscillates to the vertical position at that moment.

The operation of the device is as follows:—

*Operation by hand.*—To provide for hand function, suppose the gun to be unloaded and the breech closed, swing the handle of the cocking piece M to the horizontal position and draw it to the rear until the motor piston strikes the abutment in the rear end of the receiver. Hold the mechanism in this position and turn the handle of the cocking piece against the receiver so that the lug $k^{25}$ of the motor piston stop K' drops into the recess $m^{12}$ in the handle M' (see Fig. 18). This will lock the motor piston in the rear, and it will be pushed against the arm $k^{20}$ of the stop K' by the main spring J'. Now pivot the rear sight S' to the front until it strikes its abutment on the barrel cover. This will release the teeth $g$ of the lock G from engagement with the teeth $a^3$ on the barrel; then using a special tool, or a spare cartridge case extractor, which is suitable for the purpose, turn the barrel so that the index on the protruding end of the barrel (see Fig. 7ª) corresponds with the notch VII on the front end of the barrel cover, which will indicate that the barrel has been turned to the proper position for hand function; then pivot the sight back to its original position. By thus turning the barrel around to the reference mark for hand function, the rear cam $a^4$ on the barrel strikes the back of the rear arm $k'$ of the spring stop K (see Figs. 11 and 22), and rocks the main spring stop K about its trunnions, causing its hook $k'$ to project in front of the main spring J', thus holding the main spring in its compressed position, and permitting the motor piston to be moved backward and forward by hand without being affected by said spring. This partial rotation of the barrel also causes the cam groove $a^{10}$ in the barrel (see Fig. 20) to press back the lug $k^{23}$ on the motor piston stop and to throw the arm $k^{20}$ of said stop upward clear of the path of the motor piston, thus withdrawing this obstruction to the forward movement of the motor piston, which may now be effected freely by hand. Turn the cocking handle to the horizontal position and push the same forward. The cocking piece will couple on to the lug $j^5$ near the head of the motor piston, and the motor piston can be moved upward and forward by the cocking piece, which is rigidly attached thereto. The gun is now ready for hand function. To open the breech, draw the cocking piece to the rear by the right hand, by means of the handle M' as far as it will go. During this movement, the lug H' on the breech nut will project downwardly into the groove $J^0$ on top of the motor piston (shown in Fig. 31), and the breech nut will be rotated to the unlocking position, and the breech block subsequently coupled on the motor piston and drawn to the rear thereby, as hereinbefore described. Near the beginning of the rearward movement of the motor piston, its rear face has come into contact with the front face of the hammer, thus swinging the hammer rearward about its axis, and putting the hammer spring $R^2$ under tension. During this movement of the hammer, its head will press back the trigger sear T', rocking it about its pivot, and putting the spring $T^2$ under tension. After the hammer detent has passed this sear, the spring $T^2$ will bring the trigger sear back to the original position, engaging the notch $r^3$ of the hammer and holding the same in the cocked position. The breech being opened, the cartridge can now be introduced into the chamber by hand, passing it through the loading slot in the receiver. To close the breech, push the handle $M'$ of the cocking piece forward as far as it will go. In this forward movement of the cocking piece, the breech block is pushed by the tang on the motor piston into the chamber in the breech nut, and the breech nut is locked, and the motor piston is disengaged from the breech block, as has already been described, and the tang brings up against the rear face of the breech nut (see Fig. 11). During the last part of the forward movement of the motor piston, the bottom of its heel is moved away from the supporting ribs $e^5$ of the shoulder piece, and when it passes the cam $e'$ this tang drops down out of engagement with the breech block, as has already been described. Incident to this closing of the breech, the breech block pushes the cartridge home, and the extractor snaps over the rim of the cartridge case in the usual well-known way. The gun now being loaded, and the breech closed, the hammer being cocked on the sear $T'$, in order to fire the gun pull the trigger $T$. The hammer will be released, will fly forward, and will strike the firing pin in the usual way. To open the breech, draw back the cocking piece, as before, which will unlock the breech block and will draw it to the rear, eject the empty cartridge case, cock the hammer, and put the parts in position for re-loading; then the forward movement again of the cocking piece will again load the piece, and this repetition by hand may be continued indefinitely.

*To adapt the gun for single shot fire or automatic fire.*—If it be desired to prepare the weapon for semi-automatic or automatic fire, move the firing lever $U$ from position III to position IV (Fig. 2) and draw the cocking handle $M'$ to the rear, turn it to catch on the nipple $k^{25}$ of the motor piston stop $K'$ as for hand operation; then rotate the barrel $A$ to the primary position (shown at VI in Fig. 7ª) with the gas passage open. This rotation of the barrel causes the forward cam $a^5$ on the barrel to engage the actuator spring stop $K$ and to press this forward arm $k^2$ down, so that the rear arm $k'$ is left clear of the main spring $J'$, while the forward arm $k^2$ is lowered to push the lug $m^2$ of the spring $M^2$ and the cocking piece aside, out of the way of the lug $j^5$ of the motor piston (Fig. 26ª); thus permitting the motor piston to reciprocate without engaging the cocking piece. This rotation of the barrel has the further effect of permitting the lug $k^{23}$ of the stop $K'$ to reënter the cut-away portion $a^{10}$ of the barrel, under the action of the spring $N^0$ (Fig. 18), thus permitting the stop to rock the arm $k^{20}$ before the shoulder $k^{20}$ of the motor piston, and thus it will hold the motor piston in the rearward position. Now disengage the handle $M'$ from the nipple $k^{25}$ of the motor stop $K'$, and after having unlocked the stop by hand allow the motor piston to return to the forward position; in the meantime holding the handle $M'$ to check the impulse exerted by the main spring $J'$. Now place a feed strip $Q$ in the feed passage, push it home so that the first cartridge $Z$ depresses the cartridge stop $x$ to the position indicated, in Fig. 115, in order to unlock the feed block from the receiver and to permit the feed block to be swung back with its passage in the horizontal position. The feed strip $Q$ is retained in place by the pawl $P^2$, the claw $p^{11}$ of which engages in the first hole $q'$ in the rear portion of the feed strip. The claw $p^4$ of the pusher arm $p^3$ of the feed piece $P$, under the action of the spring $P'$ (Fig. 15) engages in the first hole $q$ in the middle portion of the feed strip. In forcing down the feed block, the lower face $p^{07}$ of the feed piece $P$ (Figs. 15 and 92) strikes the top of the bearing piece $D^7$ and wedges up the feed piece slightly, which, under the action of its spring, immediately snaps the rounded heel $p^{10}$ of the feed piece into the eye $e^{10}$ of the bearing piece $D^7$. The feed piece is held up against further downward movement by the feed strip $Q$, and as it cannot descend any lower, the locking of the feed block to the receiver $D$ is assured. At the end of the rocking movement of the feed block $N$ to the horizontal position, the beveled face $n^6$ of the feed block engages the lug $k^{22}$ (Fig. 18) of the motor piston stop $K'$ and, rocking said stop, releases the motor piston which, in returning to the front, under the action of the main spring $J'$, introduces the first cartridge from the feed strip into the chamber. The final forward movement of the motor piston will rock the hammer sear and release the hammer, which will fly forward and fire the cartridge. After each shot, the powder gases, passing through the passage $a^7$, act on the head of the motor piston, which then cause the same changes automatically that were obtained in hand operation; that is to say, during its travel to the rear it controls the breech nut, the breech block, the ejection of the empty cartridge case, the cocking of the hammer, and the angular movement of the feed piece. During the return of the motor piston forward again, under the action of the main spring $J'$, the breech block is pushed forward, and the feed piece is rocked in the reverse direction, the breech is closed and the hammer released. To continue firing, hold the trigger to the rear until the feed strip is exhausted.

It will be noted that, during automatic firing, the hammer being locked on a special detent $r^8$ actuated by the motor piston during its return to the forward position, firing is absolutely prevented before the motor piston has reached its limit of forward travel, so that the cartridge cannot be fired until the breech is closed and the breech mechanism loaded.

The next to the last cartridge on the feed strip having been fired, the feed passage retakes its vertical position automatically under the action of the spring $N^0$. This movement is effected because the feed piece P is no longer sustained by the feed strip, its claw $p^4$ being then clear to the end of the feed strip, and above an opening in the housing $N'$; and the feed piece is pushed downward in its housing by the spring $P'$ until the pusher arm $p^3$ of the feed piece rests on top of the tongue $n^2$ of the feed block. When the feed piece assumes its lowest position, its heel is unlocked from the bearing $D^7$, and the feed passage swings back to the vertical position under the influence of the spring $N^0$. Every time that the cartridges on a feed strip have been fired, the feed block comes back to its vertical position. It is kept in that position by the coil spring $N^0$ acting on the bearing $n^5$, and by the lug $n^{60}$ being in contact with the rear part $g^5$ of the sight spring $G'$. A feed strip can be kept in reserve when the feed passage is in the vertical position, and loading can be executed by hand by unlocking the stop $K'$ after each shot. This may be done by bearing down on the finger lug $k^4$ (Figs. 1, 2, 19 and 26).

In case of mis-fire, the re-cocking of the hammer may be effected by springing the hammer cocking lever $R^3$ out of engagement with the notch in the side of the shoulder piece (Figs. 2 and 2$^b$), and swinging the hammer cocking lever downward and forward about its pivot until the hammer detent $r^3$ engages the detent $t$ on the trigger sear $T'$, the parts then being in the position shown in Fig. 39. Then return the hammer cocking lever to the initial position, leaving the hammer cocked. It may be fired then by pulling on the trigger.

To dismount or assemble the parts of the gun proceed as follows:

*Dismount the barrel.*—(1) Pull out the keys $B'$, keeping the barrel cover B closed.

(2) Swing the rear sight $S'$ in a vertical position, in order to free the barrel lock lever G from its engagement with the barrel. Make certain that the feed block Q is in its horizontal position.

(3) Open the barrel cover B by pivoting it about its hinges.

(4) Remove the barrel guard C by disengaging the circular rib $c$ from the receiver and the lug from the notch sleeve in the receiver.

(5) Withdraw the barrel by pulling it to the front.

*To dismount the feed mechanism.*—(1) Remove the feed block from the receiver. Place the feed block in its vertical position by opening the shutter $O^2$ which closes the ejection slot, by means of the finger grip $o^3$. Make certain that the breech is properly closed. Remove the pivot pin $k^{19}$ of the motor piston stop $K'$ by pulling it to the rear. Remove the coil spring $N^0$. Disengage the feed block from its guides on the receiver (after having made certain that the barrel cover is open) by drawing it to the front as well as rocking it on its guides, until the abutment $N^5$, acting as bearing for the coil spring $N^0$, faces the slot $d^{12}$ provided on the spring box $D^5$ of the receiver, and remove it.

(2) To dismount the mechanism contained in the feed block, remove the cover $N^6$ by turning it to the left through 180 degrees about its pivot, and withdraw it. Withdraw the pawl $P^2$, the spring $P'$, the feed piece P and the feed piece lever $P^3$.

*To dismount the locking mechanism.*—(1) Make certain that the firing mechanism is cocked.

(2) Pull out the shoulder piece locking pin W by means of the knurled knob until it abuts up against the pin $w^2$; pull the shoulder piece backward in order to disengage it from its guides on the receiver, and withdraw it.

(3) Withdraw the shoulder piece locking pin W.

(4) Withdraw the actuator spring $J'$, the actuator J, and the breech block I by pulling the cocking piece M to the rear, when it will drop out.

(5) Once the barrel is removed, withdraw the breech nut H to the front.

*To dismount the parts in the breech block.*—(1) In order to dismount the firing pin $I'$, first of all, free the guide $i^{14}$ from its seat on the firing pin by pulling the spring $i^{12}$ slightly to the front; swing the firing pin from right to left as far as it will go and remove it. Withdraw the firing pin spring.

(2) In order to dismount the extractor $I^2$, place the special hook ($r^{00}$ Fig. 2$^b$) between the last and before last coil of the extractor spring $T^3$ and pull it forward until the latter springs out of place; withdraw it, as well as the extractor.

*To dismount the parts in the cocking piece M.*—(1) Turn the handle $M'$ until the flattened portion of the head of the pin $M^3$ is parallel to the back of the housing of the cocking piece spring. Withdraw the pin to the rear and remove the handle.

(2) In order to remove the cocking piece spring M², push down the middle lug m' by means of the head of the firing pin, or other part, in the meantime pushing the lug m² downward and to the rear, so as to disengage the lug m³ from its seat; push it slightly, move backward, and withdraw it by pulling it forward.

*To dismount the barrel lock lever G.*—Remove the pin of the sight S', the sight, the sight spring G', and finally the lever G. The motor piston stop K' is withdrawn through the opening in the receiver after having removed the barrel.

*To dismount the firing mechanism.*—(1) Uncock the hammer, holding it back by hand.

(2) In order to remove the hammer, turn the hammer cocking lever R³ until the grip r¹⁰ strikes the part acting as a groove for the guide e¹¹ of the receiver and withdraw the cocking lever.

(3) Unlock the forward hook r⁶ of the hammer spring R² from the eye e⁹ in the shoulder piece by means of the hook r⁰⁶ provided on the grip r¹⁶, and withdraw the hammer through the passage e⁰ to the rear.

(4) Withdraw the hammer sear R'.

(5) In order to remove the trigger mechanism, spring the firing lever U out of the stop marked V; withdraw the trigger shaft t² by pulling on the lug t⁰²; remove the trigger sear T', together with the trigger piece T and their spring T².

(6) In order to remove the firing lever U, turn it upward and to the rear until the stud u' strikes the abutment and withdraw it.

To dismount the trigger sear, the trigger and their spring, remove the ends of the spring from their seats on the sear and the trigger, and separate these two parts.

In order to assemble the gun, proceed in the inverse order.

It is obvious that various modifications might be made in the construction, combination and arrangement of parts which could be used without departing from the spirit of our invention.

Having thus described our invention, what we claim and desire to secure by Letters Patent of the United States is:—

1. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically projecting said tang into said recess in the breech block and withdrawing it therefrom, substantially as described.

2. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically lifting said tang on the rearward movement of the motor piston into engagement with said breech block, when the latter is unlocked from the breech nut, and for lowering said tang out of engagement with said breech block when the latter reaches the position for locking in the breech nut on the forward movement of the motor piston, substantially as described.

3. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically projecting said tang into said recess, and releasing it therefrom, said means comprising a fixed cam in the receiver, and a cam face on the heel of the motor piston engaging therewith, substantially as described.

4. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically projecting said tang into said recess in the breech block and withdrawing it therefrom, and an extractor carried by said reciprocating breech block, substantially as described.

5. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically lifting said tang on the rearward movement of the motor piston into engagement with said breech block, when the latter is unlocked from the breech nut, and for lowering said tang out of engagement with said breech block when the latter reaches the position for locking in the breech nut on the forward movement of the motor piston, and an extractor carried by said reciprocating breech block, substantially as described.

6. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically projecting said tang into said recess, and releasing it therefrom, said means comprising a fixed cam in the receiver, and a cam face on the heel of the motor piston engaging therewith, and an extractor carried by said reciprocating breech block, substantially as described.

7. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically projecting said tang into said recess in the breech block and withdrawing it therefrom, with an extractor carried by said reciprocating breech block, and an ejector projecting into a groove in said breech block and engaging the head of the cartridge case when the breech block is drawn rearward, substantially as described.

8. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically lifting said tang on the rearward movement of the motor piston into engagement with said breech block, when the latter is unlocked from the breech nut, and for lowering said tang out of engagement with said breech block when the latter reaches the position for locking in the breech nut on the forward movement of the motor piston, with an extractor carried by said reciprocating breech block, and an ejector projecting into a groove in said breech block and engaging the head of the cartridge case when the breech block is drawn rearward, substantially as described.

9. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston provided with an upwardly-projecting tang, a cam engagement between said motor piston and said breech nut for rotating the nut, a reciprocating breech block provided with interrupted screw threads registering with those of the breech nut, said breech block being provided with a recess to receive said tang, with means for automatically projecting said tang into said recess, and releasing it therefrom, said means comprising a fixed cam in the receiver, and a cam face on the heel of the motor piston engaging therewith, with an extractor carried by said reciprocating breech block, and an ejector projecting into a groove in said breech block and engaging the head of the cartridge case when the breech block is drawn rearward, substantially as described.

10. In an automatic gun, the combination with the gun barrel and receiver, and means for rigidly securing the gun barrel to the receiver, of a breech nut revolubly mounted in said receiver and held against longitudinal motion in rear of said barrel, said breech nut being provided with interrupted screw threads, a reciprocating motor piston, a cam engagement between said motor piston and said breech nut for rotating the nut, a reciprocating breech block provided with interrupted screw threads registering with those of the breech nut with automatic means for locking the breech block to the motor piston, when the breech block is disengaged from the breech nut, said means comprising a tang on the motor piston adapted to engage a recess in the breech block, and a cam in the receiver adapted to wedge the heel of the motor piston upward to project said tang into said recess, substantially as described.

11. In a gun of the character described, the combination with a receiver and a barrel cover, of a barrel revolubly mounted between said receiver and said barrel cover, the said barrel being provided with a gas passage, and with outwardly-projecting lugs, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a main spring stop pivoted between said barrel and said motor piston, and having one arm adapted, when the stop is rocked, to engage said main spring when the motor piston is in the rearward position, and the other arm adapted to disconnect said cocking piece from said motor piston when said pivoted stop is rocked in the reverse direction, with means for turning said barrel and causing said lugs to engage one or the other of the arms of the main spring stop, and to open or close said gas passage, substantially as described.

12. In a gun of the character described, the combination with a receiver and a barrel cover, of a barrel revolubly mounted between said receiver and said barrel cover, the said barrel being provided with a gas passage, and with outwardly-projecting lugs, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a main spring stop pivoted between said barrel and said motor piston, and having one arm adapted, when the stop is rocked, to engage said main spring when the motor piston is in the rearward position, and the other arm adapted to disconnect said cocking piece from said motor piston when said pivoted stop is rocked in the reverse direction, means for turning said barrel and causing said lugs to engage one or the other of the arms of the main spring stop, and to open or close said gas passage, with means for locking said barrel in the fixed angular relation to the receiver, substantially as described.

13. In a gun of the character described, the combination with a receiver and a barrel cover, of a barrel revolubly mounted between said receiver and said barrel cover, the said barrel being provided with a gas passage, and with outwardly-projecting lugs, of a motor piston operating the breech closure and firing mechanism, mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a main spring stop pivoted between said barrel and said motor piston, and having one arm adapted, when the stop is rocked, to engage said main spring when the motor piston is in the rearward position, and the other arm adapted to disconnect said cocking piece from said motor piston when said pivoted stop is rocked in the reverse direction, means for turning said barrel and causing said lugs to engage one or the other of the arms of the main spring stop, and to open or close said gas passage, with a spring-operated lock, for holding the barrel in the desired angular position, substantially as described.

14. In a gun of the character described, the combination with a receiver and a barrel cover, of a barrel revolubly mounted between said receiver and said barrel cover, the said barrel being provided with a gas passage, and with outwardly-projecting lugs, of a motor piston operating the breech closure and firing mechanism, mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a main spring stop pivoted between said barrel and said motor piston, and having one arm adapted, when the stop is rocked, to engage said main spring when the motor piston is in the rearward position, and the other arm adapted to disconnect said cocking piece from said motor piston when said pivoted stop is rocked in the reverse direction, means for turning said barrel and causing said lugs to engage one or the other of the arms of the main spring stop, and to open or close said passage, means for locking said barrel in the fixed angular relation to the receiver, said means comprising teeth on the barrel, and a spring impressed lock mounted on the barrel cover and provided with teeth engaging those on the barrel, substantially as described.

15. In a gun of the character described, the combination with a receiver and a barrel cover, of a barrel revolubly mounted between said receiver and said barrel cover, the said barrel being provided with a gas passage, with a cam groove, and with outwardly-projecting lugs, of a motor piston mounted in said receiver, and adapted to be forced rearward by the powder gases escaping through such passage when open, a main spring also mounted in said receiver and adapted to return said motor piston to the forward position, a motor piston stop pivoted in said receiver, a cocking piece and means for connecting the same to said motor piston for reciprocating same by hand when desired, a main spring stop pivoted between said barrel and said motor piston, and having one arm adapted, when the stop is rocked, to engage said main spring when the motor piston is in the rearward position, and the other arm adapted to disconnect said cocking piece from said motor piston when said pivoted stop is rocked in the reverse direction, with means for turning said barrel, thus causing said motor piston stop to project into or move out of said cam groove, and causing said lugs to engage one or the other of the arms of the main spring stop, and to open or close said gas passage, substantially as described.

16. In a gun of the character described, the combination with a receiver and a barrel cover, of a barrel revolubly mounted between said receiver and said barrel cover, the said barrel being provided with a gas passage, and with outwardly-projecting lugs, of a motor piston mounted in said receiver, and adapted to be forced rearward by the powder gases escaping through such passage when open, a main spring also mounted in said receiver and adapted to return said motor piston to the forward position, a motor piston stop pivoted on said receiver, a cocking piece and means for connecting the same to said motor piston for reciprocating same by hand when desired, a main spring stop pivoted between said barrel and said motor piston, and having one arm adapted, when the stop is rocked, to engage said main spring when the motor piston is in the rearward position, and the other arm adapted to disconnect said cocking piece from said motor piston when said pivoted stop is rocked in the reverse direction, means for turning said barrel, thus causing said motor piston stop to project into or move out of said cam groove, and causing said lugs to engage one or the other of the arms of the main spring stop, and to open or close said gas passage, with means for locking said barrel in the fixed angular relation to the receiver, substantially as described.

17. In a gun of the character decsribed, the combination with a receiver and a barrel cover, of a barrel revolubly mounted between said receiver and said barrel cover, the said barrel being provided with a gas passage, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a main spring stop pivoted between said barrel and said motor piston, controlled by the rotation of the barrel through an angular distance, and adapted to engage said main spring when the motor piston is in the rearward position, means for turning said barrel, and thereby operating said main spring stop, and opening or closing said gas passage, substantially as described.

18. In a gun of the character described, the combination with a receiver and a barrel cover, of a barrel revolubly mounted between said receiver and said barrel cover, the said barrel being provided with a gas passage, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a main spring stop pivoted between said barrel and said motor piston, controlled by the rotation of the barrel through an angular distance, and adapted to engage said main spring when the motor piston is in the rearward position, means for turning said barrel, thereby operating said main spring stop, and opening or closing said gas passage, with means for locking said barrel in the fixed angular relation to the receiver, substantially as described.

19. In a gun of the character described, the combination with a receiver and a barrel cover, of a barrel revolubly mounted between said receiver and said barrel cover, the said barrel being provided with a gas passage, and a cam groove, of a motor piston mounted in said receiver, and adapted to be forced rearward by the powder gases escaping through such passage when open, a main spring also mounted in said receiver and adapted to return said motor piston to the forward position, a motor piston stop pivoted on said receiver, a cocking piece and means for connecting the same to said motor piston for reciprocating same by hand when desired, a main spring stop pivoted between said barrel and said motor piston, controlled by the rotation of the barrel through an angular distance, and adapted to engage said main spring when the motor piston is in the rearward position, means for turning said barrel, thus causing said motor piston stop to project into or move out of said cam groove, and also operating said main spring stop, and opening or closing said gas passage, substantially as described.

20. In a gun of the character described, the combination with a receiver and a barrel cover, of a barrel revolubly mounted between said receiver and said barrel cover, the said barrel being provided with a gas passage, and a cam groove of a motor piston mounted in said receiver, and adapted to be forced rearward by the powder gases escaping through such passage when open, a main spring also mounted in said receiver and adapted to return said motor piston to the forward position, a motor piston stop pivoted on said receiver, a cocking piece and means for connecting the same to said motor piston for reciprocating same by hand when desired, a main spring stop pivoted between said barrel and said motor piston, controlled by the rotation of the barrel through an angular distance, and adapted to engage said main spring when the motor piston is in the rearward position, with means for turning said barrel, thus causing said motor piston stop to project into or move out of said cam groove, thereby operating said main spring stop, and opening or closing said gas passage, with means for locking said barrel in the fixed angular relation to the receiver, substantially as described.

21. In a gun of the character described, the combination with a receiver and the barrel cover, of a barrel revolubly mounted between said receiver and barrel cover and provided with a passage for the escape of gas, a motor piston and main spring mounted in said receiver, and adapted to be operated by the powder gases or by hand, means for operating said motor piston by hand when desired, a main spring stop, and a motor piston stop, with means controlled by the turning of the barrel for operating both of said stops, substantially as described.

22. In a gun of the character described, the combination with the receiver and the barrel cover, of a barrel revolubly mounted between said receiver and barrel cover, and provided with a passage for the escape of gas, a motor piston and main spring mounted in said receiver and adapted to be operated by the powder gases or by hand, means for operating said motor piston by hand when desired, a main spring stop, and a motor piston stop with means, controlled by the turning of the barrel, for throwing said main spring stop into engagement with the main spring and throwing out of action said piston stop when the gun is to be fired by hand, and for releasing said spring stop when the gun is to be fired automatically, substantially as described.

23. In a gun of the character described, the combination with the receiver and the barrel cover, of a barrel revolubly mounted between said receiver and barrel cover, and provided with a passage for the escape of gas, a motor piston and main spring mounted in said receiver and adapted to be operated by the powder gases or by hand, means for operating said motor piston by hand when desired, a main spring stop, and a motor piston stop, with means controlled by the turning of the barrel for operating both of said stops, and a spring impressed lock engaging said barrel, and locking the same against rotation when desired, substantially as described.

24. In a gun of the character described, the combination with the receiver and the barrel cover, of a barrel revolubly mounted between said receiver and barrel cover, and provided with a passage for the escape of gas, a motor piston and main spring mounted in said receiver and adapted to be operated by the powder gases, or by hand, means for operating said motor piston by hand when desired, a main spring stop, and a motor piston stop with means controlled by the turning of the barrel for throwing said main spring stop into engagement with the main spring and throwing out of action said piston stop when the gun is to be fired by hand, and for releasing said spring stop when the gun is to be fired automatically, and a spring impressed lock engaging said barrel, and locking the same against rotation when desired, substantially as described.

25. In a gun of the character described, the combination with the receiver and the barrel cover, of a barrel revolubly mounted between said receiver and barrel cover and provided with engaging teeth, and with a passage for the escape of gas, a motor piston and main spring mounted in said receiver and adapted to be operated by the powder gases, or by hand, means for operating said motor piston by hand when desired, a main spring stop, and a motor piston stop with means controlled by the turning of the barrel for operating both of said stops, and a pivoted lock mounted on said cover and adapted to engage said teeth in the barrel and to lock the barrel in the desired position, substantially as described.

26. In a gun of the character described, the combination with the receiver and the barrel cover, of a barrel revolubly mounted between said receiver and barrel cover, and provided with engaging teeth, and with a passage for the escape of gas, a motor piston and main spring mounted in said receiver and adapted to be operated by the powder gases or by hand, means for operating said motor piston by hand when desired, a main spring stop, and a motor piston stop, with means controlled by the turning of the barrel for throwing said main spring stop into engagement with the main spring and throwing out of action said piston stop when the gun is to be fired by hand, and for releasing said spring stop when the gun is to be fired automatically, and a pivoted lock mounted on said cover and adapted to engage said teeth in the barrel and to lock the barrel in the desired position, substantially as described.

27. In a gun of the character described, the combination with the receiver and the barrel cover, of a barrel revolubly mounted between said receiver and barrel cover and provided with engaging teeth, and with a passage for the escape of gas, a pivoted rear sight hinged to said barrel cover, a motor piston and main spring mounted in said receiver and adapted to be operated by the powder gases or by hand, means for operating said motor piston by hand when desired, a main spring stop, and a motor piston stop, with means controlled by the turning of the barrel for operating both of said stops, and a pivoted lock mounted on said cover and adapted to engage said teeth in the barrel and to lock the barrel in the desired position, with a leaf spring interposed between said rear sight and said pivoted lock, and normally holding said lock in engagement with the barrel, substantially as described.

28. In a gun of the character described, the combination with the receiver and the barrel cover, of a barrel revolubly mounted between said receiver and barrel cover and provided with engaging teeth, and with a passage for the escape of gas, a pivoted rear sight hinged to said barrel cover, a motor piston and main spring mounted in said receiver and adapted to be operated by the powder gases or by hand, means for operating said motor piston by hand when desired, a main spring stop, and a motor piston stop, with means, controlled by the turning of the barrel, for throwing said main spring stop into engagement with the main spring, and throwing out of action said piston stop when the gun is to be fired by hand, and for releasing said spring stop when the gun is to be fired automatically, and a pivoted lock mounted on said cover and adapted to engage said teeth in the barrel and to lock the barrel in the desired position, with a leaf spring interposed between said rear sight and said pivoted lock, and normally holding said lock in engagement with the barrel, substantially as described.

29. In a gun of the character described, the combination with the receiver and the barrel cover, of a barrel revolubly mounted between said receiver and barrel cover and provided with a passage for the escape of gas, a motor piston and main spring mounted in said receiver and adapted to be operated by the powder gases or by hand, means for operating said motor piston by hand when desired, a main spring stop, and a pivoted motor piston stop with means controlled by the turning of the barrel for operating both of said stops, said means comprising a cam groove in the gun engaging said motor piston stop, and a pair of lugs projecting from the barrel engaging the pivoted main spring stop, substantially as described.

30. In a gun of the character described, the combination with the receiver and the barrel cover, of a barrel revolubly mounted between said receiver and barrel cover and provided with a passage for the escape of gas, a motor piston and main spring mounted in said receiver and adapted to be operated by the powder gases or by hand, means for operating said motor piston by hand when desired, a main spring stop, and a pivoted motor piston stop with means controlled by the turning of the barrel for throwing said main spring stop into engagement with the main spring and throwing out of action said piston stop when the gun is to be fired by hand, and for releasing said spring stop when the gun is to be fired automatically, said means comprising a cam groove in the gun engaging said motor piston stop, and a pair of lugs projecting from the barrel engaging the pivoted main spring stop, substantially as described.

31. In a gun of the character described, the combination with the receiver and the barrel cover, of a barrel revolubly mounted between said receiver and barrel cover, and provided with a passage for the escape of gas, a motor piston and main spring mounted in said receiver and adapted to be operated by the powder gases, or by hand, means for operating said motor piston by hand when desired, comprising a cocking piece, and a spring detachably connecting same to the motor piston, a main spring stop, and a motor piston stop, with means controlled by the turning of the barrel for operating both of said stops, substantially as described.

32. In a gun of the character described, the combination with the receiver and the barrel cover, of a barrel revolubly mounted between said receiver and barrel cover, and provided with a passage for the escape of gas, a motor piston and main spring mounted in said receiver and adapted to be operated by the powder gases, or by hand, means for operating said motor piston by hand when desired, comprising a cocking piece, and a spring detachably connecting same to the motor piston, a main spring stop, and a motor piston stop, with means controlled by the turning of the barrel for throwing said main spring stop into engagement with the main spring and throwing out of action said piston stop, when the gun is to be fired by hand, and for releasing said spring stop, and simultaneously throwing out of engagement said cocking piece spring, when the gun is to be fired automatically, substantially as described.

33. In a gun of the character described, the combination with the receiver and the barrel cover, of a barrel revolubly mounted between said receiver and barrel cover, and provided with a passage for the escape of gas, a motor piston and main spring mounted in said receiver and adapted to be operated by the powder gases, or by hand, means for operating said motor piston by hand when desired, comprising a cocking piece, and a spring detachably connecting same to the motor piston, a main spring stop, and a motor piston stop, with means controlled by the turning of the barrel for operating both of said stops, said means comprising a cam groove in the gun engaging said motor piston stop, and a pair of lugs projecting from the barrel engaging the pivoted main spring stop, substantially as described.

34. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, and means for automatically locking said feed block in the horizontal position during automatic firing, substantially as described.

35. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, and means operated by the insertion of a feed strip for automatically locking said feed block in the horizontal position during automatic firing, substantially as described.

36. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, and means operated by the lifting of said feed piece for automatically locking said feed block, when in the horizontal position, to the receiver, substantially as described.

37. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, and means for automatically locking said feed block, when in the horizontal position, to the receiver, comprising a bearing on the receiver engaging the heel of said feed piece when the latter is lifted, substantially as described.

38. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, and means for automatically locking said feed block in the horizontal position during automatic firing, with means for automatically locking said feed block in the vertical position, and for releasing same when desired, substantially as described.

39. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, and means for automatically locking said feed block in the horizontal position during automatic firing, with locking means, released by the pressure of the first cartridge when the feed strip is shoved home, for automatically locking said feed block in the vertical position and releasing it when desired, substantially as described.

40. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for automatically locking said feed block in the horizontal position during automatic firing, substantially as described.

41. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means, operated by the insertion of a feed strip, for automatically locking said feed block in the horizontal position during automatic firing, substantially as described.

42. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block, controlled by said motor piston for firing automatically, but inoperative when the feed passage is in the vertical position, comprising a vertically-movable rocking feed piece, and means operated by the lifting of said feed piece for automatically locking said feed block, when in the horizontal position, to the receiver, substantially as described.

43. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver, and said feed block and normally tending to swing said feed block to the vertical position, feed mechanism mounted in said feed block, controlled by said motor piston for firing automatically, but inoperative when the feed passage is in the vertical position, comprising a vertically-movable rocking feed piece, and means for automatically locking said feed block, when in the horizontal position, to the receiver, comprising a bearing on the receiver engaging the heel of said feed piece when the latter is lifted, substantially as described.

44. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for automatically locking said feed block in the horizontal position during automatic firing, with means for automatically locking said feed block in the vertical position, and for releasing same when desired, substantially as described.

45. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for automatically locking said feed block in the horizontal position during automatic firing, with locking means, released by the pressure of the first cartridge when the feed strip is shoved home, for automatically locking said feed block in the vertical position, and releasing it when desired, substantially as described.

46. In a gun of the character described, the combination with the gun barrel and a receiver provided with curved guides, of a motor piston mounted in said receiver, with means for operating said motor piston automatically by the powder gases, or by hand, a feed block having curved guides engaging those in the receiver mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, and means for locking said feed block in either the vertical or the horizontal position, substantially as described.

47. In a gun of the character described, the combination with the gun barrel, and a receiver provided with curved guides, of a motor piston mounted in said receiver, with means for operating said motor piston automatically by the powder gases, or by hand, a feed block, having curved guides engaging those on the receiver, mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, and means for automatically locking said feed block in the horizontal position during automatic firing, with means for automatically locking said feed block in the vertical position, and means for releasing same when desired, substantially as described.

48. In a gun of the character described, the combination with the gun barrel and a receiver provided with curved guides, of a motor piston mounted in said receiver, with means for operating said motor piston automatically by the powder gases, or by hand, a feed block having curved guides engaging those in the receiver mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for locking said feed block in either the vertical or the horizontal position, substantially as described.

49. In a gun of the character described, the combination with the gun barrel, and a receiver provided with curved guides, of a motor piston mounted in said receiver, with means for operating said motor piston automatically by the powder gases, or by hand, a feed block, having curved guides engaging those on the receiver, mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for automatically locking said feed block in the horizontal position during automatic firing, with means for automatically locking said feed block in the vertical position, and means for releasing same when desired, substantially as described.

50. In a gun of the character described, the combination with the gun barrel and receiver, of a motor piston mounted in said receiver and provided with a groove in the bottom thereof, with means for operating said motor piston, automatically by the powder gases, or by hand, a feed block mounted to swing on said receiver and to assume either the horizontal position for automatic firing, or the vertical position for hand firing, and a hook carried by said feed block and adapted to engage in said groove in the motor piston, when the feed block is in the horizontal position, with feed mechanism mounted in said feed block controlled by said motor piston for firing automatically, but inoperative when the feed passage is in the vertical position, and independent means for automatically locking said feed block in the horizontal position when a feed strip is inserted, substantially as described.

51. In a gun of the character described, the combination with the gun barrel and receiver, of a motor piston mounted in said receiver and provided with a groove in the bottom thereof, with means for operating said motor piston, automatically by the powder gases, or by hand, a feed block mounted to swing on said receiver and to assume either the horizontal position for automatic firing, or the vertical position for hand firing, and a hook carried by said feed block and adapted to engage in said groove in the motor piston, when the feed block is in the horizontal position, with feed mechanism mounted in said feed block controlled by said motor piston for firing automatically, but inoperative when the feed passage is in the vertical position, substantially as described.

52. In a gun of the character described, the combination with the gun barrel and receiver, of a motor piston mounted in said receiver and provided with a longitudinal groove in its bottom, with means for operating said motor piston, automatically by the powder gases, or by hand, a feed block mounted to swing on said receiver and to assume either the horizontal position for automatic firing, or the vertical position for hand firing, a hook carried by said feed block adapted to engage in said groove in the motor piston, when the feed block is in the horizontal position, feed mechanism mounted in said feed block controlled by said motor piston for firing automatically, but inoperative when the feed passage is in the vertical position, and means operated by the insertion of a feed strip for automatically locking said feed block in the horizontal position, substantially as described.

53. In a gun of the character described, the combination with the gun barrel and receiver, of a motor piston mounted in said receiver and provided with a groove in the bottom thereof, with means for operating said motor piston, automatically by the powder gases, or by hand, a feed block mounted to swing on said receiver and to assume either the horizontal position for automatic firing, or the vertical position for hand firing, and a hook carried by said feed block and adapted to engage in said groove in the motor piston, when the feed block is in the horizontal position, with feed mechanism mounted in said feed block controlled by said motor piston for firing automatically, but inoperative when the feed passage is in the vertical position, and independent means for automatically locking said feed block in the horizontal position when a feed strip is inserted, with means for automatically locking the feed block, when in the vertical position, to the receiver, and for releasing same when desired, substantially as described.

54. In a gun of the character described, the combination with the gun barrel and receiver, of a motor piston mounted in said receiver and provided with a groove in the bottom thereof, with means for operating said motor piston, automatically by the powder gases, or by hand, a feed block mounted to swing on said receiver and to assume either the horizontal position for automatic firing, or the vertical position for hand firing, and a hook carried by said feed block and adapted to engage in said groove in the motor piston, when the feed block is in the horizontal position, with feed mechanism mounted in said feed block controlled by said motor piston for firing automatically but inoperative when the feed passage is in the vertical position, with means for automatically locking the feed block, when in the vertical position, to the receiver, and for releasing same when desired, substantially as described.

55. In a gun of the character described, the combination with the gun barrel and receiver, of a motor piston mounted in said receiver and provided with a longitudinal groove in its bottom, with means for operating said motor piston, automatically by the powder gases, or by hand, a feed block mounted to swing on said receiver and to assume either the horizontal position for automatic firing, or the vertical position for hand firing, a hook carried by said feed block adapted to engage in said groove in the motor piston, when the feed block is in the horizontal position, feed mechanism mounted in said feed block controlled by said motor piston for firing automatically, but inoperative when the feed passage is in the vertical position, and means operated by the insertion of a feed strip for automatically locking said feed block in the horizontal position, with means for automatically locking the feed block, when in the vertical position, to the receiver, and for releasing same when desired, substantially as described.

56. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, a shutter pivoted to said feed block and adapted to close the ejection opening in said feed block, and means controlled by the closing of said shutter for locking the feed block, when in the horizontal position, to the receiver, substantially as described.

57. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, a shutter pivoted to the feed block and having an arm adapted to lift said feed piece when said shutter is closed, and means operated by the lifting of said feed piece for locking said feed block, when in the horizontal position, to the receiver, substantially as described.

58. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, a shutter pivoted to the feed block and having an arm adapted to lift said feed piece when said shutter is closed, and means for automatically locking said feed block, when in the horizontal position, to the receiver, comprising a bearing on the receiver engaging the heel of said feed piece when the latter is lifted, substantially as described.

59. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, a shutter pivoted to said feed block and adapted to close the ejection opening in said receiver, and means controlled by the closing of said shutter for locking the feed block, when in the horizontal position, to the receiver, with means for automatically locking said feed block in the vertical position, and for releasing same when desired, substantially as described.

60. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, a shutter pivoted to said feed block and adapted to close the ejection opening in said receiver, and means controlled by the closing of said shutter for locking the feed block, when in the horizontal position, to the receiver, with locking means, released by the pressure of the first cartridge when the feed strip is shoved home, for automatically locking said feed block in the vertical position and releasing it when desired, substantially as described.

61. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, a shutter pivoted to said feed block and adapted to close the ejection opening in said receiver, and means controlled by the closing of said shutter for locking the feed block, when in the horizontal position, to the receiver, substantially as described.

62. In a gun of the character described, the combination with the gun barrel, the sight for the barrel, and the sight spring, provided with a rearwardly-projecting end, of the receiver, the motor piston mounted in said receiver, with means for operating said motor piston automatically by the powder gases, or by hand, a feed block mounted to swing on said receiver and to assume either the horizontal position for automatic firing, or the vertical position for hand firing, a stop on said feed block adapted to engage the end of said spring, a coil spring interposed between said receiver and said feed block and normally tending to swing said feed block to the vertical position, until arrested by said stop, and feed mechanism mounted in said feed block, controlled by said motor piston for firing automatically, but inoperative when the feed passage is in the vertical position, substantially as described.

63. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, when released by the feed strip, feed mechanism mounted in said feed block controlled by said motor piston, and means operated by said feed block, as it returns automatically to the vertical position, for braking said motor piston, substantially as described.

64. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, when released by the feed strip, feed mechanism mounted in said feed block controlled by said motor piston, and means operated by said feed block, as it returns automatically to the vertical position, for braking said motor piston, said means comprising a leaf spring and a brake shoe carried thereby, the said shoe being pressed inwardly by the swinging of the feed block under the action of its coil spring, and the said leaf spring tending to withdraw the brake shoe from engagement with the motor piston, substantially as described.

65. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for automatically locking said feed block in the horizontal position during automatic firing, with locking means, released by the pressure of the first cartridge when the feed strip is shoved home, for automatically locking said feed block in the vertical position, and releasing it when desired, said locking means comprising a hook fixed on the receiver, and a hook carried by the feed block, and a spring normally pressing the latter hook into engagement with the former, substantially as described.

66. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for automatically locking said feed block in the horizontal position during automatic firing, with locking means, released by the pressure of the first cartridge when the feed strip is shoved home, for automatically locking said feed block in the vertical position, and releasing it when desired, said locking means comprising a hook fixed on the receiver, and a hook carried by the feed block, and a spring normally pressing the latter hook into engagement with the former, with means for disengaging said hooks, substantially as described.

67. In a gun of the character described, the combination with the gun barrel and receiver, of a motor piston mounted in said receiver, with means for operating said motor piston, automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for automatically locking said feed block in the horizontal position during automatic firing, with locking means, released by the pressure of the first cartridge when the feed strip is shoved home, for automatically locking said feed block in the vertical position, and releasing it when desired, said locking means comprising a hook fixed on the receiver, and a hook carried by the feed block, and a spring normally pressing the latter hook into engagement with the former, with means for disengaging said hooks, either by hand or by the insertion of a feed strip, substantially as described.

68. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, a coil spring interposed between said receiver and said feed block and normally tending to swing said feed block to the vertical position, feed mechanism mounted in said feed block controlled by said motor piston for firing automatically, but inoperative when the feed passage is in the vertical position, and means for automatically locking said feed block in the horizontal position during automatic firing, with locking means, released by the pressure of the first cartridge when the feed strip is shoved home, for automatically locking said feed block in the vertical position, and releasing it when desired, said locking means comprising a hook fixed on the receiver, and a hook carried by the feed block, and a spring normally pressing the latter hook into engagement with the former, with means for disengaging said hooks, said means comprising a hand lever pivoted to the feed block, substantially as described.

69. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, a hand lever pivoted to the feed block and adapted to lift said feed piece when desired, and means operated by the lifting of said feed piece for locking said feed block, when in the horizontal position, to the receiver, substantially as described.

70. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, a hand lever pivoted to the feed block and adapted to lift said feed piece when desired, and means for locking said feed block, when in the horizontal position, to the receiver, comprising a bearing on the receiver engaging the heel of said feed piece when the latter is lifted, substantially as described.

71. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, a cam carried by the feed block and adapted to automatically lift said feed piece when it is rocked by the motor piston, and means operated by the lifting of said feed piece for locking said feed block, when in the horizontal position, to the receiver, substantially as described.

72. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, a cam carried by the feed block and adapted to automatically lift said feed piece when it is rocked by the motor piston, and means for locking said feed block, when in the horizontal position, to the receiver, comprising a bearing on the receiver engaging the heel of said feed piece when the latter is lifted, substantially as described.

73. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, means for lifting said feed piece, a pawl mounted in said feed block and adapted to hold the feed strip against backward movement, an arm carried by said pawl adapted to engage said feed piece and to cause the pawl to be lifted when the feed piece is lifted, substantially as described.

74. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, means for lifting said feed piece, a pawl mounted in said feed block and adapted to hold the feed strip against backward movement, an arm carried by said pawl adapted to engage said feed piece and to cause the pawl to be lifted when the feed piece is lifted, substantially as described.

75. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, means for lifting said feed piece, a spring pawl mounted in said feed block and having a claw adapted to engage the feed strip and to hold it against backward movement, said pawl having an arm adapted to engage the feed piece and to be lifted thereby, when the feed piece is lifted, whereby the pawl is disengaged from the feed strip, and means operated by the lifting of said feed piece for locking said feed block, when in the horizontal position, to the receiver, substantially as described.

76. In a gun of the character described, the combination with the gun barrel and receiver, of a motor piston mounted in said receiver, with means for operating said motor piston automatically by the powder gases, or by hand, a feed block mounted to swing on said receiver and to assume either the horizontal position for automatic firing, or the vertical position for hand firing, feed mechanism mounted in said feed block controlled by said motor piston for firing automatically, but inoperative when the feed passage is in the vertical position, comprising a vertically-movable rocking feed piece, means for lifting said feed piece, a spring pawl mounted in said feed block and having a claw adapted to engage the feed strip and to hold it against backward movement, said pawl having an arm adapted to engage the feed piece and to be lifted thereby, when the feed piece is lifted, whereby the pawl is disengaged from the feed strip, and means for locking said feed block, when in the horizontal position, to the receiver, comprising a bearing on the receiver engaging the heel of said feed piece when the latter is lifted, substantially as described.

77. In a gun of the character described, the combination with a feed block provided with engaging ribs, and a swinging cover adapted to engage said ribs, of a spring pawl, for preventing backward movement of the feed strip, mounted in said feed block and having an outwardly projecting lug adapted to engage said cover and serve as a bearing for said spring, and also to normally lock the cover in place on said feed block, substantially as described.

78. In a gun of the character described, the combination with a feed block provided with engaging ribs, and a swinging cover adapted to engage said ribs, of a vertically-movable feed piece having its upper bearing projecting downward from said cover, and a spring pawl, for preventing backward movement of the feed strip, mounted in said feed block and having an outwardly-projecting lug adapted to engage said cover and serve as a bearing for said spring, and also to normally lock the cover in place on said feed block, substantially as described.

79. In a gun of the character described, the combination with a feed block provided with engaging ribs, and a swinging cover adapted to engage said ribs, of a vertically-movable feed piece having its upper bearing projecting downward from said cover, and a spring pawl, for preventing backward movement of the feed strip, mounted in said feed block and having an outwardly-projecting lug adapted to engage said cover and serve as a bearing for said spring, and also to normally lock the cover in place on said feed block, said spring pawl being provided with an arm projecting over said feed piece and adapted to be lifted when said feed piece is lifted, whereby said pawl is lifted clear of the feed strip, substantially as described.

80. In a gun of the character described, the combination with a receiver and a barrel cover, of a barrel revolubly mounted between said receiver and said barrel cover, the said barrel being provided with a gas passage, and a cam groove, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a motor piston stop pivoted to the receiver and adapted to engage the motor piston when it is in the rearward position, the said stop having a lug adapted to project into said cam groove, when the barrel is turned to the position for automatic firing, and to be cammed out of said cam groove when the barrel is turned to the position for hand fire, substantially as described.

81. In a gun of the character described, the combination with a receiver and a barrel cover, of a barrel revolubly mounted between said receiver and said barrel cover, the said barrel being provided with a gas passage, and a cam groove, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a motor piston stop pivoted to the receiver and adapted to engage the motor piston when it is in the rearward position, the said stop having a lug adapted to project into said cam groove, when the barrel is turned to the position for automatic firing, and to be cammed out of said cam groove when the barrel is turned to the position for hand fire, the said piston stop being also provided with a hand lug for swinging same out of engagement by hand when desired, substantially as described.

82. In a gun of the character described, the combination with a receiver and a barrel cover, of a barrel revolubly mounted between said receiver and said barrel cover, the said barrel being provided with a gas passage, and a cam groove, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a motor piston stop pivoted to the receiver and adapted to engage the motor piston when it is in the rearward position, the said stop having a lug adapted to project into said cam groove, when the barrel is turned to the position for automatic firing, and to be cammed out of said cam groove when the barrel is turned to the position for hand fire, the said stop being also provided with a nipple to engage the cocking piece, and to be thereby held out of engagement with said motor piston, substantially as described.

83. In a gun of the character described, the combination with a receiver and a barrel cover, of a barrel revolubly mounted between said receiver and said barrel cover, the said barrel being provided with a gas passage, and a cam groove, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a motor piston stop pivoted to the receiver and adapted to engage the motor piston when it is in the rearward position, the said stop having a lug adapted to project into said cam groove, when the barrel is turned to the position for automatic firing, and to be cammed out of said cam groove when the barrel is turned to the position for hand fire, the said piston stop being also provided with a hand lug for swinging same out of engagement by hand when desired, and the said stop being also provided with a nipple to engage the cocking piece, and to be thereby held out of engagement with said motor piston, substantially as described.

84. In a gun of the character described, the combination with a receiver and a barrel cover, of a barrel revolubly mounted between said receiver and said barrel cover, the said barrel being provided with a gas passage, and a cam groove, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a pivoted handle for said cocking piece provided with a recess therein, a motor piston stop pivoted to the receiver and adapted to engage the motor piston when it is in the rearward position, the said stop having a lug adapted to project into said cam groove, when the barrel is turned to the position for automatic firing, and to be cammed out of said cam groove when the barrel is turned to the position for hand fire, the said stop being also provided with a nipple to engage said recess in said handle, and hold the stop out of engagement with said piston, substantially as described.

85. In a gun of the character described, the combination with a receiver and a barrel, the said barrel being provided with a gas passage, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, and a motor piston stop pivoted to the receiver and adapted to engage the motor piston when it is in the rearward position, the said stop being also provided with a nipple to engage the cocking piece, and to be thereby held out of engagement with said motor piston, substantially as described.

86. In a gun of the character described, the combination with a receiver and a barrel, the said barrel being provided with a gas passage, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, and a motor piston stop pivoted to the receiver and adapted to engage the motor piston when it is in the rearward position, the said piston stop being also provided with a hand lug for swinging same out of engagement by hand when desired, and the said stop being also provided with a nipple to engage the cocking piece, and to be thereby held out of engagement with said motor piston, substantially as described.

87. In a gun of the character described, the combination with a receiver and a barrel, the said barrel being provided with a gas passage, of a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a pivoted handle for said cocking piece provided with a recess therein, and a motor piston stop pivoted to the receiver and adapted to engage the motor piston when it is in the rearward position, the said stop being also provided with a nipple to engage said recess in said handle, and hold the stop out of engagement with said piston, substantially as described.

88. In a gun of the character described, the combination with a receiver and a barrel, the said barrel being provided with a gas passage, of a feed block mounted to swing on said receiver in position for hand fire, or for automatic fire, or vice versa, the said feed block being provided with a cam adapted to engage the motor piston stop when the feed block is in the position for automatic fire, a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, and a motor piston stop pivoted to the receiver and adapted to engage the motor piston when it is in the rearward position, the said motor piston stop being provided with a bearing face adapted to engage the cam on said feed block, substantially as described.

89. In a gun of the character described, the combination with a receiver and a barrel, the said barrel being provided with a gas passage, of a feed block mounted to swing on said receiver in position for hand fire, or for automatic fire, or vice versa, the said feed block being provided with a cam adapted to engage the motor piston stop when the feed block is in the position for automatic fire, a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, and a motor piston stop pivoted to the receiver and adapted to engage the motor piston when it is in the rearward position, the said motor piston stop being provided with a bearing face adapted to engage the cam on said feed block, the said piston stop being also provided with a hand lug for swinging same out of engagement by hand when desired, substantially as described.

90. In a gun of the character described, the combination with a receiver and a barrel, the said barrel being provided with a gas passage, of a feed block mounted to swing on said receiver in position for hand fire, or for automatic fire, or vice versa, the said feed block being provided with a cam adapted to engage the motor piston stop when the feed block is in the position for automatic fire, a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, and a motor piston stop pivoted to the receiver and adapted to engage the motor piston when it is in the rearward position, the said motor piston stop being provided with a bearing face adapted to engage the cam on said feed block, the said stop being also provided with a nipple to engage the cocking piece, and to be thereby held out of engagement with said motor piston, substantially as described.

91. In a gun of the character described, the combination with a receiver and a barrel, the said barrel being provided with a gas passage, of a feed block mounted to swing on said receiver in position for hand fire, or for automatic fire, or vice versa, the said feed block being provided with a cam adapted to engage the motor piston stop when the feed block is in the position for automatic fire, a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, and a motor piston stop pivoted to the receiver and adapted to engage the motor piston when it is in the rearward position, the said motor piston stop being provided with a bearing face adapted to engage the cam on said feed block, the said piston stop being also provided with a hand lug for swinging same out of engagement by hand when desired, and the said stop being also provided with a nipple to engage the cocking piece, and to be thereby held out of engagement with said motor piston, substantially as described.

92. In a gun of the character described, the combination with a receiver and a barrel, the said barrel being provided with a gas passage, of a feed block mounted to swing on said receiver in position for hand fire, or for automatic fire, or vice versa, the said feed block being provided with a cam adapted to engage the motor piston stop when the feed block is in the position for automatic fire, a motor piston mounted in said receiver, and adapted to be forced rearward by the powder gases escaping through such passage when open, a main spring also mounted in said receiver and adapted to return said motor piston to the forward position, a cocking piece and means for connecting the same to said motor piston for reciprocating same by hand when desired, a pivoted handle for said cocking piece provided with a recess therein, and a motor piston stop pivoted to the receiver and adapted to engage the motor piston when it is in the rearward position, the said motor piston being provided with a bearing face adapted to engage the cam on said feed block, the said stop being also provided with a nipple to engage said recess in said handle, and hold engage said recess in said handle, and hold the stop out of engagement with said piston, substantially as described.

93. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, substantially as described.

94. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with a cocking lever secured to the pivot of said hammer and adapted to turn said hammer to the cocked position by hand, substantially as described.

95. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with a cocking lever secured to the pivot of said hammer and adapted to turn said hammer to the cocked position by hand, said cocking lever being in the form of a resilient arm provided with a holding rib adapted to spring into a notch in the shoulder piece, substantially as described.

96. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with independent means for holding said hammer in the cocked position and for releasing same by hand, substantially as described.

97. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with a cocking lever secured to the pivot of said hammer and adapted to turn said hammer to the cocked position by hand, and with independent means for holding said hammer in the cocked position and for releasing same by hand, substantially as described.

98. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with a cocking lever secured to the pivot of said hammer and adapted to turn said hammer to the cocked position by hand, said cocking lever being in the form of a resilient arm provided with a holding rib adapted to spring into a notch in the shoulder piece, with independent means for holding said hammer in the cocked position and for releasing same by hand, substantially as described.

99. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with independent means for holding said hammer in the cocked position and for releasing same by hand, said means comprising a notch on the head of the hammer, a trigger sear adapted to engage said notch, a pivoted trigger piece and a looped trigger spring engaging both said trigger piece and said trigger sear, and normally adapted to throw said trigger to the initial position and to throw said sear into the position for engaging the hammer, substantially as described.

100. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with a cocking lever secured to the pivot of said hammer and adapted to turn said hammer to the cocked position by hand, and with independent means for holding said hammer in the cocked position and for releasing same by hand, said means comprising a notch on the head of the hammer, a trigger sear adapted to engage said notch, a trigger piece actuated thereby, and a looped trigger spring engaging both said trigger piece and said trigger sear, and normally adapted to throw said trigger to the initial position and to throw said sear into the position for engaging the hammer, substantially as described.

101. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with a cocking lever secured to the pivot of said hammer and adapted to turn said hammer to the cocked position by hand, said cocking lever being in the form of a resilient arm provided with a holding rib adapted to spring into a notch in the shoulder piece, with independent means for holding said hammer in the cocked position and for releasing same by hand, said means comprising a notch on the head of the hammer, a trigger sear adapted to engage said notch, a pivoted trigger piece, and a looped trigger spring engaging both said trigger piece and said trigger sear, and normally adapted to throw said trigger to the initial position and to throw said sear into the position for engaging the hammer, substantially as described.

102. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with independent means for holding said hammer in the cocked position and for releasing same by hand, said means comprising a notch on the head of the hammer, a trigger sear adapted to engage said notch, a pivoted trigger piece, a looped trigger spring engaging both said trigger piece and said trigger sear, and normally adapted to throw said trigger to the initial position and to throw said sear into the position for engaging the hammer, and a firing lever having a shaft provided with a lug projecting inwardly and engaging and controlling said trigger piece, with means for holding said firing lever in the three positions for safety, repetition and automatic fire, substantially as described.

103. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with a cocking lever secured to the pivot of said hammer and adapted to turn said hammer to the cocked position by hand, and with independent means for holding said hammer in the cocked position and for releasing same by hand, said means comprising a notch on the head of the hammer, a trigger sear adapted to engage said notch, a pivoted trigger piece, a looped trigger spring engaging both said trigger piece and said trigger sear, and normally adapted to throw said trigger to the initial position and to throw said sear into the position for engaging the hammer, and a firing lever having a shaft provided with a lug projecting inwardly and engaging and controlling said trigger piece, with means for holding said firing lever in the three positions for safety, repetition and automatic fire, substantially as described.

104. In a gun of the character described, the combination with a motor piston provided with a beveled heel and with a longitudinal groove at its bottom terminating in a cam face near the rear end of the motor piston, of a hammer and hammer spring, the hammer being provided with a detent, and being adapted to be pressed back by the beveled heel of said motor piston, of a hammer sear having an arm projecting into said groove, and an oppositely-disposed cocking arm adapted to engage the detent on the hammer, the sear also being provided with a lug projecting laterally from said cocking arm and adapted to be normally pressed downward by the said spring, thus holding said sear in engagement with said groove in the motor piston, effecting the automatic operation of said hammer sear, with a cocking lever secured to the pivot of said hammer and adapted to turn said hammer to the cocked position by hand, said cocking lever being in the form of a resilient arm provided with a holding rib adapted to spring into a notch in the shoulder piece, with independent means for holding said hammer in the cocked position and for releasing same by hand, said means comprising a notch on the head of the hammer, a trigger sear adapted to engage said notch, a trigger piece actuated thereby, a looped trigger spring engaging both said trigger piece and said trigger sear, and normally adapted to throw said trigger to the initial position and to throw said sear into the position for engaging the hammer, and a firing lever having a shaft provided with a lug projecting inwardly and engaging and controlling said trigger piece, with means for holding said firing lever in the three positions for safety, repetition and automatic fire, substantially as described.

105. In a gun of the character described, the combination with a receiver, of a motor piston mounted therein, adapted to be operated either by the powder gases, or by hand, said motor piston being provided with a lug near its forward end, a cocking piece mounted to slide on said receiver, and provided at its forward end with a lug, a handle pivoted to said cocking piece, and a spring carried by said cocking piece and provided with a hook normally adapted to engage said lug on the cocking piece under the action of said spring, substantially as described.

106. In a gun of the character described, the combination with a receiver, of a motor piston mounted therein, adapted to be operated either by the powder gases, or by hand, said motor piston being provided with a lug near its forward end, a cocking piece mounted to slide on said receiver and provided with a lug thereon and a handle pivoted thereto, the said handle having a plurality of notches in its heel, and a spring carried by said cocking piece and provided with a hook normally adapted to engage said lug on the cocking piece under the action of said spring, the said spring having an outwardly-projecting lug near its center, adapted to be pressed out into engagement with one of the notches in the heel of said handle, and to lock the handle in the desired position, substantially as described.

107. In a gun of the character described, the combination with a receiver, of a motor piston mounted therein, adapted to be operated either by the powder gases, or by hand, said motor piston being provided with a lug near its forward end, a cocking piece mounted to slide on said receiver and provided with a lug thereon and a handle pivoted thereto, the said handle having a plurality of notches in its heel, and a spring carried by said cocking piece and provided with a hook normally adapted to engage said lug on the cocking piece under the action of said spring, the said spring having an outwardly-projecting lug near its center, adapted to be pressed out into engagement with one of the notches in the heel of said handle, and to lock the handle in the desired position, with means for pressing back said spring and disengaging said lug from the heel of the handle, substantially as described.

108. In a gun of the character described, the combination with a receiver provided with a guideway for the cocking piece, and with a beveled stop in said guideway, of a motor piston mounted therein adapted to be operated either by the powder gases, or by hand, said motor piston being provided with a lug near its forward end, a cocking piece mounted to slide on said receiver and provided with a lug thereon and a handle pivoted thereto, and a spring carried by said cocking piece and provided with a hook normally adapted to engage said lug on the cocking piece under the action of said spring, the rear end of said spring being provided with a beveled lug adapted to engage said beveled stop and normally hold said cocking piece in the forward position, but to yield and release said engagement when said cocking piece is drawn sharply to the rear, substantially as described.

109. In a gun of the character described, the combination with a receiver, provided with a guideway for the cocking piece, and with a beveled stop in said guideway, of a motor piston mounted therein, adapted to be operated either by the powder gases, or by hand, said motor piston being provided with a lug near its forward end, a cocking piece mounted to slide on said receiver and provided with a lug thereon and a handle pivoted thereto, the said handle having a plurality of notches in its heel, and a spring carried by said cocking piece and provided with a hook normally adapted to engage said lug on the cocking piece under the action of said spring, the said spring having an outwardly-projecting lug near its center, adapted to be pressed out into engagement with one of the notches in the heel of said handle, and to lock the handle in the desired position, the rear end of said spring being provided with a beveled lug adapted to engage said beveled stop and normally hold said cocking piece in the forward position, but to yield and release said engagement when said cocking piece is drawn sharply to the rear, substantially as described.

110. In a gun of the character described, the combination with a receiver provided with a guideway for the cocking piece, and with a beveled stop in said guideway, of a motor piston mounted therein, adapted to be operated either by the powder gases, or by hand, said motor piston being provided with a lug near its forward end, a cocking piece mounted to slide on said receiver and provided with a lug thereon and a handle pivoted thereto, the said handle having a plurality of notches in its heel, and a spring carried by said cocking piece and provided with a hook normally adapted to engage said lug on the cocking piece under the action of said spring, the said spring having an outwardly-projecting lug near its center, adapted to be pressed out into engagement with one of the notches in the heel of said handle, and to lock the handle in the desired position, with means for pressing back said spring and disengaging said lug from the heel of the handle, the rear end of said spring being provided with a beveled lug adapted to engage said beveled stop and normally hold said cocking piece in the forward position, but to yield and release said engagement when said cocking piece is drawn sharply to the rear, substantially as described.

In testimony whereof, we affix our signatures, in presence of two witnesses.

LAURENCE V. BENÉT.
HENRI A. MERCIÉ.

Witnesses:
ANTONIO LAZO,
J. A. CHOMNARD.